(12) United States Patent
Ramasubramanian

(10) Patent No.: US 11,404,815 B2
(45) Date of Patent: Aug. 2, 2022

(54) SEALED CONNECTOR WITH TRIGGERED MATING AND METHOD OF USING SAME

(71) Applicant: Ormond Energy Innovations Inc.

(72) Inventor: Srikanth Ramasubramanian, Katy, TX (US)

(73) Assignee: Ormond Energy Innovations Inc., Katy, TX (US)

( * ) Notice: Subject to any disclaimer, the term of this patent is extended or adjusted under 35 U.S.C. 154(b) by 292 days.

(21) Appl. No.: 16/760,671

(22) PCT Filed: Oct. 30, 2018

(86) PCT No.: PCT/US2018/058301
§ 371 (c)(1),
(2) Date: Apr. 30, 2020

(87) PCT Pub. No.: WO2019/089660
PCT Pub. Date: May 9, 2019

(65) Prior Publication Data
US 2021/0273373 A1   Sep. 2, 2021

Related U.S. Application Data

(60) Provisional application No. 62/578,610, filed on Oct. 30, 2017.

(51) Int. Cl.
*H01R 13/52*   (2006.01)
*G02B 6/38*   (2006.01)
(Continued)

(52) U.S. Cl.
CPC ....... *H01R 13/5219* (2013.01); *G02B 6/3816* (2013.01); *G02B 6/3849* (2013.01);
(Continued)

(58) Field of Classification Search
CPC .............. H01R 13/523; H01R 13/5219; H01R 13/521; H01R 13/533; H01R 43/26;
(Continued)

(56) References Cited

U.S. PATENT DOCUMENTS 3,460,618 A   8/1969   Blagg
3,951,515 A   4/1976   Allard
(Continued)

FOREIGN PATENT DOCUMENTS

EP   1291694 A2   3/2003
EP   1291694 A3   6/2004
(Continued)

OTHER PUBLICATIONS

Christiansen et al. Fiber Optic Terminations for Subsea Applications, SEACON Advanced Products, (Jun. 2001), pp.1-8.
(Continued)

*Primary Examiner* — Gary F Paumen
(74) *Attorney, Agent, or Firm* — JL Jennie Salazar

(57) ABSTRACT

A sealed connector has a sealed plug and a sealed receptacle, each including a housing, support, bladder assembly, tagger assembly, and contacts coupled to the equipment. The bladder assembly includes an expandable bladder, and a seal plate earned by the expandable bladder between an expanded position about an opening in the housing and a contracted position a distance from the opening. The trigger assembly includes rod(s) extendable through the bladder and the seal plate. When the housing of the sealed receptacle is matingly connected to the housing of the sealed plug, the trigger assemblies extends through the seal plates and into triggered engagement with each oilier, a passageway through the seal plates are open, and the contacts of the sealed plug extend through the passageways and into engagement with the contact of the sealed receptacle.

33 Claims, 33 Drawing Sheets

(51) Int. Cl.
*H01R 13/523* (2006.01)
*H01R 13/533* (2006.01)
*H01R 43/26* (2006.01)

(52) U.S. Cl.
CPC ......... *H01R 13/521* (2013.01); *H01R 13/523* (2013.01); *H01R 13/533* (2013.01); *H01R 43/26* (2013.01)

(58) Field of Classification Search
CPC ...... G02B 6/3816; G02B 6/3849; G02B 6/36; G02B 6/00
USPC ......... 439/131, 201; 385/56, 75, 139, 53, 58
See application file for complete search history.

(56) References Cited

U.S. PATENT DOCUMENTS

| | | | |
|---|---|---|---|
| 4,217,028 A | 8/1980 | Reh et al. | |
| 4,360,729 A | 11/1982 | Harvey et al. | |
| 4,516,830 A | 5/1985 | Guazzo | |
| 4,537,468 A | 8/1985 | Degoix et al. | |
| 4,545,645 A | 10/1985 | Mignien | |
| 4,561,830 A | 12/1985 | Bradley | |
| 4,580,874 A | 4/1986 | Winter et al. | |
| 4,598,290 A | 7/1986 | Collins et al. | |
| 4,753,500 A | 6/1988 | Guazzo | |
| 4,810,277 A | 3/1989 | Waitl et al. | |
| 4,834,479 A | 5/1989 | Adl | |
| 4,948,377 A | 8/1990 | Cairns | |
| 5,013,124 A | 5/1991 | Focht | |
| 5,042,902 A | 8/1991 | Huebscher et al. | |
| 5,048,921 A | 9/1991 | Jones et al. | |
| 5,076,657 A | 12/1991 | Toya et al. | |
| 5,083,875 A | 1/1992 | Cedrone | |
| 5,315,461 A | 5/1994 | Todd | |
| 5,338,579 A | 8/1994 | Ogawa et al. | |
| 5,341,448 A | 8/1994 | Huebscher | |
| 5,515,473 A | 5/1996 | Yamauchi et al. | |
| 5,557,697 A | 9/1996 | Yoshie | |
| 5,584,253 A | 12/1996 | Stranford | |
| 5,612,369 A | 3/1997 | Bone et al. | |
| 5,642,451 A | 6/1997 | Kennedy et al. | |
| 5,645,438 A | 7/1997 | Cairns | |
| 5,722,842 A | 3/1998 | Cairns | |
| 5,796,821 A | 8/1998 | Crouch et al. | |
| 5,838,857 A | 11/1998 | Niekrasz | |
| 6,017,227 A | 1/2000 | Cairns et al. | |
| 6,028,974 A | 2/2000 | Shyu et al. | |
| 6,315,461 B1 | 11/2001 | Cairns | |
| 6,338,579 B1 | 1/2002 | Winiarski | |
| 6,584,253 B2 | 6/2003 | Kordahi et al. | |
| 6,612,369 B1 | 9/2003 | Rocha et al. | |
| 6,796,821 B2 | 9/2004 | Cairns et al. | |
| 6,929,404 B2 | 8/2005 | Jones et al. | |
| 7,004,638 B2 | 2/2006 | Nicholson | |
| 7,182,617 B1 | 2/2007 | Cairns et al. | |
| 7,338,215 B2 | 3/2008 | Reynolds | |
| 7,364,448 B2 | 4/2008 | Cairns et al. | |
| 7,618,198 B2 | 11/2009 | Baxter et al. | |
| 7,648,285 B2 | 1/2010 | Maletzky et al. | |
| 7,803,334 B1 | 9/2010 | Hoehn et al. | |
| 8,017,227 B2 | 9/2011 | Soroushian et al. | |
| 8,226,303 B2 | 7/2012 | Toth | |
| 8,266,303 B2 | 9/2012 | Black et al. | |
| 8,634,690 B2 | 1/2014 | Landaas et al. | |
| 8,734,026 B2 | 5/2014 | Nagengast et al. | |
| 9,077,099 B1 | 7/2015 | Hatcher et al. | |
| 9,256,032 B2 * | 2/2016 | Toth | G02B 6/3816 |
| 9,651,742 B2 * | 5/2017 | Toth | G02B 6/3816 |
| 9,915,104 B2 | 3/2018 | Richards | |
| 10,422,969 B2 | 9/2019 | Ramasubramanian | |
| 2003/0104949 A1 | 6/2003 | Myers et al. | |
| 2010/0155054 A1 | 6/2010 | Innes et al. | |
| 2011/0129187 A1 | 6/2011 | Toth | |
| 2014/0093247 A1 | 4/2014 | Jamtveit et al. | |
| 2014/0233898 A1 | 8/2014 | Kimbrell et al. | |
| 2014/0352422 A1 | 12/2014 | Paulsson | |
| 2015/0036986 A1 | 2/2015 | Kretschmar et al. | |
| 2015/0157782 A1 | 6/2015 | Wieting et al. | |
| 2015/0167782 A1 | 6/2015 | Drake | |
| 2015/0169654 A1 | 6/2015 | Chen et al. | |
| 2015/0280355 A1 | 10/2015 | Hatcher et al. | |
| 2016/0004016 A1 | 1/2016 | Zimmel et al. | |
| 2017/0022807 A1 | 1/2017 | Dursun et al. | |
| 2017/0175471 A1 | 6/2017 | Boleyn, Jr. | |
| 2018/0083705 A1 | 3/2018 | Villmark | |

FOREIGN PATENT DOCUMENTS

| | | |
|---|---|---|
| EP | 2955320 A1 | 12/2015 |
| WO | 3237152 A1 | 5/2002 |

OTHER PUBLICATIONS

Guide to Fiber Optics & Premises Cabling. The Fiber Optic Association, Inc. 1999-2014. pp. 1-16.
Inaudi et al. Long-Range Pipeline Monitoring by Distributed Fiber Optic Sensing, Journal of Pressure Vessel Technology, (2010), vol. 132 pp. 1-9.
Munier et al., BP GOM: Next Generation Offshore Fiber ON&T. Oct./Nov. 2008. vol. 14, Issue 7; p. 44-45.
PCT International Search Report & Written Opinion for PCT/US2018/058301, dated Jan. 31, 2019, pp. 1-14.
EPO Communication pursuant to Article 94(e) EPC, dated Jun. 8, 2021, pp. 1-6.
EPO Communication pursuant to Rules 151(1) and 162 EPC, dated Jun. 9, 2020, pp. 1-3.
EPO Letter re: Comments on the Written Opinion and Amendments of the Application, dated Dec. 8, 2020, pp. 1-16.
EPO Response to Examination report dated Jun. 8, 2021, Response dated Dec. 3, 2022, pp. 1-28.

* cited by examiner

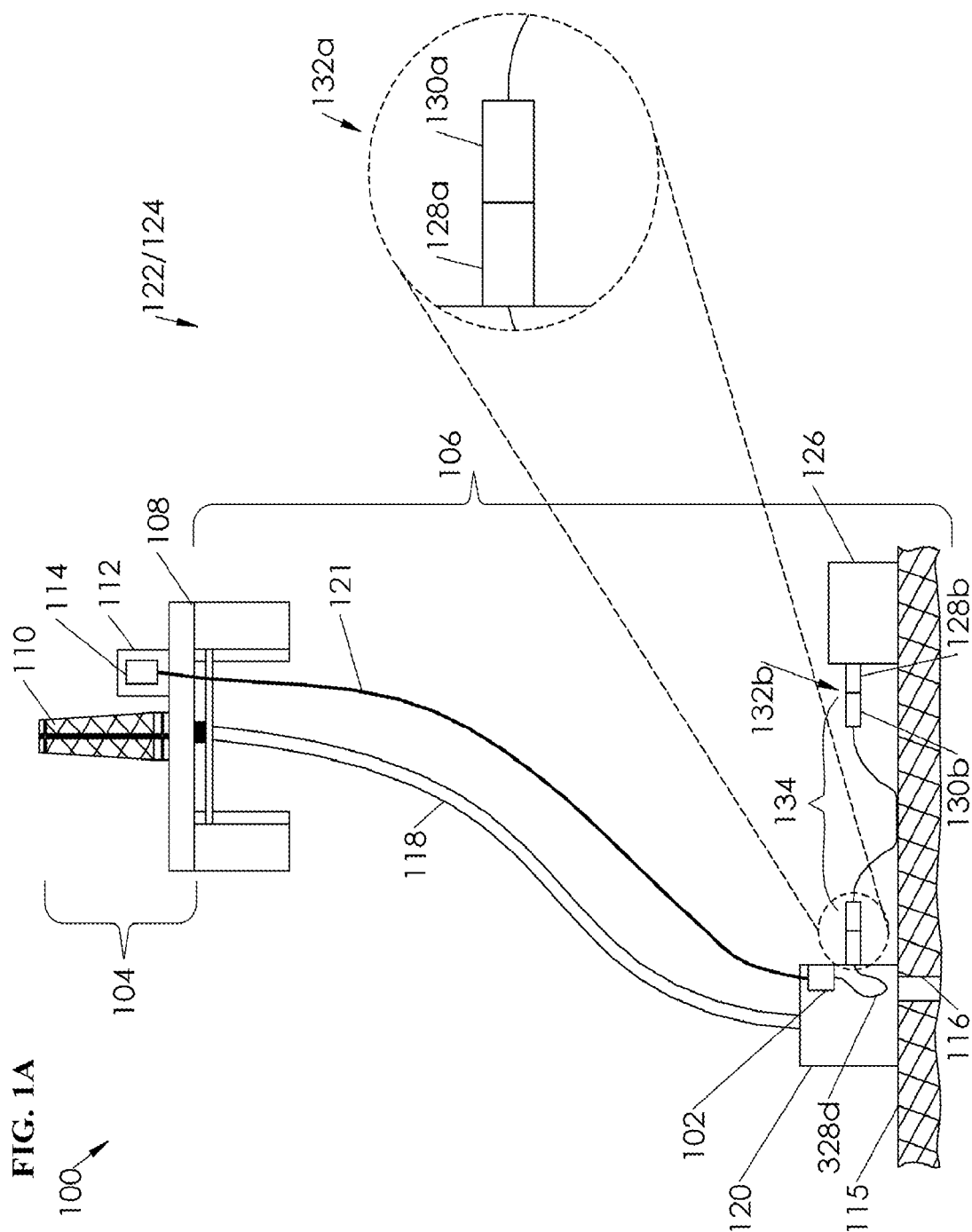

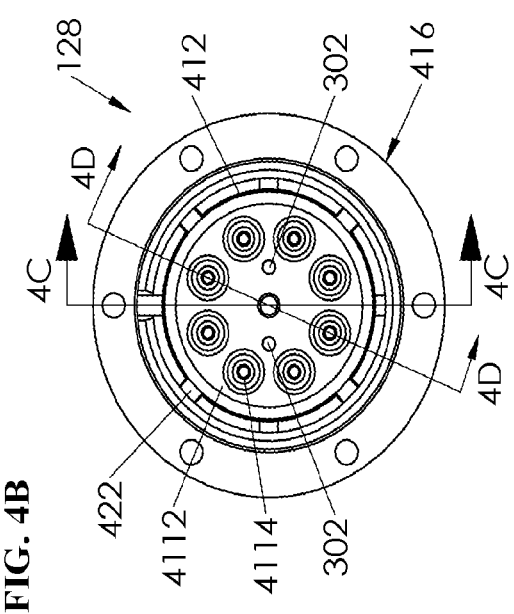
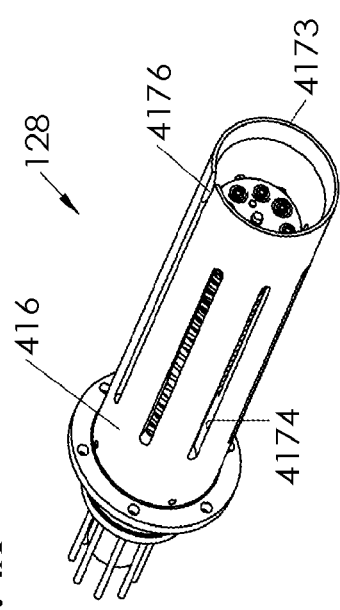
FIG. 4A
FIG. 4B
FIG. 4C

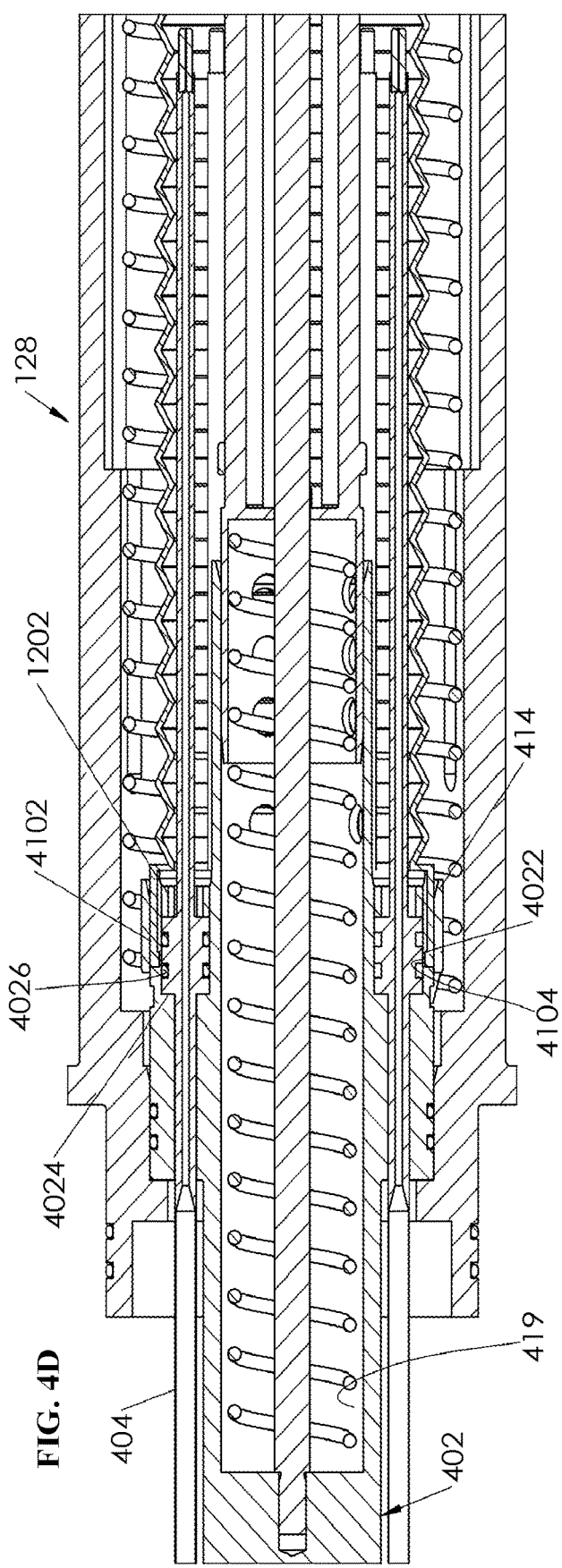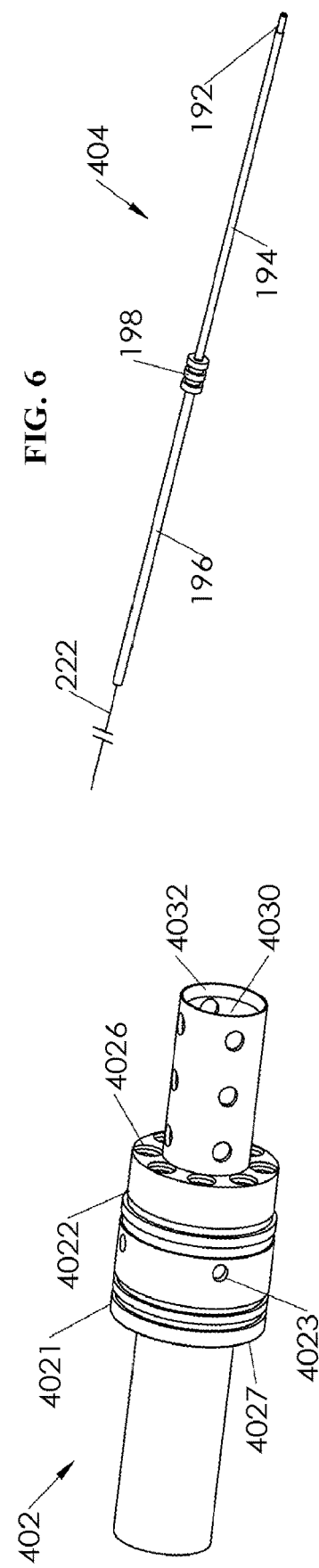
FIG. 4D
FIG. 6
FIG. 5

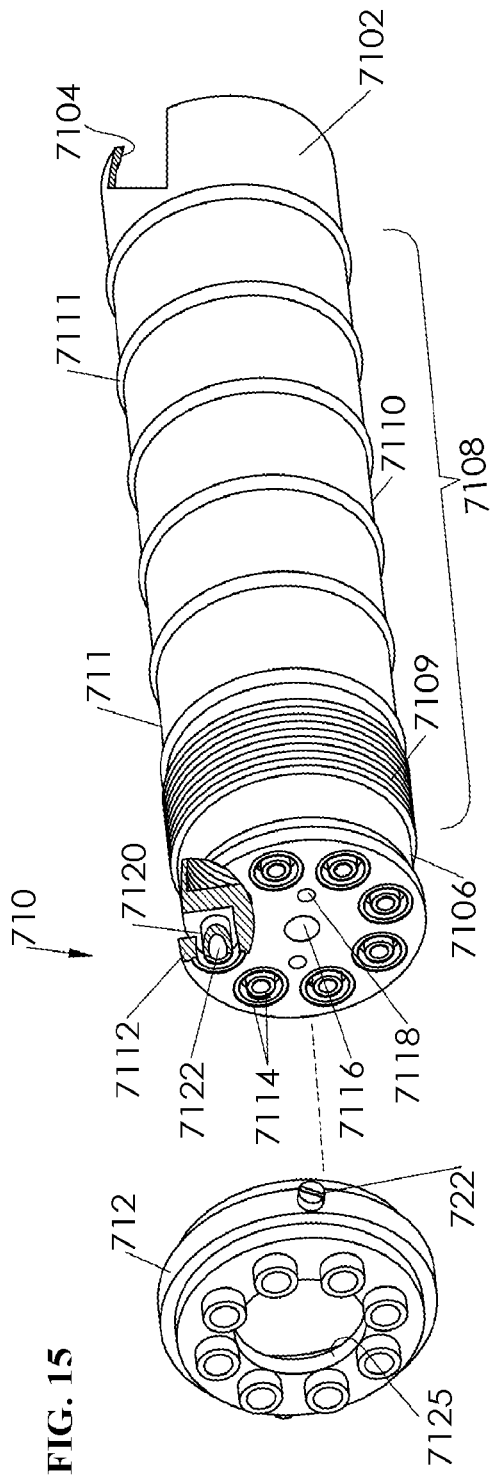
FIG. 15
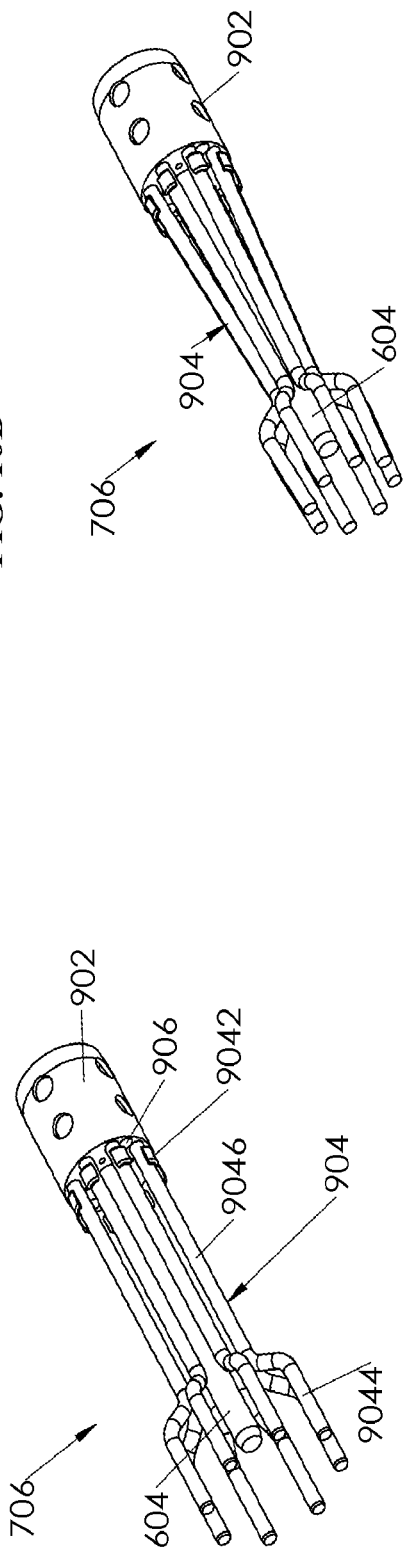
FIG. 16A
FIG. 16B

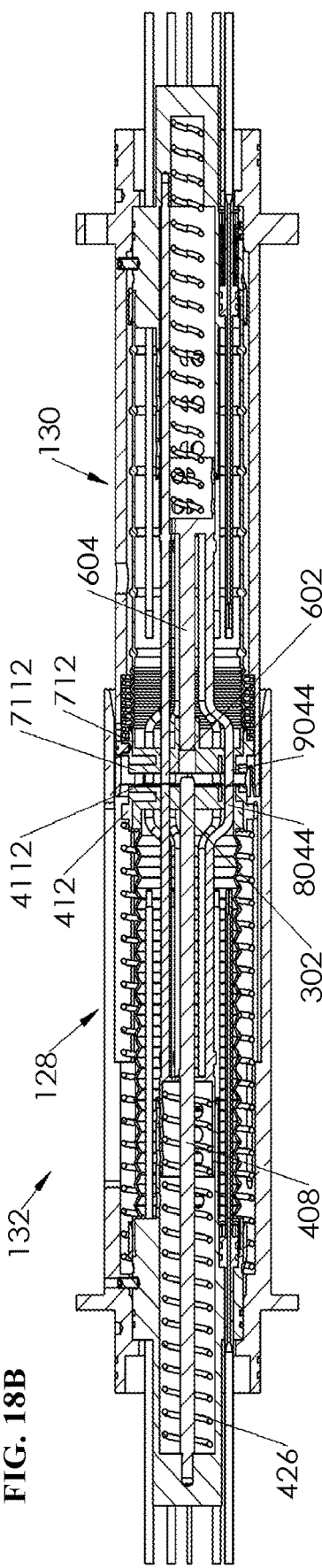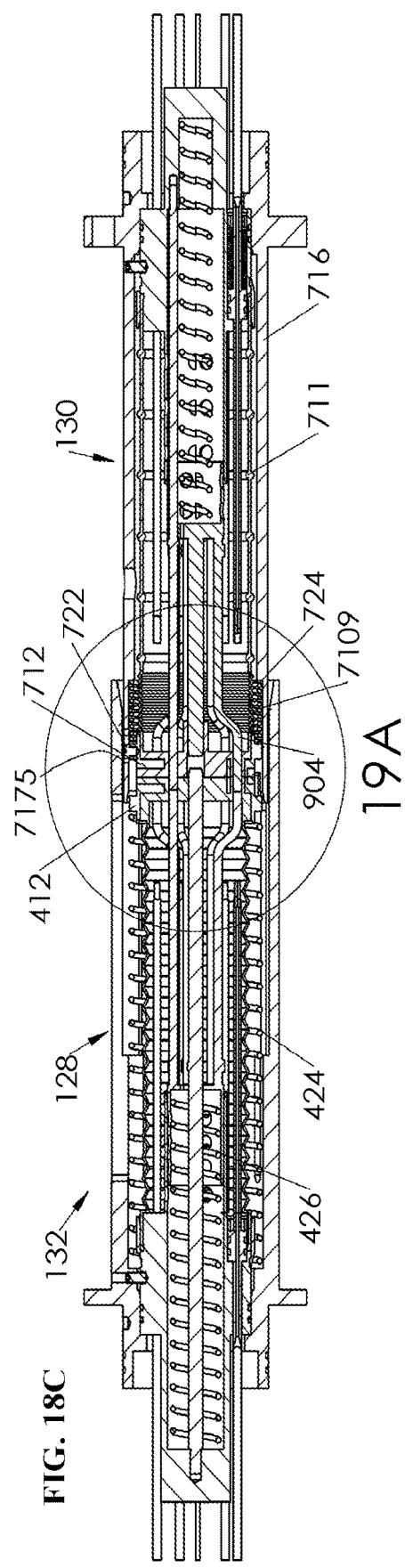

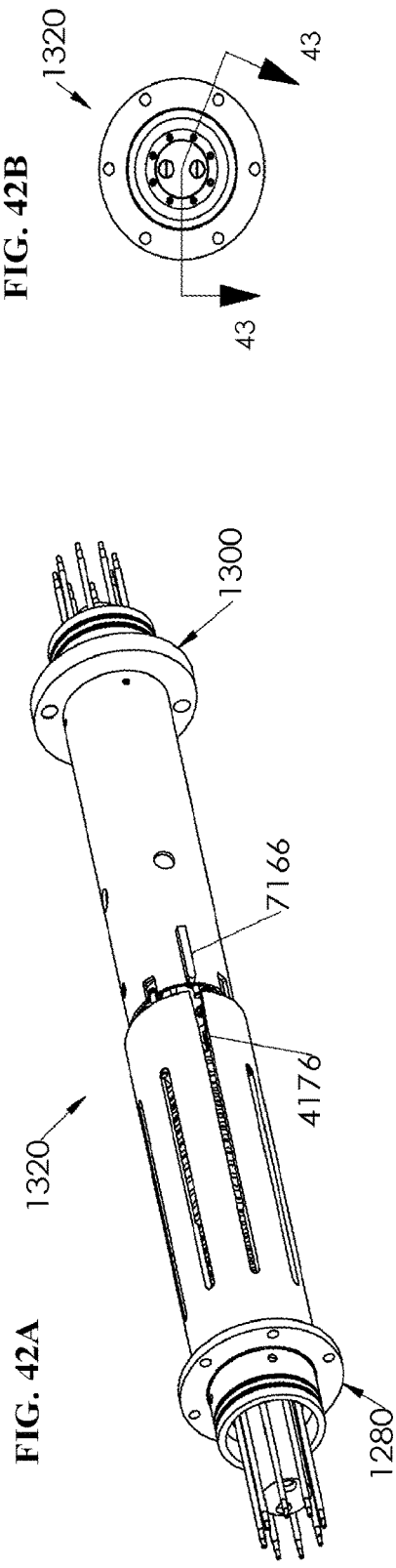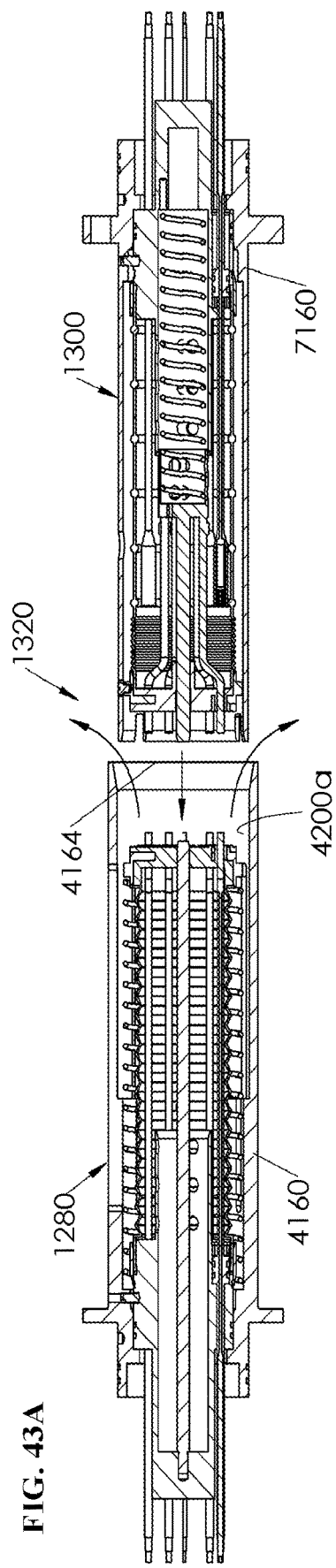
FIG. 42B
FIG. 42A
FIG. 43A

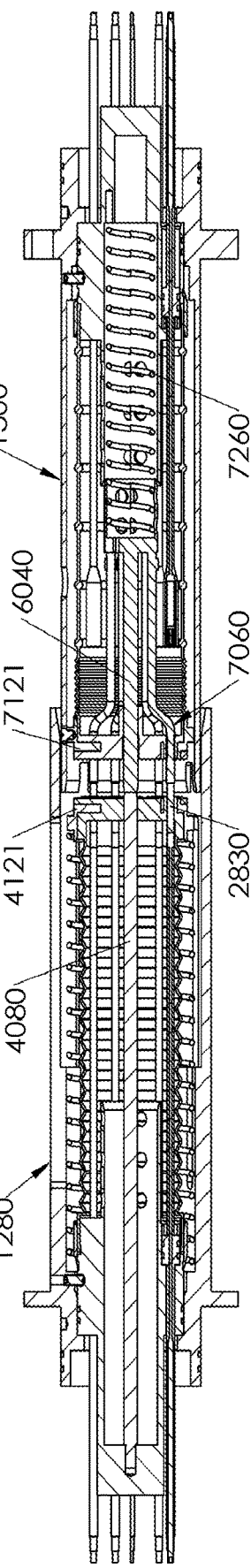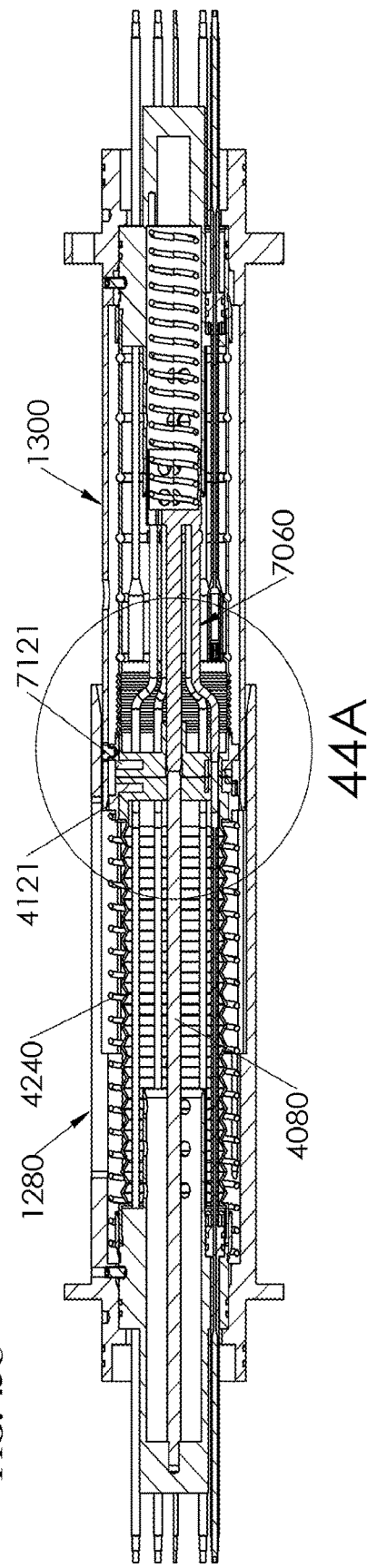
FIG. 43B
FIG. 43C

FIG. 45

4500 METHOD OF COMMUNICATIVELY CONNECTING EQUIPMENT

4570 COMMUNICATIVELY COUPLING A SEALED PLUG TO A FIRST PIECE OF THE EQUIPMENT

4572 COMMUNICATIVELY COUPLING A SEALED RECEPTACLE TO A SECOND PIECE OF THE EQUIPMENT

4574 COMMUNICATIVELY COUPLING THE SEALED PLUG TO THE SEALED RECEPTACLE BY:

4574a ADVANCING THE SEALED RECEPTACLE AND THE SEALED TOGETHER

- RECEIVING AN END OF THE SEALED RECEPTACLE INTO AN END OF THE SEALED PLUG

4574b FORMING A BLADDER SEAL BETWEEN A PLUG BLADDER ASSEMBLY IN THE SEALED PLUG AND A RECEPTACLE BLADDER ASSEMBLY IN THE SEALED RECEPTACLE

- ENGAGING A PLUG SEAL PLATE OF THE PLUG BLADDER WITH A RECEPTACLE SEAL PLATE OF THE RECEPTACLE BLADDER

4574c WHILE MAINTAINING THE BLADDER SEAL, OPENING PASSAGEWAYS THROUGH THE SEALED PLUG AND THE SEALED RECEPTACLE BY EXTENDING TRIGGER ASSEMBLIES OF THE SEALED PLUG AND THE SEALED RECEPTACLE THROUGH THE BLADDER ASSEMBLIES AND INTO ENGAGEMENT WITH EACH OTHER

- EXTENDING A PLUG TRIGGER ASSEMBLY THROUGH THE PLUG BLADDER AND EXTENDING A RECEPTACLE TRIGGER ASSEMBLY THROUGH THE RECEPTACLE BLADDER; AND ENGAGING THE PLUG TRIGGER ASSEMBLY WITH THE RECEPTACLE TRIGGER ASSEMBLY

- ENGAGING THE PLUG TRIGGER ASSEMBLY WITH THE RECEPTACLE TRIGGER ASSEMBLY SUCH THAT TINES OF THE TRIGGER ASSEMBLY COLLAPSE AWAY FROM THE PASSAGEWAYS

4574d OVERCOMING A SPRING FORCE OF AT LEAST ONE OF THE BLADDER ASSEMBLIES

4574e OVERCOMING A SPRING FORCE OF AT LEAST ONE OF THE PLUG ASSEMBLIES

4576 ADVANCING CONTACTS OF THE SEALED PLUG THROUGH THE PASSAGEWAYS AND INTO ENGAGEMENT WITH CORRESPONDING CONTACTS OF THE SEALED RECEPTACLE

SEALED CONNECTOR WITH TRIGGERED MATING AND METHOD OF USING SAME

CROSS-REFERENCE TO RELATED APPLICATIONS

This application claims the benefit of U.S. Provisional Application No. 62/578,610, filed Oct. 30, 2017, the entire contents of which is hereby incorporated by reference herein.

BACKGROUND

The present disclosure relates generally to connection technology. More specifically, the present disclosure relates to connectors usable for connecting equipment in harsh and/or other environments.

Connectors, such as fiber optic and/or electric connectors, are used to connect various equipment. Some connectors are used to join optical and/or electric cables to extend such cables over a distance. These connectors include components that enable signals to pass from one cable to another. Some other connectors are used to connect cables to power sources or other equipment. These power connectors may include components that enable power to pass through the cable and to the equipment via the connector. Examples of connectors are provided in Patent Nos. 5,838,857, 8,226,303, 6,929,404, 7,648,285, 7,004,638, and U.S. Pat. No. 6,017,227, the entire contents of which are hereby incorporated by reference herein.

In some cases, connectors are used in harsh environments, such as offshore and subsea locations. Exposure to these harsh environments may cause damage to the connector, cables, and associated equipment. Devices, such as terminations, have been developed for use in such harsh environments. Examples of terminations are provided in Patent/Application Nos. U.S. Pat. No. 4,598,290, US2016/0004016, US20140233898; U.S. Pat. Nos. 6,796,821, 4,545,643, 6,584,253, 45,808,974, 7,338,215, 7,182,617, 4,516,830, 5,048,921, 6,338,579, 5,076,657, 4,580,874, EP1291694 and WO2017161185, the entire contents of which are hereby incorporated by reference herein.

Despite the advancements in connector technology, there remains a need for connectors capable of effective and efficient operation in even the harshest environments. The present disclosure is directed at providing such needs.

SUMMARY

In at least one aspect, the disclosure relates to a sealed connector for communicatively connecting equipment positioned in a harsh environment. The seal connector comprises a sealed plug and a sealed receptacle. Each of the sealed plug and the sealed receptacle, comprises a housing; a support secured in the housing; a bladder assembly, a trigger assembly, and contacts. The bladder assembly is connected to the support, and comprises an expandable bladder and a seal plate. The seal plate is carried by the expandable bladder through the housing between an expanded position about an opening in the housing and a contracted position a distance from the opening. The trigger assembly is supported in the expandable bladder by the support to form a sealed chamber therebetween, and comprises at least one rod extendable through the bladder and the seal plate. The contacts are supported in the expandable bladder by the support, the contacts communicatively coupled to the equipment. When the housing of the sealed receptacle is matingly connected to the housing of the sealed plug: the seal plate of the sealed receptacle is in sealing engagement with the seal plate of the sealed plug; the trigger assembly of the sealed plug extends through the seal plate of the sealed plug and the trigger assembly of the sealed plug extends through the seal plate of the sealed receptacle and into triggered engagement with each other; a passageway through the seal plate of the sealed plug and a passageway through the seal plate of the sealed receptacle are open; and the contact of the sealed plug extends through the passageway of the sealed plug and the passageway of the sealed receptacle and into engagement with the contact of the sealed receptacle.

The sealed connector of claim 1, further comprising an additional bladder within the expandable bladder. The expandable bladder tube has at least one of peripheral ribs and a lip. The expandable bladder tube has a first rib section and a second rib section, the first rib section more flexible than the second rib section. The seal plate comprises a plate, a disc, and seals. The seal plate comprises tubular member and a disc positionable about the tubular member. The seal plate has holes for receiving portions of the contacts and the trigger assembly therethrough. The sealed plate comprises plate seals positioned about the holes. The bladder assembly further comprises a bladder spring. The trigger assembly further comprises a base. The trigger assembly further comprises a trigger spring. The trigger assembly of at least one of the sealed plug and the sealed receptacle further comprise tines. The tines comprise a rod with fingers. The trigger assembly further comprises tabs. The trigger assembly further comprises a plunger. The support has a bore therethrough to receive the trigger assembly. The contacts comprise fiber optic contacts. The contacts comprise electric contacts. The contacts comprise an insulator, a conductor, and a seal shaft. The sealed connector further comprises a fluid disposed in the sealed chamber and pressure balanced therein. The housing is a modular housing comprising a tip, a base, and a tube. The support of the sealed plug and the support of the sealed connector are identical.

In another aspect, the disclosure relates to a sealed connection system for communicatively connecting equipment positioned in a harsh environment. The sealed connection system comprises a sealed plug and a sealed receptacle. The sealed plug comprises a sealed plug housing; a plug support secured in the plug housing, the plug support having a bladder end extending into the plug housing; a plug bladder having a support end secured to the bladder end of the plug support and a seal end having a plug seal plate thereon, the plug seal plate slidably movable in the plug housing as the plug bladder extends and retracts; a plug trigger supported by the plug support in the plug bladder to form a sealed chamber therebetween, the plug trigger extendable through the bladder and the plug seal plate; and plug contacts supported by the support and extendable into the plug bladder. The sealed receptacle comprises a sealed receptacle housing matingly receivable in an opening in the sealed plug housing; a receptacle support secured in the receptacle housing, the receptacle support having a bladder end extending into the receptacle housing; a receptacle bladder having a support end secured to the bladder end of the receptacle support and a seal end having a receptacle seal plate thereon, the receptacle seal plate slidably movable in the receptacle housing as the receptacle bladder extends and retracts; and a receptacle trigger supported by the receptacle support in the receptacle bladder to form a sealed chamber therebetween, the receptacle trigger extendable through the receptacle bladder and the receptacle seal plate to engage with the plug trigger; and receptacle contacts supported by the support and extendable into the receptacle bladder. When the receptacle housing and the plug housing are mated together: the trigger assemblies are in a triggered position extending through the bladder and the seal plates and into triggered engagement with each other and passageways through the seal plates are open; and the plug contacts are in an extended position through the passageways and in engagement with the receptacle contact.

The sealed connection system further comprises a harness. The sealed connection system further comprises a connection assembly. The connection assembly comprises a connection housing and lock plates. The sealed connection system further comprises a termination.

Finally, ire another aspect, the disclosure relates to a method of communicatively connecting equipment positioned in a harsh environment. The method comprises communicatively coupling a sealed plug to a first piece of the equipment; communicatively coupling a sealed receptacle to a second piece of the equipment; communicatively coupling the sealed plug to the sealed receptacle by advancing the sealed receptacle and the sealed plug together; forming a bladder seal between a plug bladder assembly in the sealed plug and a receptacle bladder assembly in the sealed receptacle; while maintaining the bladder seal, opening passageways through the sealed plug and the sealed receptacle by extending trigger assemblies of the sealed plug and the sealed receptacle through the bladder assemblies and into engagement. with each other; and advancing contacts of the sealed plug through the passageways and into engagement with corresponding contacts of the sealed receptacle.

The advancing the sealed receptacle comprises receiving an end of the sealed receptacle into an end of the sealed plug. The communicatively coupling comprises overcoming a spring force of at least one of the bladder assemblies. The communicatively coupling the sealed plug to the sealed receptacle comprises overcoming a spring force of at least one of the plug assemblies. The extending the trigger assemblies through the bladder assemblies and into engagement with each other comprises: extending a plug trigger assembly through the plug bladder and extending a receptacle trigger assembly through the receptacle bladder; and engaging the plug trigger assembly with the receptacle trigger assembly. The opening passageways through the sealed plug and the sealed receptacle is performed by engaging the plug trigger assembly with the receptacle trigger assembly such that tines of the trigger assembly collapse away from the passageways.

This summary is riot intended to be limiting of scope. Further aspects of the disclosure are provided herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIG. 1A is a schematic diagram depicting an offshore well with a communication system including a communication source, a cable, a protective termination, and a sealed connector.

FIGS. 4A-4D are various views of the sealed plug.

FIG. 5 is a perspective view of a plug internal support.

FIG. 6 is a perspective view of a plug contact.

FIG. 15 is an exploded view, partial in cross-section of a receptacle bladder assembly.

FIGS. 16A and 16B are perspective views of a receptacle tine assembly in an expanded and collapsed position, respectively.

FIG. 18A-18I are cross-sectional views of the sealed connector of FIG. 17B taken along line 18-18 and shown in various stages of connection.

FIGS. 42A-42B are various views of the electric sealed connector in a pre-mating position.

FIG. 43A-43E are cross-sectional views of the electric sealed connector of FIG. 42B taken along line 43-43 and shown in various stages of connection.

FIG. 45 is a flow chart depicting a method of assembling and using a sealed connector, respectively.

DETAILED DESCRIPTION

Figure 1B:
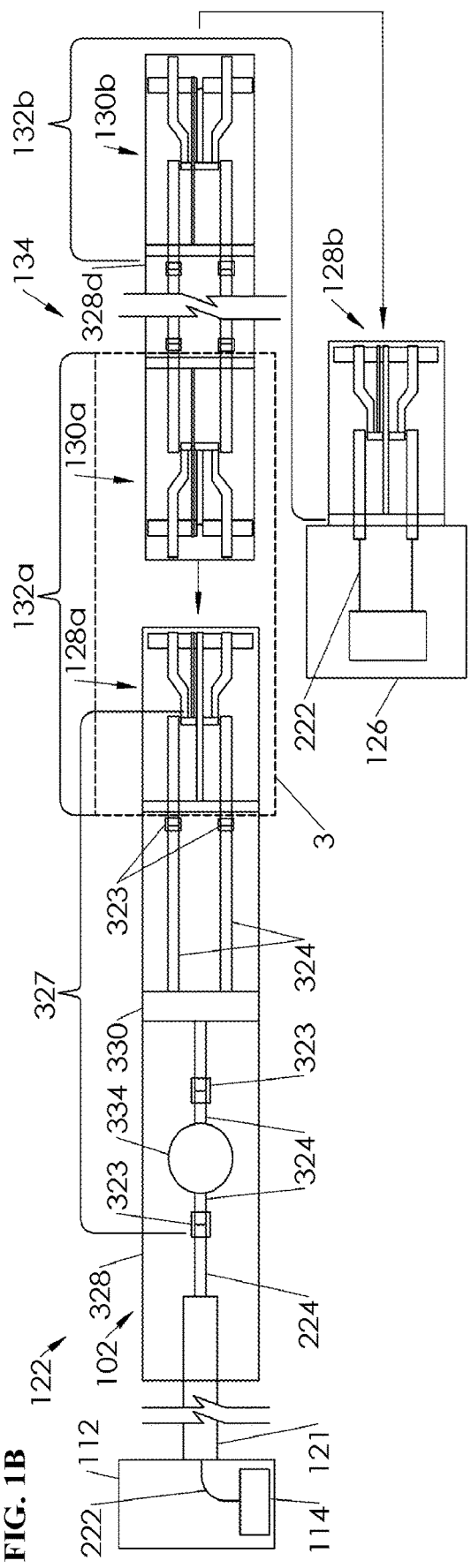
FIG. 1B is a schematic diagram depicting an example configuration of the communication system of FIG. 1A with the sealed connector in a detached position.

The description that follows includes exemplary apparatus, methods, techniques, and/or instruction sequences that embody techniques of the present subject matter. However, it is understood that the described embodiments may be practiced without these specific details.

The present disclosure relates to a sealed connector for use in even the harshest environments. The sealed connector includes a sealed plug sealingly connectable to a first component and a sealed receptacle sealingly connectable to a second component to provide independent seals about each of the sealed plug and the sealed receptacle, and a combined seal. therebetween. The sealed plug and sealed receptacle are mateable such that a seal is maintained between the sealed Plug and the sealed receptacle while a connection is made therebetween. The sealed plug and sealed receptacle are each provided with triggers that allow the sealed plug and sealed receptacle to shift to a mating position for connection while a seal is maintained about both the sealed plug and the sealed receptacle.

The sealed connector may be used to maintain a seal about various components as they are connected. The components connected by the sealed connector may be cable components (e.g., fiber optic, electric, and/or other cables, terminations, harnesses, etc.) and/or equipment (e.g., subsea equipment, etc). Some versions may include 'all electric', all optical, and/or combinations of cable components.

The sealed connector may be used in any environment, including, harsh environments. A "harsh environment" as used herein refers to any location where the disclosed connector may be used in which conditions may be damaging to the connector (or components thereof), cable components carried by the cable (e.g., optical fibers, electric wires, etc.), other portions of the connector, and/or equipment usable therewith. The harsh environment may include harsh conditions, such as damaging materials (e.g., corrosive or toxic materials and/or fluids (e.g., seawater, saline, etc.), chemicals (e.g., compositions that are either naturally present or disposed to ambient, hydrogen from cathodic protection system and other gases)), high pressure and/or temperature (e.g., above ambient), and/or other conditions that may lead to damage (e.g., functional performance degradation) of the connector, the cable, and/or other portions of the connector and/or the equipment usable therewith (suddenly or over time). Examples of harsh environments and devices used therein are described in PCT Patent Application No. WO2017/161185, the entire contents of which is hereby incorporated by reference herein.

The sealed connector may be intended to provide one or more of the following capabilities: modular configuration, pressure balanced connection, interfacing with a variety of equipment, redundant sealing layers, sealing about separate and combined components of the connector, isolated cable components, contacts isolated from exposure to harsh conditions, flexible use with various cable components, retention mechanisms to keep the portions of the connector in place until disconnected, etc.

Communication System

FIGS. 1A and 1B depict schematic views of a sealed connector 132a,b usable in a communication (or fiber optic) system 122 at a wellsite 100. While FIG. 1A shows an offshore wellsite 100, the sealed connector 132a,b may be used in a variety of applications, such as applications in any harsh or non-harsh environment. In this example, the wellsite 100 includes surface equipment 104 and subsea equipment 106. Also, while FIG. 1 depicts the sealed connector 132a,b in use with a fiber optic termination 102 and fiber optic system 122, other terminations and/or communication systems may be used, such as electric terminations and systems.

The surface equipment 104 includes a. platform ins, a rig 110, and a surface unit 112. The rig 110 may optionally be placed on an offshore vessel, an onshore rig site, or other location. The surface unit 112 may be an operator's facility including a central processing unit (CPU) and associated electronics (e.g., database, power, communication, control, and/or other devices). The surface tent 112 may also include a source 114 usable with the fiber optic termination 102 for communication about the wellsite 100.

The subsea equipment 106 includes a riser 118, sea floor equipment 120, 126, and the fiber optic system 122. The fiber optic system 122 includes the fiber optic termination 102 and the sealed connector 132a. The riser 118 extends from the rig 110 to a wellbore 116 for passing fluid therebetween. The riser 118 may have conduits (e.g., choke and kill lines) and/or other equipment usable therewith.

The sea floor equipment 120, 126 is positioned on the sea floor 115 about the wellbore 116 for performing wellsite operations. The sea floor equipment 120, 126 may include a variety of equipment, such as a blowout preventer, low riser marine package (LRMP), production tree, subsea distribution, and/or other devices used for performing wellsite operations.

The fiber optic system 122 may include the source 114, one or more fiber optic cables 121, and/or one or more of the fiber optic terminations 102. The fiber optic system 122 may be coupled between the source 114 and the sea floor equipment 120 for communication therebetween. The fiber optic termination 102 may be positioned about (e.g., coupled to or positioned in) the surface unit 112 and/or the sea floor equipment 120 (e.g., near or away from the wellbore, e.g., at subsea distribution equipment).

The fiber optic termination 102 may also be coupled to the source 114 and/or other surface equipment 104 by the fiber optic cable 121 for operation therewith. The fiber optic cable 121 may be connected between the source 114 and the fiber optic termination 102 and/or between the sea floor equipment 120 and the fiber optic termination 102 for passing signals therebetween. The source 114 may have a laser to pass light through the fiber optic. cable 121 for measuring wellsite parameters. The CPU and/or electronics at the surface unit 112 may be used for sending signals (e.g., command, control, etc.) and/or receiving signals (e.g., measured data) from the fiber optic system 122 and/or the source 114.

The fiber optic termination 102 may be a variety of devices capable of connecting the fiber optic cable 121 to the wellsite equipment for operation (e.g., communication) therewith. For example, the fiber optic termination 102 may be a FIBERSAFE™ termination commercially available from ORMOND ENERGY INNOVATIONS INC.™ at www.oei2.com and www.thefibersafe.com. Examples of fiber optic communication systems and/or terminations that may be used are disclosed in in Patent/Application Nos. U.S. Pat. No. 4,598,290, US20140233898; U.S. Pat. Nos. 6,796, 821, 4,545,645, 6,584,253, 6,028,974, 7,338,215, 4,516,830, 5,048,921, 6,338,579, 5,076,657, 4,580,874, EP1291694 and WO2017161185, previously incorporated by reference herein.

Communication couplings 124 may be provided about the wellsite 100 for passing data, power, control, and/or other signals therebetween. Communication couplings may be provided with on or offsite locations for operating the various equipment. The fiber optic system 122 may be usable as one or more of the communication couplings 124 for communication about the wellsite. The fiber optic system 122 may be used to provide the communication coupling between the various equipment above the wellsite, such as the sea floor equipment 120 and/or the surface unit 112, for passing data therebetween. The fiber optic system 122 may be part of or separate from the communication couplings 124. The sea floor equipment 120, 126 may be connected by a communication coupling in the form of a fiber optic harness 134.

The fiber optic system 122, communication couplings 124, and/or harness 134 may be used to provide the communication between the various equipment about the wellsite 100, such as the sea floor equipment 120, 126 and/or the surface unit 112, for passing data therebetween. The terminations 102 and/or sealed connectors 132*a,b* may be used to sealingly connect various portions of the wellsite, such as the communication couplings 124 and their respective equipment. The sealed connector 132*a,b* may be provided for connecting various equipment (e.g, the sea floor equipment 120, 126) and/or portions of the fiber optic system 122. Each end of the fiber optic harness 134 may be connected to the sea floor equipment 120, 126 by a sealed connector 132*a,b*.

The sealed connector 132*a,b* may also be coupled by a communication coupling 124 to the fiber optic termination 102. The sealed connector 132*a,b* may be used to removably connect equipment (e.g., sea floor equipment 120, 126), the termination 102, and/or other devices. The sealed connectors 132*a,b* each include a sealed plug 128*a,b* and a sealed receptacle 130*a,b* that are individually sealed, and jointly sealable when matably connected. The sealed connectors 132*a,b* are intended to maintain a seal about the communication links, such as cables and/or fibers, passing therethrough while unmated, during mating, and after mating is completed as is described further herein.

FIGS. 1B-2B show various views of the sealed connectors 132*a,b* in use with the fiber optic termination 102 and/or the fiber optic. system 122. As shown by these views, the sealed connectors 132*a,b* may be connected between portions of the fiber optic system 122 to provide a releasable connector that maintains a seal during connection and disconnection.

As shown in FIG. 1B, the fiber optic system 122 includes the source 114 coupled by the cable 121 to the termination 102. The termination 102 is removably connected to equipment 126 by the sealed connectors 132*a,b*. The communication system 122 is depicted as a fiber optic system 122 with optical fibers 222 extending through the cable 121 and into the termination 102.

The termination 102 in this example has a housing 328 and a fiber connection assembly 327. The fiber connection assembly 327 includes a storage base 334, a manifold 330, tube joints 323, and tubes 224, 324 to sealingly protect the optical fibers 222. The optical fibers 222 from the cable 121 extend into the housing 328, through the storage base 334, and through the manifold 330. The optical fibers 222 also pass through the cable tubes 224 and the termination tubes 324. Tube joints 323 are provided to seal about transitions between the tubes 224, 324 and/or components of the termination 102. The optical fibers 222 extend from the housing 328 in the termination tubes 324 for coupling to the sealed connector 132*a*. The termination 102 may provide a seal about the optical fibers 222 as described, for example, in WO2017161185.

Figure 2A:
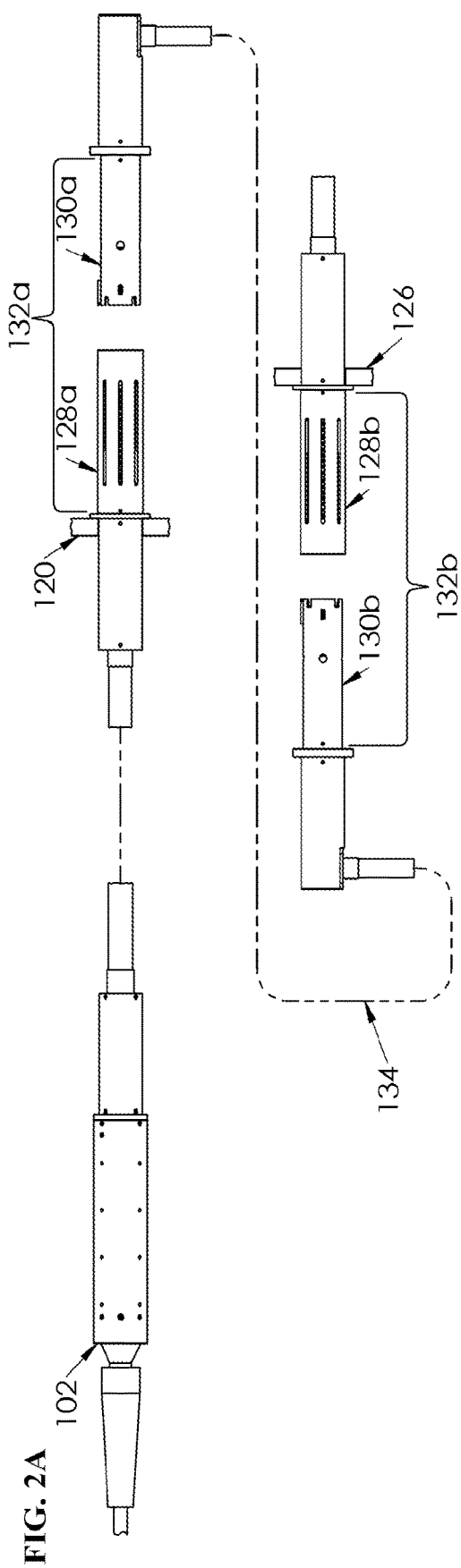
FIGS. 2A-2B are exploded and partial cross-sectional views of a protective termination with the sealed connector.

The sealed plug 128*a* of the sealed connector 132*a* is connected to an end of the termination 102. The sealed receptacle 130*a* is connected to a first end of the harness 134. When the sealed plug 128*a* and the sealed receptacle 130*a* are mated, signals from the optical fibers 222 may pass from the source 114, through the termination 102, and to the harness 134 via the sealed connector 132*a*. At least a portion of the termination 102 and the sealed connector 132*a* may be supported by the seafloor equipment 120 (FIG. 2A).

The sealed receptacle 130*b* of the sealed connection 132*b* is connected to a second end of the harness 134. The sealed plug 128*b* is connected to the seafloor equipment 126. A portion of the housing 328*d* of the termination 102 may be positioned between the sealed plug 128*a* and the sealed receptacle 130*b*. When the sealed plug 128*b* and the sealed receptacle 130*b* are mated, signals from the optical fibers 222 may pass to from the harness 134 to the sea floor equipment 126 via the sealed connection 132*b*.

Figure 2B:
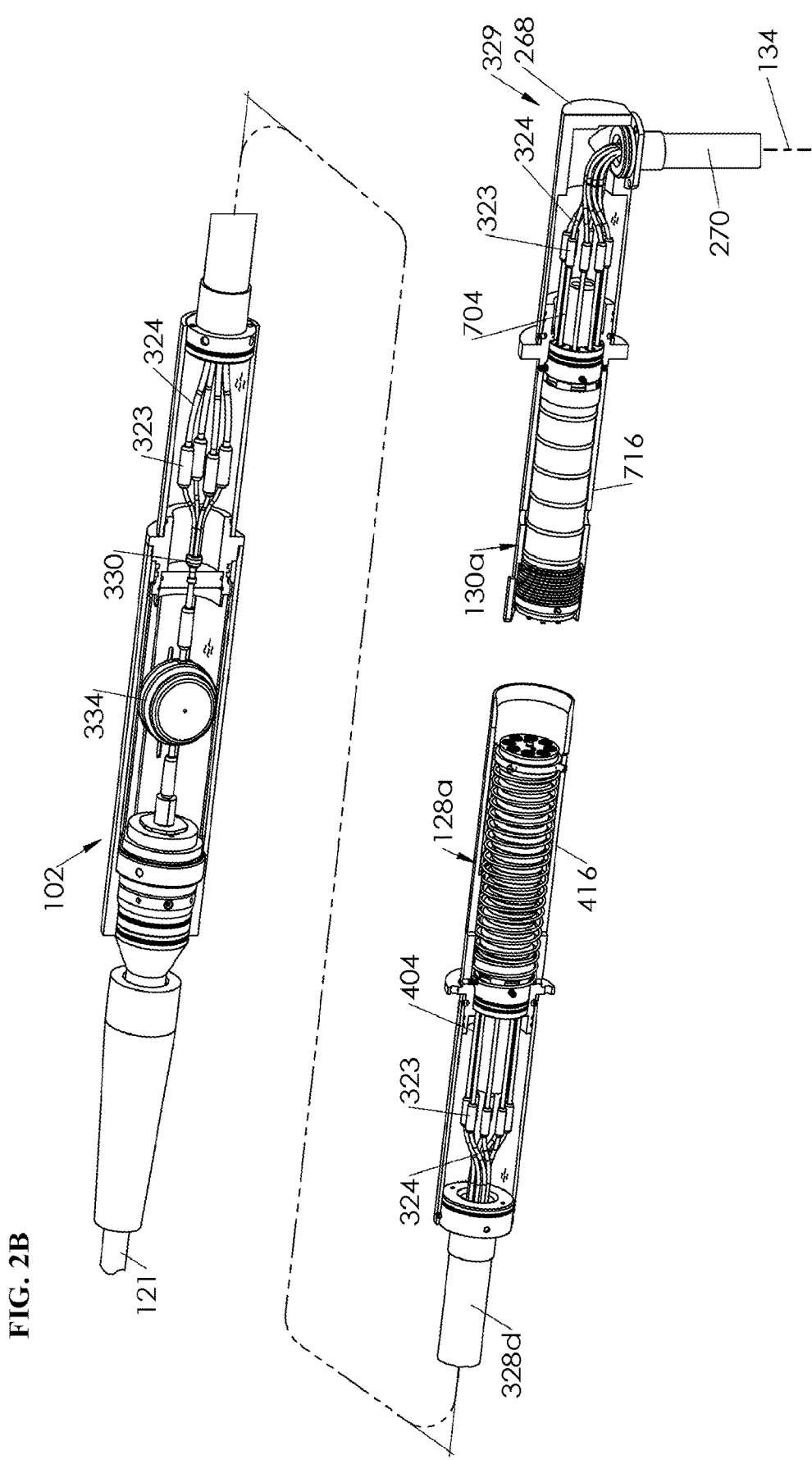

As shown in FIG. 2B, the sealed plug 128*a* has a plug housing 416 sealingly connectable to the termination 102, and contacts 404 sealingly and operatively connectable to the tubes 324 by tube joints 323 with the optical fibers (e.g., 222 of FIG. 1B) therein. The receptacle 130*a* has a receptacle housing 716 and contacts 704 sealingly and operatively connectable to the tubes 324 and tube joints 323 of a harness connector 329. The harness connector 329 includes a connection housing 268 and flexible housing 270 that connects the sealed receptacle 130*a* to the harness 134 to pass the optical fibers therethrough. The contacts 404 of the sealed plug 128*a* and the contacts 704 of the sealed receptacle 130*a* are protectively sealed.

The configuration of FIGS. 1A 2B show a sealed environment for passing the optical fibers 222 of the optical cable 121 from the source 114 to the various equipment 120, 126. The optical fibers 222 are protected within the sealed housing 328 and protective tubes 224, 324 as they pass through the termination 102. The optical fibers 222 may be seal ugly connected to contacts 404 in the sealed plug 128*a* and contacts 704 of the sealed receptacle 130*a*, respectively. The sealed plug 128*a,b* and sealed receptacle 130*a,b* also maintain a seal about contacts 404,704 prior to and during connection to maintain fluid isolation about the optical fibers 222 and the contacts 404,704 as is described further herein.

Connector Assembly

FIGS. 3A-3D show the sealed connector 132a in various positions including an unmated, engaged, triggered, and mated position, respectively. As shown in these views, the sealed plug 128a and the sealed receptacle 130a each include the housing 416,716, the contacts 404,704, tine assemblies 406,706, push rod (trigger') 408,602, and bladders 411,711 as will be described further herein. For introductory purposes, a sealing operation of sealed connector 132a is introduced briefly here.

Figure 3A:
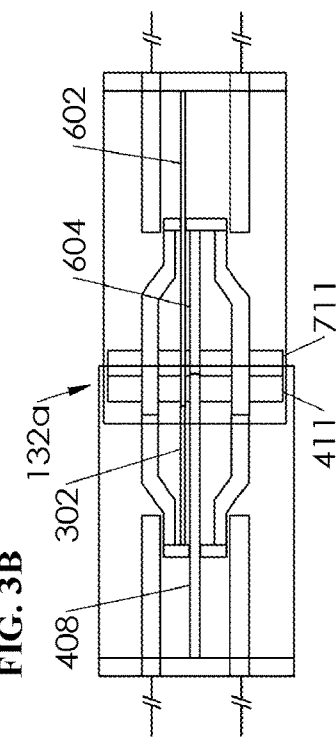
FIGS. 3A-3D are schematic diagrams of a portion 3 of FIG. 1B depicting the sealed connector including a sealed plug and a sealed receptacle in an unmated, engaged, triggered, and mated position, respectively.
Figure 3B:
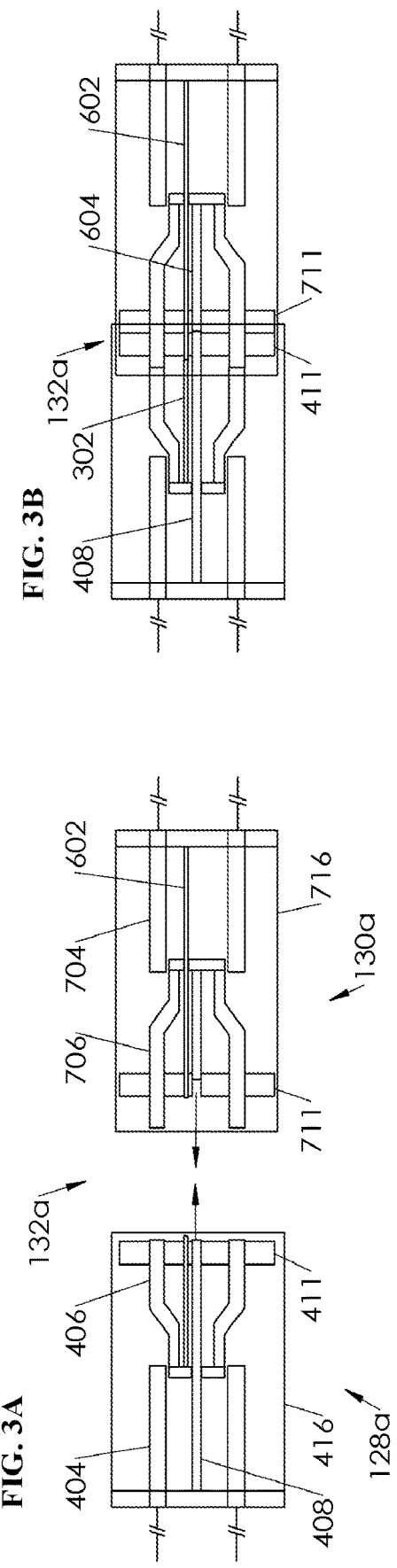
Figure 3C:
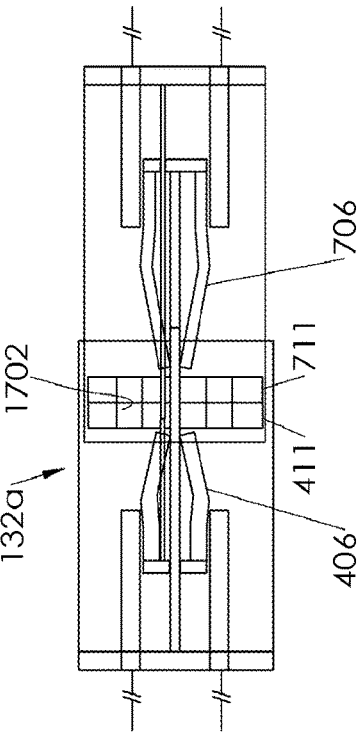
Figure 3D:
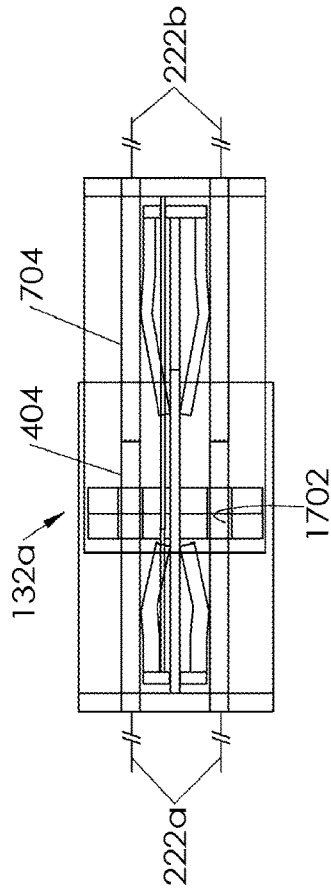

When unmated (FIG. 3A), the tine assemblies 406, 706 are in an expanded position and the contacts 404, 704 are sealed within the housings 416, 716. When the sealed plug 128a and the sealed receptacle 130a engage (FIG. 3B), push rods 408,602 engage with their respective mating tine rods 604, 302 in a sequence in conjunction with the bladder 411 engagement and movement of the bladder 711 to create a seal between the sealed plug 128a and the sealed receptacle 130a. The push rods 408, 602 push the respective mating tine assemblies 706, 406, which are shifted to a collapsed position in conjunction with the sealed bladder 411 moved by sealed bladder 711 to create a passageway 1702 therebetween (FIG. 3C). Once the tine assemblies 406, 706 are collapsed, the contact 404 is brought, via the passageway 1702, to mating engagement with contact 704. Now mated, communication passes through the mated sealed connector 132a and between the optical fibers 222a,b (FIG. 3D).

1. Plug

FIGS. 4A-4D show detailed views of the sealed plug 128 (which may be the sealed plug 128a an for 128b). As shown in these views, the sealed plug 128 includes the housing 416 and the internal assembly 417. The internal assembly 417 includes the plug support 402, the plug bladder assembly 410, the plug push rod 408, the plug contacts 404, and the plug tine assembly 406. An internal chamber 420a is defined within the housing 416. The internal assembly 417 is disposed in the internal chamber 420a of the plug housing 416, and is supported by the plug support 402.

The housing 416 is a tubular member with an internal chamber 420a defined therein. The housing 416 has a connection end 4172 to sealingly receive the support 402, and a keyed end 4164 to receive the sealed receptacle 130. The keyed end 4164 has a bevel 4173 that tapers away from the connection end 4172 and has a keyway 4176 therein to receivingly engage the sealed receptacle 130. O-rings may be provided about the housing 416 to seal the support 402 with the housing 416. Locks 415 may be inserted through the housing 416 and into the support 402 to secure the support 402 to the housing 416.

As shown in FIGS. 2B and 4A-4D, the housing 416 and the support 402 are shaped to receivingly connect to the termination 102. The housing 416 may sealingly engage the housing 328 of the termination 102 (FIG. 2B). The housing 416 is a tabular member having a flange 4170 extending from an outer surface thereof. The flange 4170 is positioned adjacent to connection end 4172 to receivingly engage the housing 328 of the termination 102. A portion of the housing 416, such as the connection end 4172, may extend into the housing 328 of the termination 102.

The housing 416 has a stepped inner surface with steps 4166, 4168, and 4178 defined therein. The steps 4168 and 4178 are shaped to receive the support 402. A bore 4162 is defined between the steps 4168, 4178 to engage the support 402. The step 4166 is shaped to act as a hard-stop to prevent over-travel of the sealed receptacle 130 as it enters the housing 416. The housing 416 also has longitudinal slots 4174 extending therethrough.

The plug housing 416, support 402, and/or other portions of the sealed plug 128 may be a unitary or modular components made from materials capable of, for example, withstanding various operations, such as assembly, handling, installation and/or in-service loading (e.g., loading from the harsh environment, connector mating), corrosion resistance (e.g., to sea water), and/or compatibility with the operating environment and/or other components in physical and/or electrochemical contact with the sealed plug 128. The plug housing 416, support 402 may be made of a variety of materials, such as metallic (e.g., stainless steel, nickel, chromium, titanium, alloy (e.g., corrosion resistant metal alloys, super duplex stainless steel alloys, titanium alloys, nickel and chromium based alloys and/or austenitic stainless steel alloys, cathodic protected metals, etc.), etc.), non-metallic e.g., polymer, plastic, nylon, ABS Acrylonitrile Butadiene Styrene (ABS), PE—Poly Ethyelene (PE), PET—Poly Ethylene Terepthalate (PET), PBT—Poly Butylene Terepthalate (PBT), PTFE—Poly Tetra Fluoro Etyhylene (PTFE), PEI—Poly Ether Imide (PEI), PEEK—Poly Ether Ketone (PEEK), etc.) and/or other materials and/or combinations thereof of various grades (e.g., rigid composites of metallic and/or nonmetallic materials). Coatings, corrosion protection, and/or other materials may be applied or integrated into the sealed plug 128.

FIG. 5 shows a perspective view of the support 402. As shown in FIG. 5, the support 402 includes a cylindrical portion 4021 having ends with smaller outer diameters extending from each end thereof. The outer diameters of the support 402 define a stepped outer surface shaped to extend into the housing 328 of the termination 102 at one end and into the housing 416 at the other end. As shown in FIG. 4D, the support 402 has an inner surface defining an inner chamber 419 and an internal shoulder 4035 (FIG. 4C) therein.

Referring back to FIG. 5, the cylindrical portion 4021 has shoulder 4027 shaped to seat along the step 4178 of the housing 416. The cylindrical portion 4021 also has holes 4023 extending therethrough to receive the locks 415 (FIG. 4C). Grooves 4022 are positioned along an outer periphery of the cylindrical portion 4021 to receive the bladder 411 (FIG. 4C) thereon. The support 402 has a bore 4030 therein, and bores 4026 positioned radially about the cylindrical portion 4021. A tapered inlet (or bevel) 4032 is positioned at an end of the bore 4030.

Referring to FIG. 4C, the support 402 supports various components, such as the contacts 404, the bladder assembly 410, the push rod 408, and the tine assembly 406. An example contact 404 is shown in greater detail in FIG. 6. The contacts 404 include a ferrule 192, a front portion 194, a rear portion 196, and a middle portion 198. The ferrule 192 may have a tip matingly receivable by the contact 704 of the sealed receptacle 130 for communication therebetween as is described further herein. The ferrule 192 may be commercially available from THORLABS™ at www.thorlabs.com. Example contacts and/or ferrules are disclosed in US2017022807, previously incorporated by reference herein. The ferrules used herein may be, for example, mechanical transfer (MT) ferrules usable with plural fibers and/or a cylindrical ferrule for hosting a single fiber. The MT Ferrule may replace a single fiber ferrule to provide multiple (e.g., 12) circuits. The geometry of the bladder assembly 410, the tine assembly 406, and the contacts 404 may be sized for use with the MT ferrule.

The middle portion 198 has sealing grooves and a seating shoulder receivable in the support 402. The rear portion 196 may be sealingly connected to a communication link, such as optical fiber 222, for communication therewith. The rear portion 196 may also be coupled to a termination tube 324 disposed about the optical fiber 222 (FIG. 2B).

Referring back to FIGS. 4C-4D, the contacts 404 are linear members seated in the support 402 at the internal shoulder 4024. The bores 4026 are shaped and positioned to receive the contacts 404 therethrough. While the eight bores 4026 are depicted to correspond to eight contacts 404, various numbers of bores and contacts may be used.

The contacts herein may be, for example, angle polish ferrule contacts and/or polish/ultra polish ferrule contacts for use with a single fiber. The contacts may be used with a sealed plug 128 and/or sealed receptacle 130 with a corresponding angled orientation with matching angled ferrule face for mating. Examples of contacts that may be used are disclosed in US2017022807, previously incorporated by reference herein.

The contacts used herein may be made of a variety of materials, such as metallic, plastic, alloy, and/or other materials. For metal material contacts, the contact may be machined as single piece or joined from multiple pieces. Joining methods include bonding, laser beam welding, welding, ultrasonic welding, electron beam welding, brazing, soldering, casting by post processing machining, and/or other connection method and/or means. Coatings, corrosion protection, and/or other materials may be applied or integrated.

As shown in FIG. 4D, the contacts 404 may be fixed to the support 402 by one or more retainers, such as discrete collars 1202. Each collar 1202 may be made out of a material, such as metal or plastic, capable of securing the contacts 404 in the support 402. The collar 1202 may be positioned to retain the contact 404 in place in the axial direction inside the bore 4026. As shown in greater detail in FIG. 7, the collar 1202 is a "C" shaped component having tapered ends. An inner surface of the collar 1202 is shaped to engage and retain the middle portion 198 of the contact 404. An outer surface of the collar 1202 is shaped to seat within the bore 4026. The collar 1202 may also be an internal retaining ring (not shown), such as a ring commercially available from SMALLEY STEEL RING CO.™ at www.smalley.com.

Referring to FIGS. 4A-4D and 8, the bladder assembly 410 includes a bladder 411, a disc 4112, and a seal plate 412. The bladder 411 has a tubular body with a chamber 420b defined therein. The tubular body has a support end 4102 with a bladder lip 4104 and a seal end 4106, with a ribbed middle portion 4108 therebetween. The bladder 411 may be made of a flexible material (e.g., elastomer) that may be stretched as needed, and/or metallic to endure extreme temperature applications. The middle portion 4108 may be in the form of bellows that compress and de-compress under axial movement or force with marginal change in outer and inner diameter.

The seal end 4106 of the bladder 411 extends into the housing 416 towards the keyed end 4164 of the housing 416. The seal end 4106 (with or without the disc 4112) may be secured to the seal plate 412. The disc 4112 and the seal plate 412 may be circular members that are integrally formed with bladder 411, or secured together by bonding material (e.g., epoxy), or other means.

The disc 4112 may be secured to the seal end 4106 of the bladder 411 or integrally formed therewith. The disc 4112 has sealing surfaces (or cylindrically shaped holes) 4116, 4118 therethrough and nipples 4120 positioned radially about a face of the disc 4112. The sealing surfaces 4116, 4118 extend through the disc 4112 and the sealing end of the bladder 411. The nipples 4120 are circular members extending through the disc 4112. A shaft sealing surface 4122 surrounded by a convex face seal 4114 is positioned about each of the nipples 4120. Face seal 4114 include an inner ring formed on the nipple and outer ring formed on the disc 4112. The face seals 4114 are shown as integrally molded in the plug bladder 411. In some cases, the face seal 4114 may be a separate seal that is bonded to the sealing face on the disc 4112 and the nipple 4120 of the plug bladder 411.

Figure 9C:
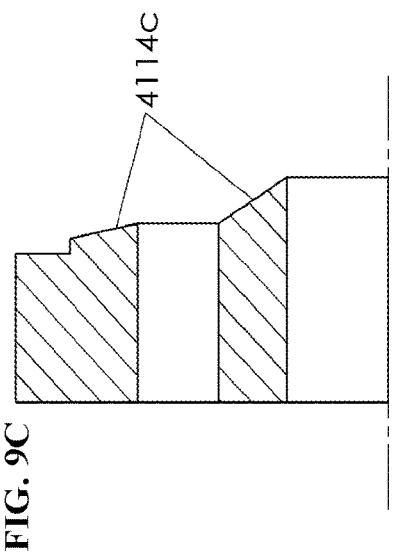
FIGS. 9A-9C are partial cross-sectional views of face seals of the plug bladder assembly.
Figure 9B:
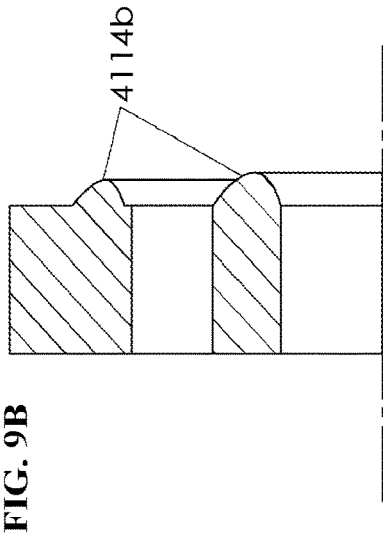
Figure 9A:
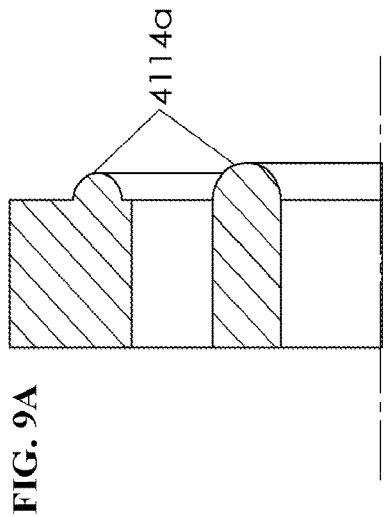

FIGS. 9A-9C show various configurations of the face seals 4114a-c. As shown in these figures, the face seal 4114a-c may have various cross-sectional shapes, such as symmetric convex, outwardly shaped parabola and simple taper, respectively. Other shapes and configurations of seals may be used about the disc 4112 and/or, seal plate 412.

Referring back to FIGS. 4C and 8, the seal plate 412 is positionable adjacent the disc 4112. The seal plate 412 has corresponding holes radially positioned for alignment with the nipples 4120 and face seals 4114. A central bore 4125 extends through the seal plate 412. Guide pins 422 extend radially from the seal plate 412 for engagement with the plug housing 416. The seal plate 412 seals with the seal end 4106 of the bladder and to disc 4112 to form a seal thereabout.

Figure 10:
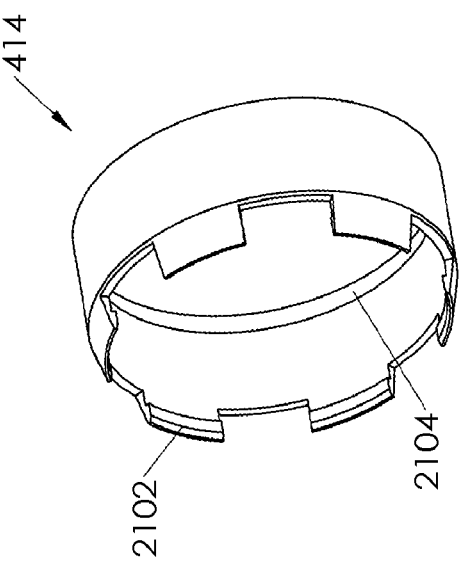
FIG. 10 is a perspective view of a retainer ring.

The support end 4102 of the bladder 411 is supported between the housing 416 and the support 402. The support end 4102 of the bladder 411 stretches over a sealing shaft groove 4022 in the support 402. A retainer ring 414 is positioned in the support 402 about the support end 4102 to secure the bladder 411 about the support 402. As shown in greater detail in FIG. 10, the retainer ring 414 may be a tubular structure with collets 2102 extending from one end. The collets 2102 may spreads outwards when slid into position about the support 402 and bladder 411. The retainer ring 414 has an inner taper 2104 to receive the bladder 411. The retainer ring 414 may be made from material with memory (i.e., ductile materials) providing compliant action of the collets 2102.

Referring back to FIGS. 4B-4D, a spring 424 is disposed between the seal plate 412 and the step 4168 of the housing 416. The spring 424 may be used to bias the bladder 411 towards its base position near the connection end 4172 of the housing 416. The guide pins 422 are slidingly received within the longitudinal slot 4174 of the housing 416 as the bladder 411 and seal plate 412 move during operation. The longitudinal slot 4174 may act as a stop to define a travel distance of the bladder 411 and seal plate 412. The slot 4174 may be shaped to act as a hard-stop to prevent over-travel of the bladder 411 and seal plate 412.

The support 402 has ports 4034 extending through an end thereof. The ports 4034 have access plugs 418 with an o-ring seal that may be removable for filling a chamber 419 defined in bore 4030 in support 402 and the chamber 420b in bladder 411 with a compressible fluid (e.g., oil, grease, gel, and/or other compatible fluid). The plug 418 may seal port 4034 and chambers 419 and 420b from ambient pressure. When the ambient pressure of the environment is experienced by the bladder 411, the bladder 411 may flex tinder the ambient pressure. The fluid in the chambers 419, 420b may compress until pressure in the chambers 419, 420b equalizes to the ambient pressure. The bladder 411 may be used to pressure balance the sealed plug 128 to the ambient environment. This pressure balancing may be performed without the sealed plug 128 being subject to differential pressure load.

Referring to FIGS. 4B-4D and 11A-11B, the tine assembly 406 is supported in the support 402 and extends into the bladder 411. The tine assembly 406 includes a tine base 802, tines 804, and tine rods 302. The tine base 802 is a perforated, cylindrical member slidingly supported in the bore 4030 of the support 402. The perforations in the tine base 802 provide a path for the fluid to pass between the bore 4030 and the chamber 420b. A spring 426 is positioned in chamber 419 of the support 402 and extends into the tine base 802, The spring 426 seats against an end face 4036 of the support 402. The tine base 802 is slidably movable about the support 402 upon external force on the spring 426.

Figure 11A:
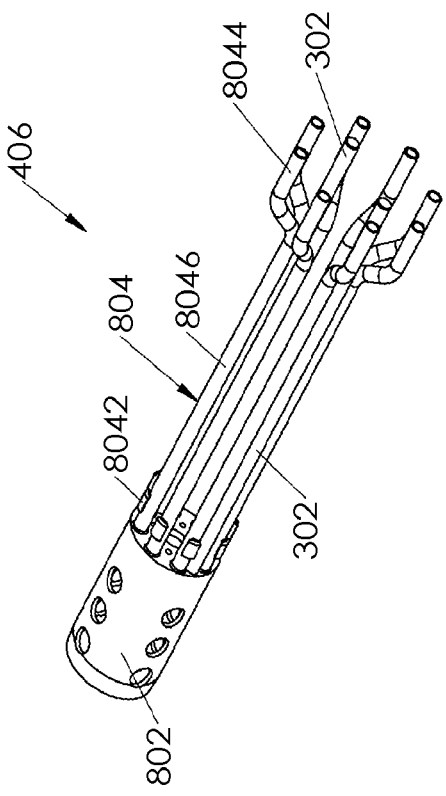
FIGS. 11A and 11B are perspective views of a plug tine assembly in an expanded and collapsed position, respectively.
Figure 11B:
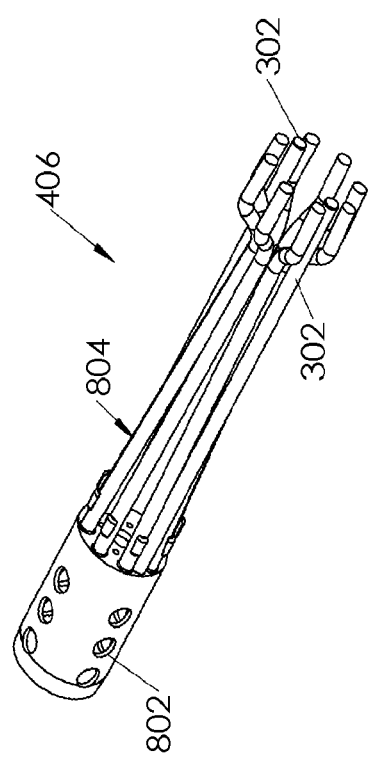

The tines 804 and the tine rods 302 are connected at one end to the tine base 802, The tines 804 include linear arms 8046 extending from the tine base 802 and curved fingers 8044 positioned adjacent the seal plate 412. Tabs 8042 are positioned near the tine base 802. The tines 804 and the tine rods 302 may be movable with the base 802 in response to force on the spring 426. The tines 804 may be movable between an expanded position with the fingers 8044 spread apart (FIG. 11A), and a collapsed position with the fingers 8044 closed together (FIG. 11B).

In the expanded position, the fingers 8044 are positioned with the lingers 8044 in sealing contact with or adjacent the sealing surface 4122 and seal plate 412. In the expanded position, the fingers 8044 are positioned between the contacts 404 and the seal plate 412. In the expanded position, the tines 804 block the contacts 404 from passing through the seal plate 412.

In the collapsed position, the fingers 8044 move together toward the push rod 408 located centrally therebetween. In the collapsed position, contacts 404 have clear passage through the seal plate 412 for connection with the sealed receptacle 130. In the collapsed position, the fingers 8044 move away from sealing surface 4122 and the bore 4125 in the seal plate 412 to allow the contacts 404 to pass through the seal plate 412 as the seal plate 412 is pushed toward the contacts 404 by the mating sealed receptacle 130 (see, e.g., FIG. 3B). The tines 804 collapse due to the tab 8042 engagement with the tapered inlet 4032 of the support 402. The tines 804 collapse and translate toward the end face 4036 of the support 402. Once force on the spring 426 is removed, the tines 804 return to the expanded position when the tab 8042 exits the bore 4030.

The tine rods 302 are secured to the tine base 802 adjacent the tines 804. The tine rods 302 are linear members with ends positionable in sealing contact with or adjacent the sealing surface 4118 and seal plate 412. During operation, the tine rods 302 extend through sealing surface 4118. During expansion and collapse of the tines 804, the tine rods 302 translate linearly with movement of the tine base 802.

Portions of the tine assembly 406, such as tines 804, may be unitary members or segmented as shown. While the anus 8046 are shown being linear and the fingers 8044 curved, part or all of the tines 804 may have a variety of shapes, such as linear, curved, cylindrical, rectangular cross-section, flat, and/or other shapes profiled for effective sealing. For example, the tines may have a flat rectangular cross-section with linear aims 8046 and outward bent fingers 8044 with or without curvature.

The tine assembly 406 may be made of one or more materials to provide the desired movement during operation. The tine assembly 406 may be made of a variety of materials, such as metallic, plastic, and alloy materials. For metal or nonmetal tine assembly, the material may be selected from material groups that exhibit memory resilience. Example material include spring steel, hastelloy, titanium-molybdenum alloy, live hinge plastic such as polypropylene. Resiliency may also be achieved by forming at least a portion of the tine assembly 406, such as portions of the arms 8046 near the tine base 802, as a helical spring or other compliant formed shape. Part or all of the tine assembly 406 may also have a coating.

The tine assembly 406 may be integrally formed or modularly connected. Portions of the tine assembly 406 may be joined by bonding, laser beam welding, welding, ultrasonic welding, electron beam welding, brazing, soldering, and/or other connection method and/or means. The tine assembly 406 may be manufactured from casting, injection molding, fabrication process, and/or other means. For fabricated tine assembly 406, the tine base 802 may be machined, and the tines 804 may be bent to shape from machined rod.

While the tine assembly 406 is depicted with a specific arrangement of a given number of tine rods 302 and tines 804, the arrangement and number may vary. Other actuators may be used to trigger the tine assembly 406, such as the push rod 408. The tine assembly 406 may employ flexing structures, and/or link mechanism with multi-segmented tines that collapse and retract with external actuation. A front face of the tine fingers 8044, push rods 408, and/or tine rods 302 may be used to affect precise timing of movement of relative mechanisms. This may be used to account for any spring lag.

The push rod (trigger) 408 has an end supported in the support 402, and another end extending, through the bladder assembly 410. The push rod 408 is positioned (e.g., centrally) between the tines 804. The push rod 408 may remain fixed as the seal plate 412 and the seal end 4106 of the bladder assembly 410 travels back and forth about the push rod 408. The push, rod 408 has tabs 4082 extending radially therefrom for engagement with the tine base 802. The tabs 4082 limit travel of the tine base 802 towards the end 4164, and retains the tine base 802 about the bore 4030 of the support 402.

The springs 424, 426 used in the sealed plug 128 may be compression springs to bias the bladder assembly 410 and tine assembly 406 between an unmated fully sealed position and a mated sealed position. A spring rate for springs 424 and 426 may be chosen to suit the connector mating mechanism, kinetics, sequence, etc. Additionally, the spring lengths may be defined to provide a free length of the uncompressed spring with pre-load forces as needed to maintain the bladder assembly 410, seal plate 412, tines 804, and tine rods 302 in sealing engagement when the sealed plug 128 is in its unmated state.

While the springs 424, 426 are shown as compression springs for providing the bias needed, one or more other types of springs, such as a disc spring, may be used. For example, spring 426 may be replaced with a disc spring while spring 424 may be a compression spring. One or more springs may be used to achieve desired bias for a specific component. The springs 424, 426 may be made from variety of materials, such as metallic, plastic, and alloy. Coatings, corrosion/anti-fouling protection, and/or other materials may be applied to the spring.

The sealed plug 128 may be assembled in various ways. For example, assembly may begin by pre-assembling the internal assembly 417. This pre-assembly may begin by coupling one or more contacts 404 to a fiber optic pig tail 222 of determined length. Each of the contacts 404 (with pig tail 222) may be passed through respective bores 4026 of the support 402 and seated therein by the collar 1202. Seals, such as o-ring type gland seals, may be used to seat the contacts 404 within the bores 4026.

The tine assembly 406 may be pre-assembled with the tines 804, tine rods 302, and tabs 8042 connected to tine base 802. An end of the tine spring 426 may be inserted into the tine base 802. Initially, the spring 426 may be in an uncompressed state with the inserted tine assembly floating over it. The spring 426 and tine assembly 406 may then be positioned into the bore 4030 of the support 402. The tine assembly 406 may be adjusted to suit a desired orientation about the seal plate 412 and the bladder 411. Alignment and orientation features may optionally be added to the tines 804 and tine rods 302 to maintain the tine assembly 406 in a predefined orientation needed for assembly and connector operation.

The push rod 408 is inserted through the tine base 802 and the array of tines 804. The tabs 4082 on the push rod 408 are pressed against the tine base 802 thereby compressing the tine spring 426. The push rod 408 may be pressed into position while aligning the tine base 802 within the bore 4030 of the support 402. After some movement and compression, an end of the push rod 408 may be fixedly threaded into the end face 4036 of the termination portion.

Before inserting the bladder assembly 410, the bladder 411 may be positioned inside out or stretched for installation. The end 4106 of the bladder 411 may be positioned adjacent ends of the tines 804, tine rods 302, and the push rod 408. The bladder 411 may slide over the tines, tine rods 302, and the push rod 408 as they are inserted into the bladder 411 until fully seated with disc 4112. Sealing may be established between tine fingers 8044 and the sealing surfaces 4122. Similarly sealing may also be established between the tine rods 302 and the push rod 408 with the sealing surfaces 4118, 4116, respectively.

Pressure tight sealing may be affected by selecting diameters of the sealing surfaces 4122, 4118, 4116 that are smaller than a diameter of tine finger 8044, tine rod 302, and the push rod 408, respectively, thereby stretching the respective sealing surfaces over respective rods during seating. A seal/bladder and the rod interface (or sealing interface) may be provided with a constant compressive load as a result of the stretch and constriction of the bladder 411 within the sealed plug 128. A magnitude of stretch that may be used may be based on a net differential pressure across the sealing interface, as well as other ambient conditions. The chambers within the sealed plug 128 may be in pressure equilibrium or pressure balanced with the ambient environment such that a net differential pressure across the sealing interface may be marginal. The diameters of the rods and sealing surfaces may be suitably chosen to achieve the required stretch and effective pressure seal for the specific ambient conditions.

With the bladder 411 positioned over the tine assembly 406, the bladder 411 may be seated on the sealing shaft groove 4022 of the support 402. The bladder 411 may be temporarily locked in place from the stretched seating over groove 4022 and by seating the bladder lip 4104 about the support 402. The retainer ring 414 is slid over the bladder 411 and secured to the support 402 about the bladder 411. During the sliding, the collets 2102 may spreads and ride over the outer diameter of the support 402, and the inner taper 2104 may compress the bladder 411 without unseating it. Further axial movement of the retainer ring 414 may continue to compressively engage the inner surface over the bladder 411 until the collets 2102 spring back into the grooves 4022 on the support 402.

With the internal components of the sealed plug 128 formed into the pre-assembly, the housing 416 may be positioned about the internal assembly 417. For example, the housing 416 may be preinstalled with the spring 424 compressed to its predetermined preload length and held in place by a removable temporary mounting fixture or other assembly aid. The pre-assembly may be aligned and oriented for insertion into the housing 416. The pre-assembly may be inserted into the housing 416 through end 4164.

In another example, the pre-assembly may be held stationary while the housing 416 may be slid over the internal assembly 417. As the pre-assembly is inserted further, the support 402 of the internal assembly 417 begins to engage with the bore 4162 of the housing 416. The support 402 advances and seats at the step 4178 and seals with the seals along the bore 4162 to establish sealing engagement between the housing 416 and the support 402. Fasteners, such as the locks 415 and the guide pins 422, may be used to secure the assembled sealed plug 128. The locks 415 may be inserted through the housing 416 and the support 402. The guide pins 422 may be attached to the seal plate 412 through the longitudinal slots 4174 of the plug housing.

While example techniques for assembly are described, various assembly procedures may be used. For example, one or more portions of the assembly and/or pre-assembly may be performed in various orders.

Receptacle

The sealed receptacle 130 (which may be the same as sealed receptacle 130a,b) is shown in greater detail in FIGS. 12A-12D. The sealed receptacle 130 is similar to the sealed plug 128 with some variations to allow for mating and operation with the sealed plug 128. As shown in these views, the sealed receptacle 130 includes the housing 716 and the internal assembly 717. The internal assembly 717 includes the receptacle support 702, the contacts 704, the bladder assembly 710, a push rod (trigger) 602, and the tine assembly 706. The components of the sealed receptacle 130 correspond to the components of the sealed plug 128 for sealed connection and operation therewith. The components of the sealed receptacle 130 may be made from the same materials as the corresponding components of the sealed plug 128.

As shown in FIG. 2B and 12A-12D, the housing 716 and the internal assembly 717 are similar to the housing 416 and internal assembly 417 of the sealed plug 128. In this case, the sealed receptacle 130 is shaped for connection to the harness 134 at one end and the sealed plug 128 at another end.

The housing 716 is similar to the housing 416, except that the housing 716 has a seal end 7164 receivable by the sealed plug 128, and a connection end 7172 connectable to equipment (e.g., harness 134). Also, the housing 716 has a short slot 7175 and holes 7176 therethrough. The holes 7176 may be provided for supporting a connector retention mechanism as is described further herein.

Like the plug 128, the housing 716 is a tubular member with a flange 7170 extending from an outer surface of the housing 716. The flange 7170 is positioned adjacent connection end 7172, and has holes 7174 to receivingly engage the harness 134. The flange 7170 and a connection end (rear shaft) 7172 may be shaped for interface fit with the harness 134 onto which the sealed receptacle 130 is to be mounted. A chamber 720a is defined within the housing 716. Like the plug housing 416, the receptacle housing 716 and/or its portions may be a unitary or modular component made from similar materials with or without coatings.

The connection end 7172 sealingly receives the support 702 into the chamber 720a. The housing 716 has a stepped inner surface with steps 7168, and 7178 defined therein. The step 7178 is shaped to receive the support 702. As with the plug 128, the receptacle 130 may be provided with o-rings about the housing 716 to seal the support 702 with the housing 716. Locks 715 may be inserted through the housing 716 and into the support 702 to secure the support 702 to the housing 716.

The sealed receptacle 130 is also provided with a key 7166 matingly receivable in the keyway 4176 of the sealed plug 128. The orientation key 7166 is connected to (e.g., by interference fit, threads, etc.) or integral with the housing 716. The orientation key 7166 may be positioned about the seal end 7164 for receipt in keyway 4176 of the sealed plug 128. The orientation key 7166 may be used to define an aligned position for connection of the sealed plug 128 and the sealed receptacle 130 during mating.

Figure 13:
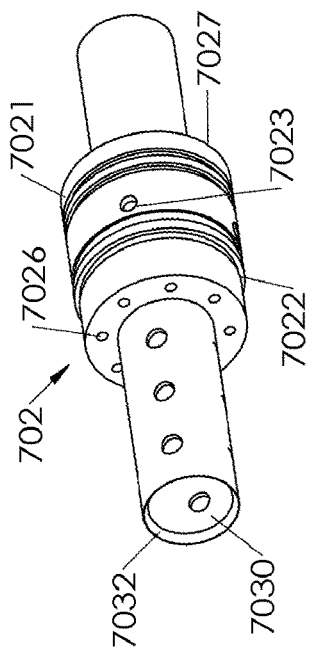
FIG. 13 is a perspective view of a receptacle internal support.

FIG. 13 shows a perspective view of the support 702. Like the support 402 of FIG. 5, the support 702 includes a cylindrical member 7021 having smaller diameter ends extending from each end thereof, a bore 7030 therein, a taper (chamfer) 7032 at an entry end, a stepped outer surface defining a shoulder 7027 shaped to engage the step 7178, holes 7023 to receive the locks 715, grooves 7022 to receive the bladder 711 thereon, and bores 7026 to receive the contacts 704.

Figure 14:
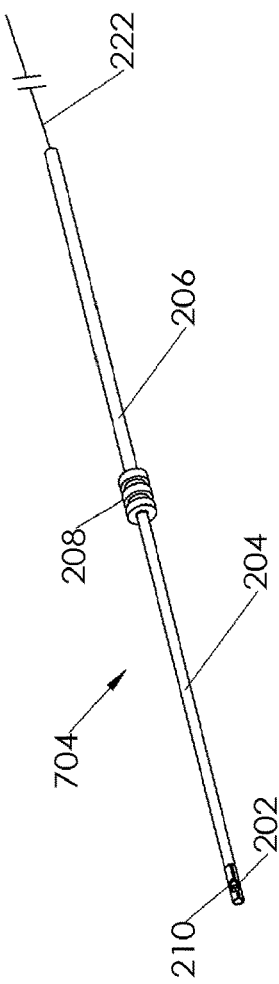
FIG. 14 is a perspective view of a receptacle contact.

The support 702 supports various components in the housing 716, such as the contacts 704, the bladder 720, the push rods 602, and the tine assembly 706. An example contact 704 is shown in greater detail in FIG. 14. The contacts 704 include a ferrule 202, a ferrule sleeve 210, a front portion 204, a rear portion 206, and a middle portion 208. The ferrule sleeve 210 may have a slot to matingly receive the ferrule 192 of the contact 404 in the sealed plug 128 for communication therebetween. The middle portion 208 has sealing grooves and a seating shoulder receivable in the support 702. The rear portion 206 may be sealingly connected to a communication link, such as optical fiber 222, for communication therewith.

Figure 7:
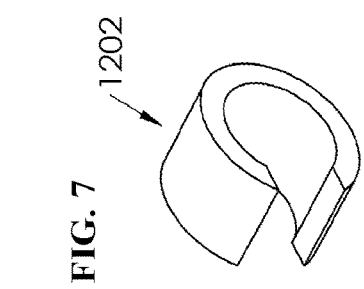
FIG. 7 is a perspective view of a contact collar.

As with the contacts 404, the contacts 704 may be linear members made of similar materials using similar techniques. The bores 7026 in the support 702 are shaped and positioned to receive the contacts 704 therethrough. The contacts 704 are seated in the receptacle support 702 at shoulder 7024. The contacts 704 may he fixed to the sealed receptacle 130 by one or more retainers, such as the collar 1202 (FIG. 7). A contact spring 1404 may be provided about the collars 1202 to allow biasing of contacts 704 when in mating engagement with contact 404. The contact spring 1404 allowing the contact 404 to move, thereby making the contact spring 1404 compliant.

Referring to FIGS. 12A-12D and 15, the bladder assembly 710 includes a bladder 711, the disc 7112, and the seal plate 712 similar to the corresponding items in the sealed plug 128. The bladder 711 has a support end 7102 with a bladder lip 7104 and a seal end 7106, with a ribbed middle portion 7108 therebetween. A central bore 7125 extends through the seal plate 712.

The disc 7112 has sealing surfaces (or cylindrically shaped holes) 7116, 7118, nipples 7120, and face seals 7114 and sealing surfaces 7122. The sealing surfaces 7116, 7118 extend through the disc 7112 and the sealing end of the bladder 711. The bladder 711 has a chamber 720*b* defined therein. Like chamber 420*b*, the chamber 720*b* may be filled with fluid through port 7034 with plugs 718 and pressure balanced.

In this version, the middle portion 7108 of the bladder 711 has rib sections 7109, 7110. The rib section 7109 may be in the form of bellows that compress and de-compress under axial movement or force with marginal change in outer and inner diameter. The rib section 7110 is a straight tubular section with longitudinally spaced circular beads 7111 for structural support.

Like the bladder 411, the bladder 711 is secured at one end in between the housing 716 and the support 702 by the retainer ring 414 (FIG. 8) and at the other end by seal plate 712. In this version, the bladder lip 7104 is seated over groove 7022 and secured by the retainer ring 414. The seal plate 712 may have guide pins 722 that are slidingly received within the short slot 7175 of the housing 716 as the bladder 711 and a seal plate 712 move during operation.

Like spring 424, a spring 724 is positioned around bladder 711 between the seal plate 712 and the step 7168. The step 7168 is shaped to act as a hard-stop in conjunction with compressed spring 724 to prevent over-travel of bladder assembly 710 during triggering of tine assembly 706 by the plug push rod 408. In this version, the spring 724 is positioned between the seal end 7164 and the contacts 704. The spring 724 is also positioned about the rib section 7109 of the bladder 711, thereby providing limited travel for the rib section 7109 and seal plate 712 therebetween. The spring 724 may extend partially around the rib section 7110 of the bladder 711, thereby allowing the rib section 7110 to remain stationary.

Referring to FIGS. 12C-12D and 16A-16B, the tine assembly 706 is similar to the tine assembly 406. In this version, the tine assembly includes a tine base 902, tines 904, and tine rod 604. As with the tines 804, the tines 904 have arms 9046 with fingers 9011 that move between the expanded position to block the contacts 704 and the collapsed position unblocking the contacts 704 from coupling with the mated plug contacts 404. In the expanded position, the tine fingers 9044 are in sealing contact with or adjacent the sealing surface 7122 and the seal plate 712.

The tines 904 are similar to the tines 804, except that the tine fingers 9044 may be longer than the tine fingers 8044 to provide sequential triggering of the tines 804 and the tines 904. The tines 904 move between the expanded position (16A) and collapsed position (16B) by deflection about tabs 9042. In this version, the fingers 9044 are positioned radially about a single, linear central tine rod 604 and extend a distance beyond the tine rod 604 for engagement with the sealing surface 7122 and seal plate 712. The tine rod 604 is a distance behind the fingers 9044 and sealingly passes through sealing surface 7116 as it passes thereby.

Tine spring 726 is positioned in a chamber 719 in the support 702 about the push rods 602. Tine spring 726 extends between the tine base 902 and end face 7036 of the support 702. The spring 726 is seated at the end face 7036 and compresses as the tine assembly 706 moves with the plug push rod 408. The springs 724, 726 may be made of similar materials and be of a similar type as the springs 424, 426.

The push rods 602 are supported at one end by the support 702 and are positioned about the tine spring 726. The push rods 602 pass through holes 906 on the tine base 902 to support the tine assembly 706 about the support 702. In this version, an opposite end of the push rods 602 are positioned adjacent the fingers 9044 and extend a distance beyond the tine rods 604 for engagement with sealing surfaces 7118 and seal plate 712. The push rods 602 remain fixed as the seal plate 712 and the seal end 7106 of the bladder 711 travel back and forth about the push rods 602. The push rod 602 has tabs 6022 extending radially therefrom for engagement with the tine base 902 (see FIG. 18A). The tabs 6022 limit travel of the tine base 902 towards the end 7164, and retain the tine base 902 about the bore 7030 of the receptacle support 702.

The sealed receptacle 130 may be assembled in a similar manner as the sealed plug. For example, the internal assembly 717 of the sealed receptacle 130 may be pre-assembled by connecting the contacts 704, fiber optic pig tail 222, collar 1202, retaining ring 414, tine assembly (and/or pre-assembly) 706, tine spring 726, receptacle support 702, and bladder 711 that is already in sealing engagement with seal plate 712. The bladder 711 is disposed over the tines 804 and rods 602, 604, and sealing is established between the tine fingers 9044 and rods 602, 604 with their respective sealing surfaces 7122, 7118, and 7116. The bladder 711 is unrolled and seated on the groove 7022 of the receptacle support 702, and locked in place while retainer ring 414 installed over bladder 711 and the termination portion to complete the pre-assembly. The spring 724, housing 716 may then be secured about the internal assembly 717, and sealed with the support 702. The locks 715 and guide pin 722 secure the components in place.

Sealed Mating

FIGS. 17A-19C shows various views of the sealed connector 132, the sealed plug 128, and the sealed receptacle 130 in various stages of connection. As shown in these views, the receptacle 130 is seatable in the sealed plug 128. Various equipment, such as the termination 102, the harness 134. the sea floor equipment, or other equipment may be connected to the sealed plug 128 and/or the sealed receptacle 130 before or after mating.

Figure 17B:
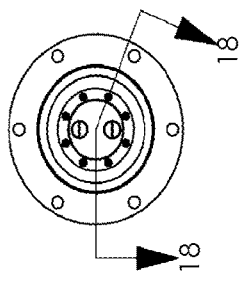
FIGS. 17A-17B are perspective and end views, respectively of the sealed connector in a pre-mating position.
Figure 17A:
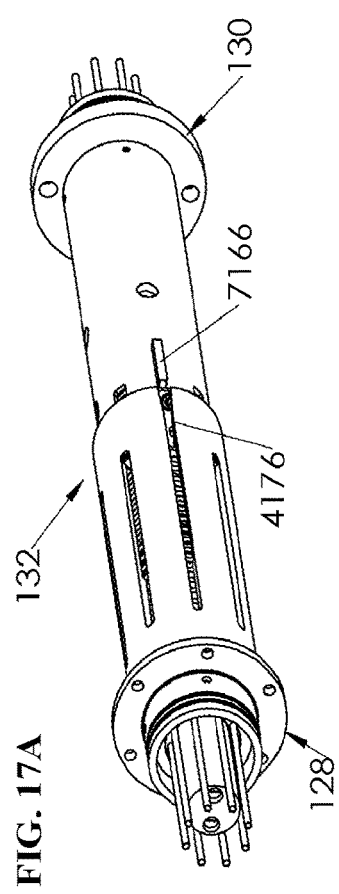

As shown in FIG. 17A, the sealed plug 128 and the sealed receptacle 130 may be positioned in gross alignment for mating. The keyway 4176 of the sealed plug 128 may be aligned with key 7166 of the sealed receptacle 130 for sliding engagement therebetween. As the receptacle 130 is ironed forward, the receptacle 130 is guided by the keyway 4176 to begin mating with the plug 128.

The mating may be performed according to the sequence demonstrated by FIGS. 18A-18I. Dining mating, the sealed plug 128 or the sealed receptacle 130 may be stationary as they are drawn together for mating. Due to the pressure balancing and spring forces of the components of the sealed connector 132, the sealed connector 132 may be triggered to create a seal between the sealed plug 128 and the sealed receptacle 130.

Figure 18A:
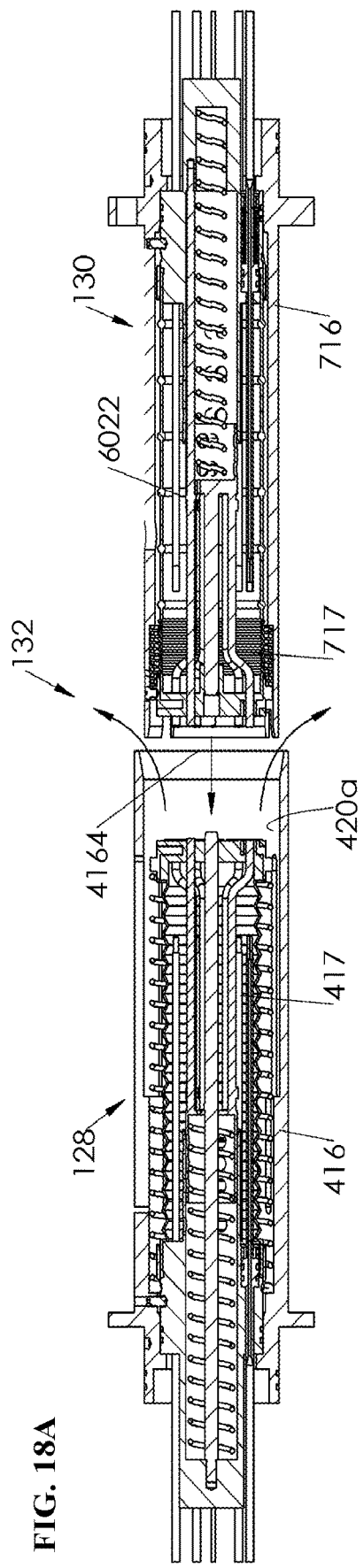

As shown in FIG. 18A, the sealed plug 128 is positioned to receive the sealed receptacle 130 through end 4164 and into chamber 420a of the housing 416. The housings 416, 716 may engage as shown in FIG. 18A to prepare the internal assemblies 417,717 to engage, The internal assemblies 417,717 are at a distance from each other during the disconnected stage. As the sealed receptacle 130 enters into the housing 416 of the sealed plug 128, a substantial amount of the seawater from chamber 420a is pushed out of the way between mating ends of the sealed plug 128 and the sealed receptacle 130 as indicated by the curved arrows.

As shown in FIG. 18B, the sealed receptacle 130 has entered the sealed plug 128 and advanced such that its disc 7112 is about to make contact with the disc 4112 of the sealed plug 128. The push rods 602 of the sealed receptacle 130 makes positive contact with the tine rods 302 of the sealed plug 128, and the tine fingers 9044 are in latent contact with tine fingers 8044.

Pressure along contact .surfaces between push rod 602 and tine rod 302 is higher than contact pressure along contact surfaces between the tine fingers 9044 and 8044. The contact pressure between the tine fingers 8044 and 9041 may at or near zero. As a result of this relative disposition, forward movement of the sealed receptacle 130 against the sealed plug 128 results in the fixed push rod 602 depressing the tine assembly 406 within the sealed plug 128 and overcoming a preload spring force of the tine spring 426.

The receptacle tine fingers 9044 continue to be in non-pressure contact with plug tine fingers 8044 and simply follow the plug tine fingers 8044 in translation due to the forward mating movement of the sealed receptacle 130. In other words, the relative position of the receptacle tine 904 to the push rods 602 within the sealed receptacle 130 remains the same. The receptacle tine 904 may not depress within the sealed receptacle 130 as positive contact is not yet established between the receptacle tine rod 604 and the plug push rod 408 The receptacle seal plate 712 is also not depressed as positive contact is not established with the plug seal plate 412 through the disc 7112, 4112 respectively.

Figure 20:
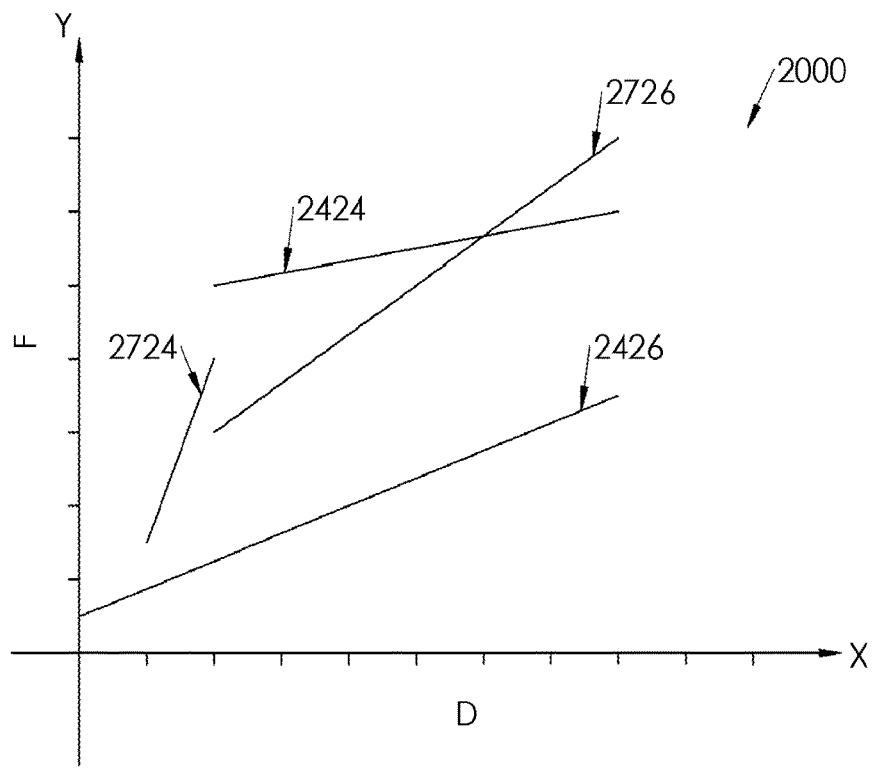
FIG. 20 is a graph showing a relation between force and distance for springs of the sealed connector.

FIG. 20 is a graph depicting relative spring force (F) (y-axis versus relative distance traveled (D) (x-axis). The lines 2424, 2426, 2724, 2726 correspond to the springs 424, 426 and 724, 726 of the sealed plug 128 and the sealed receptacle 130, respectively, (the "connector springs"). Line 2424 refers to the plug spring 424 spring constant profile. Line 2426 refers to the plug tine spring 426 spring constant profile. Line 2724 refers to the receptacle spring 724 spring constant profile. Line 2726 refers to the receptacle tine spring constant profile.

The spring forces may be manipulated as set forth in FIG. 20 as is described with the mating sequence 18A-18I. As demonstrated by graph 2000, the components under spring bias in the sealed plug 128 and the sealed receptacle 130 are under different preload forces with a relative magnitude as demonstrated by FIG. 20. Thus, advancement of the sealed receptacle 130 towards the sealed plug 128 (mating stroke) of FIG. 18B depresses the plug tine assembly 406 without depressing the other components under spring bias.

Figure 19A:
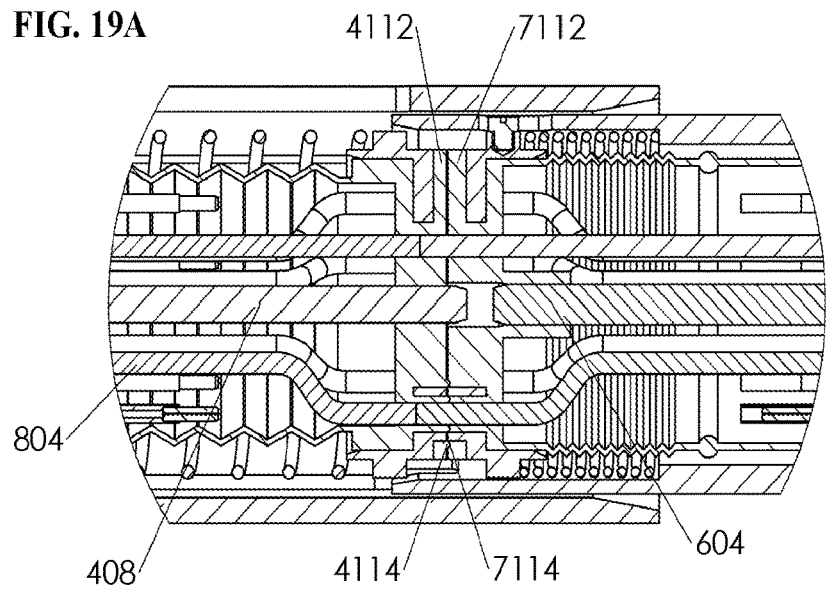
FIG. 19A-19C are detailed views of portions 19A-19C of the sealed connector of FIGS. 18C, 18G, and 18I, respectively.

As the mating continues as shown in FIGS. 18C and 19A, forward movement of sealed receptacle 130 continues until the receptacle seal plate 712 and plug seal plate 412 converge through the face seal 7114 and the face seal 4114. The tine rod 604 of the receptacle tine 904 and the plug push rod 408 are still at a distance from each other. Further forward movement of the sealed receptacle 130 may be achieved by overcoming the spring bias force of the engaged components. At this stage, the spring bias force of the tine spring 426, and the receptacle spring 724, and the plug spring 424 are in play.

As shown in FIG. 20, the magnitude of preload force of the plug spring 424 is greater than the combined spring force of the plug tine spring 426 and the receptacle spring 724. Further forward movement of the sealed receptacle 130 needs to overcome the receptacle spring preload force 724 and the plug tine spring force 426. As the mating stroke continues, the receptacle seal plate 712 is depressed while the plug tine assembly 406 continues to depress further under the overcoming of spring forces from the mating. The receptacle seal plate 712 moves within the sealed receptacle 130 guided by the guide pin 722 that travels along the short slot 7175 in the housing 716. With this guided movement, the rib section 7109 of the receptacle bladder 711 compresses evenly while maintaining its shape.

Initially, during the mating as shown in FIG. 18C, the disc 7112 and disc 4112 are brought closer to each other with a marginal gap therebetween. At this stage, physical contact is established between the convex face seal 4114 on the plug nipples 4120 (FIG. 8) and the concave face seal 7114 on the receptacle nipples 7120 (FIG. 15). As this physical contact establishes, seawater around the face seals 4114, 7114 between the disc 4112 and the disc 7112 is pushed outwardly away from the axis of the face seals 4114, 7114. The convex face seal 4114 on the disc 4112 and the concave face seal 7114 on the disc 7112 begin to engage and make physical contact as the seawater pushes out until interface therebetween is benign and the seawater is expunged away.

As the mating progresses, the convex face seals 4114 and concave face seals 7114 compress together to form a pressure tight sealing interface. A magnitude of compression of this interface is relational to the mating force generated from overcoming the spring forces of respective sealed plug and receptacle 128, 130. Initially, the face seal compression may result from force of the receptacle spring 724. When the connector mating force reaches a threshold to move plug seal plate 412, the face seal compression may continue and include force of the plug spring 424. Pressure balance to the ambient environment within the sealed connector 132 results in a marginal net differential pressure across the face seals 4114, 7114 irrespective of a direction in which it presents. Accordingly, the compression required for the face seals 4114, 7114 to affect a pressure tight seal may be minimal, and an amount of the compression needed from connector mating may be assumed to be adequate for a pressure tight seal, even in a harsher environment.

At this stage of mating, the force generated has not reached the threshold to overcome the plug spring 424 preload force. The receptacle seal plate 712 and plug tine assembly 406 continue to depress in their respective portions of the connector 132. The receptacle tines 904 may continue to move forward in translation while being in latent contact with the plug tines 804.

Figure 18D:
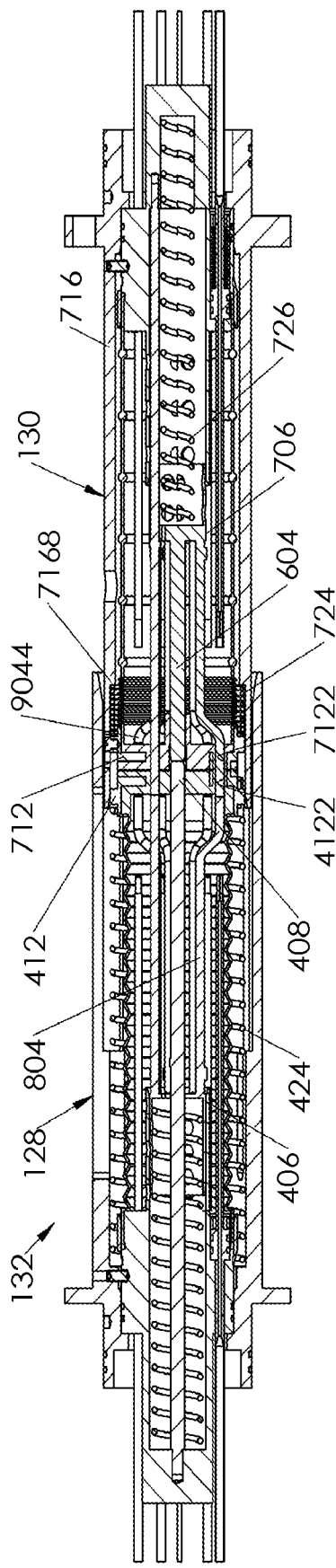

As shown in FIG. 18D, the plug push rod 408 and the receptacle tine rod 604 are brought to engagement to establish physical contact. The plug push rod 408 is fixed and stationary within the sealed plug 128, while the engaging receptacle tine rod 604 is under spring bias from tine spring 726. When the receptacle tine spring 726 preload force is overcome, the receptacle tine assembly 706 depresses within the sealed receptacle 130. At this stage, the plug tines 804 are disengaged from the ping seal plate 412. The plug tine fingers 8044 are no longer in shaft sealing engagement with the plug sealing surfaces 4122. The receptacle tine fingers 9044 are in sealing engagement with both the plug sealing surfaces 4122 and receptacle sealing surfaces 7122. The receptacle seal plate 712 is fully depressed within the sealed receptacle 130.

At this point, any forward movement of the sealed receptacle 130 brings translation movement of the receptacle seal plate 712 since the compressed spring 724 is bottomed against the step 7168 in the receptacle housing 716. Further mating stroke movement builds up resistance that overcomes the preload spring force of plug spring 424, the preload spring force of the tine spring 726, the spring force of the tine spring 426, and frictional resistance. As a result, continued mating of the sealed plug and receptacle 128, 130, depresses both the plug tine assembly 406 and the receptacle tine assembly 706. The plug seal plate 412 is depressed within the sealed plug 128 while in sealing engagement with the stationary receptacle seal plate 712 through the disc 4112, the disc 7112, and the face seals 4114, 7114 (see, e.g., FIG. 19A).

Figure 18E:
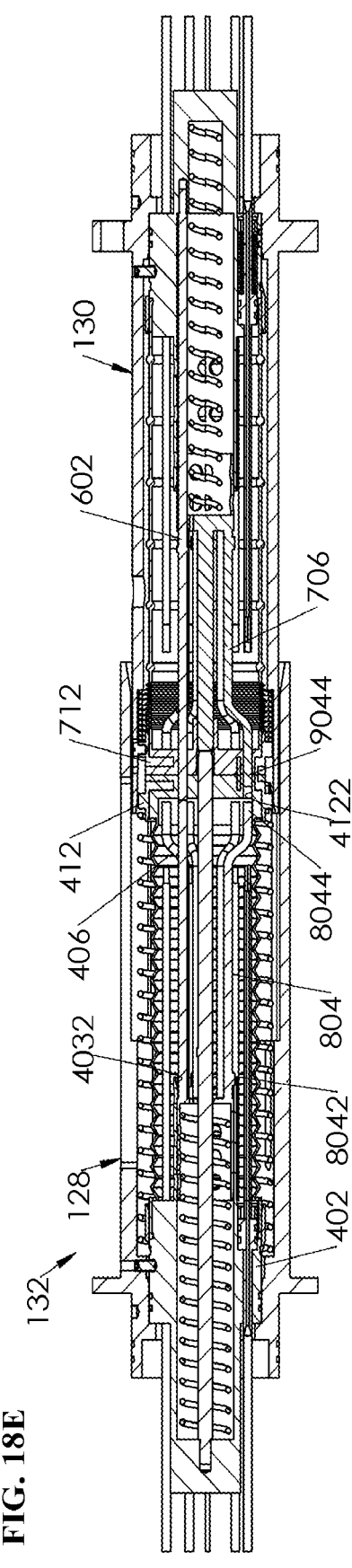

As shown in FIG. 18E, receptacle tine assembly 706 depresses within the sealed receptacle 130 with the tine fingers 9044 separating away from the plug tine fingers 8044. Concurrently, the plug tine assembly 406 continues to depress within the sealed plug 128. As a result of this, plug bladder sealing surfaces 4122 is in non-engagement with the tine fingers 8044. But a portion of the sealing surfaces 4122 is still in sealing engagement with the receptacle tine fingers 9044. As the mating progresses, the plug tine assembly 406 move within the sealed plug 128 to bring the plug tine tabs 8042 (FIG. 11A) in engagement with support 402. These tabs 8042 initially engage with the tapered inlet 4032 of the support 402. Due to frictional reaction, the tines 804 collapse by deflecting inwardly.

Figure 18F:
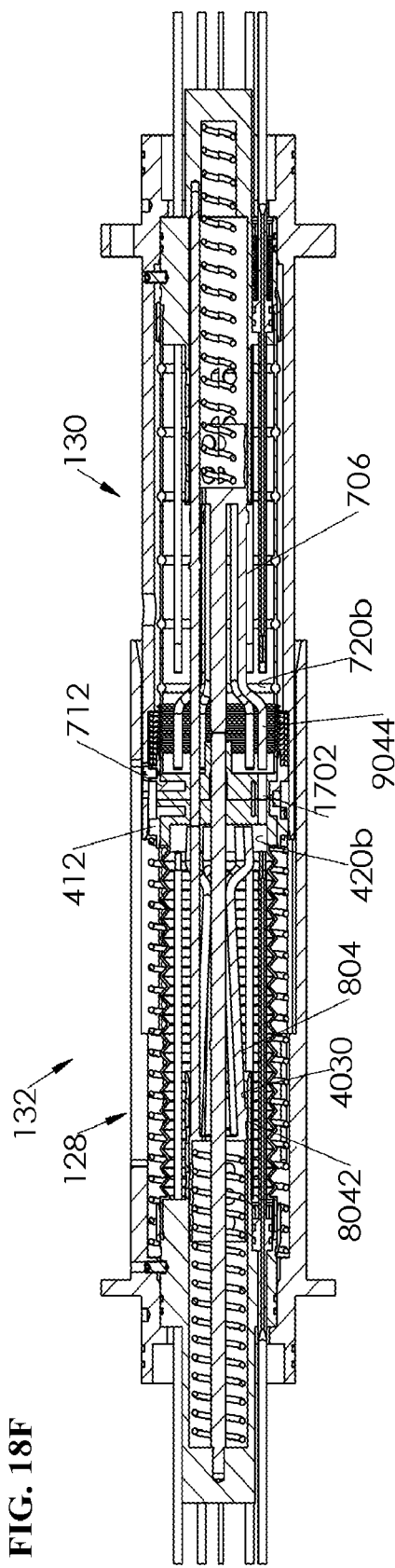

As shown in FIG. 18F, as mating continues, the tines 804 and the tabs 8042 enter the bore 4030. Within the sealed receptacle 130, the tine assembly 706 depresses further and disengages from the receptacle seal plate 712. The receptacle tine fingers 9044 are no longer in shaft sealing arrangement with the bladder sealing surfaces 7122 (FIG. 15). With the plug seal plate 412 and the receptacle seal plate 712 still in pressure tight sealing engagement from the face seals, sealed passageways 1702 is created between the plug chamber 420*b* and the receptacle chamber 720*b*. The passageways 1702 connects the fluid volume of both the plug and receptacle chambers 420*b*, 720*b*.

Figure 18G:
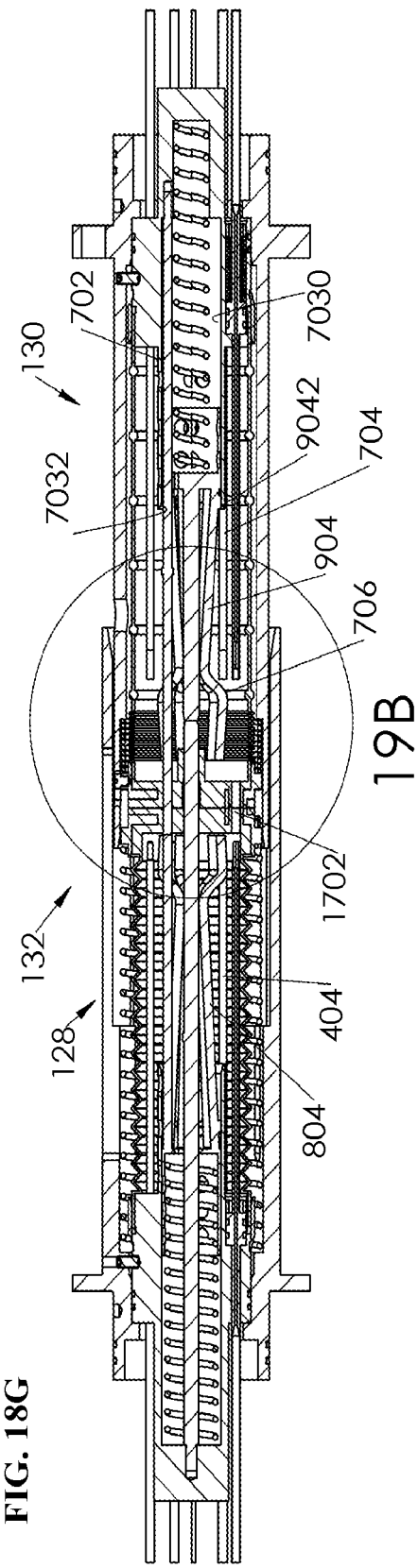
Figure 19B:
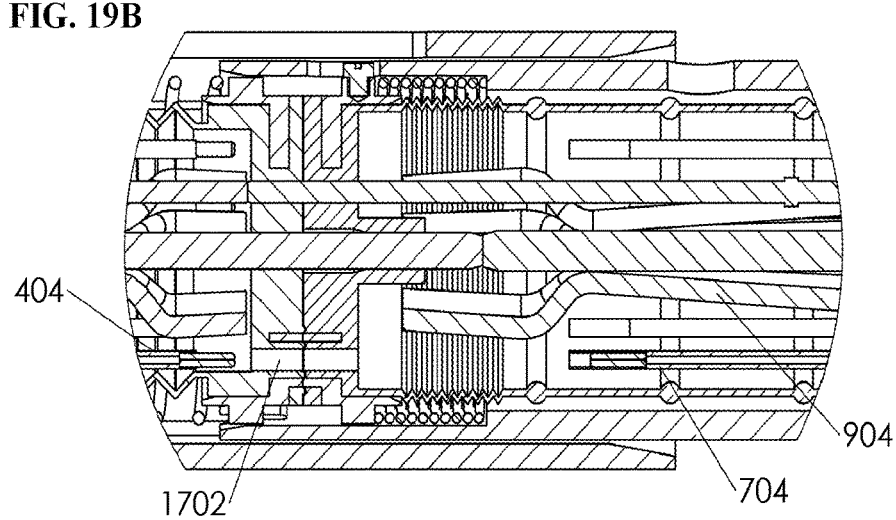
Figure 19C:
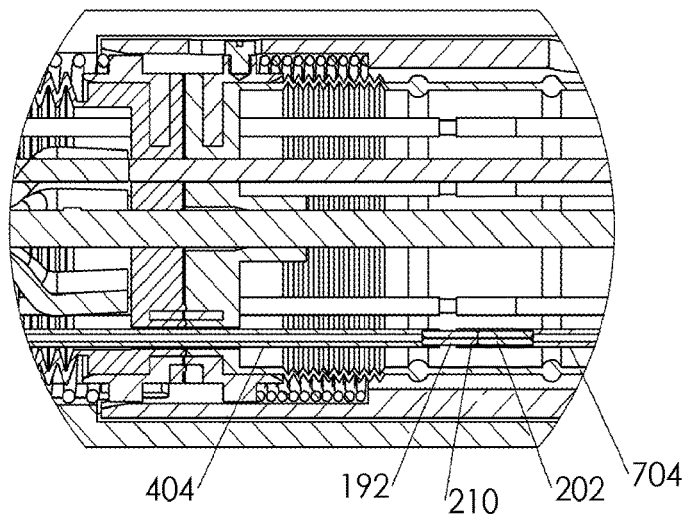

As the mating progresses as shown in FIGS. 18G and 19B, the receptacle tine assembly 706 within the sealed receptacle 130 brings the tine tabs 9042 in engagement with the support 702. The tabs 9042 initially engage with the taper 7032 along the bore 7030. Due to frictional reaction, the tines 904 collapse by deflecting inwardly. With continued mating, the tines 904 and the tabs 9042 enter the bore 7030. At this mating stage, the plug tines 804 and the receptacle tines 904 are in collapsed position, and the passageways 1702 clears for connection of the plug contacts 404 and the receptacle contacts 704.

Figure 8:
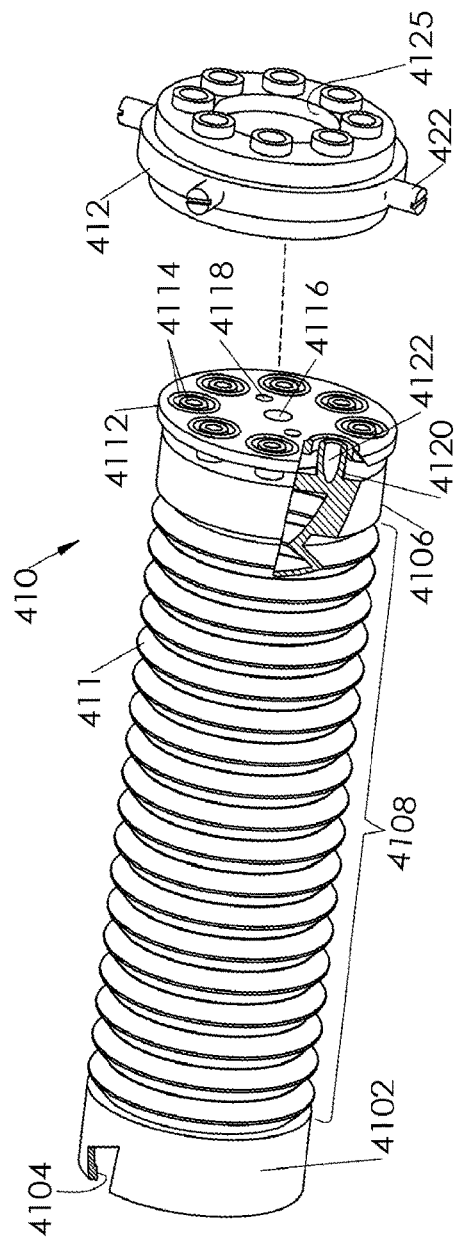
FIG. 8 is an exploded view. partially in cross-section of a plug bladder assembly.
Figure 18H:
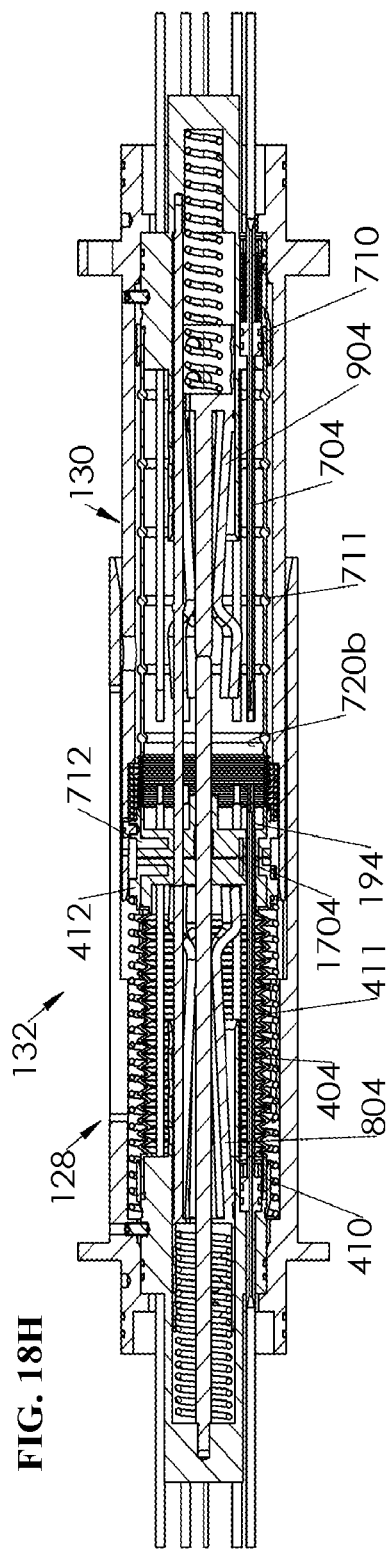
Figure 18I:
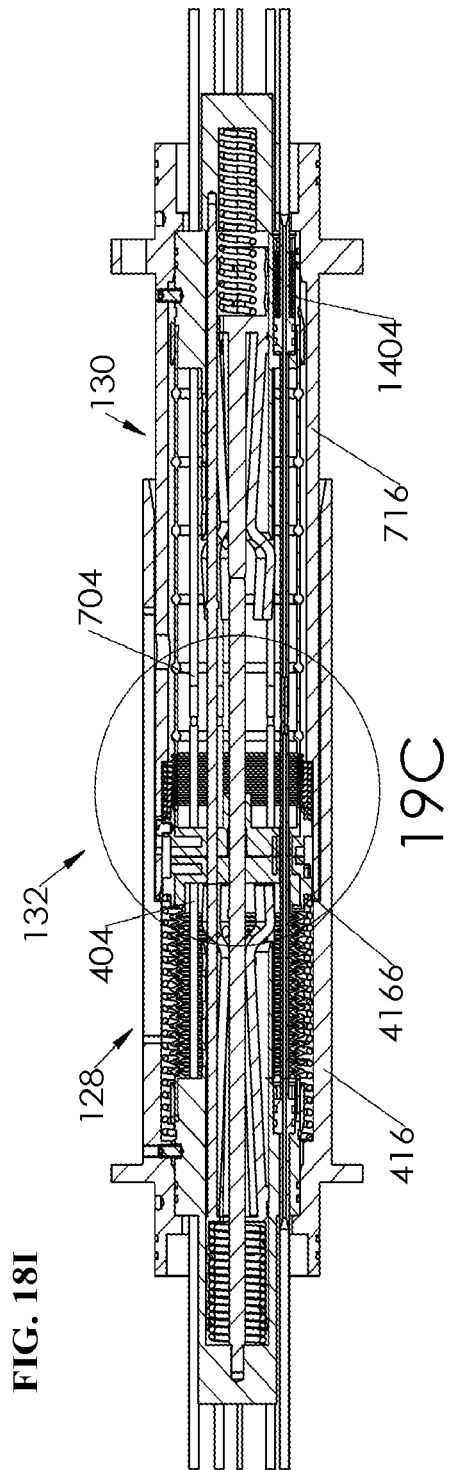

As shown in FIG. 18H, continued mating brings the plug seal plate 412 and the receptacle seal plate 712 further into the sealed plug 128. The stationary plug contacts 404 extend through the passageways 1702 without making any contact with sealing surfaces 4122, 7122 of the bladder assemblies 410, 710 (FIGS. 8, 15). The front portion 194 of the plug contacts 404 are now in the chamber 720*b* of the sealed receptacle 130. The plug chamber 420*b* and the receptacle chamber 720*b* are still connected by an annulus 1704 created in the passageways as a result of entry of the plug contacts 404 into the receptacle chamber 720*b*.

The annulus 1704 volume may be based on sizing of the plug contact 404 front portion 194 relative to a diameter of the sealing surfaces 4122 and 7122. The sizing of the shaft sealing surfaces diameter may be suited to enable unobstructed passage of the plug contact 404 and effective pressure sealing of the respective chambers 420*b*, 720*b* in unmated and mated state. In other versions, the plug contact 404 may be in sealing contact with one or both the sealing surfaces 4122, 7122. In such situations, the plug front portion 194, the sealing surfaces 4122, 7122, and the respective tines 804, 904 may be suitably sized to achieve pressure sealing of the chambers 420*b*, 720*b* in the respective sealed plug and receptacle 128. 130 in both an unmated and a mated state. During mating, pressure sealing of respective chambers 420*b*, 720*b* may be maintained by the penetrating plug contact 404.

As shown in 18I and 19C, at the final stretch of the mating stroke, the receptacle contacts 704 are brought closer to the plug contacts 404. The contacts 404, 704 are radially and angularly aligned for contact therebetween. The ferrule 192 of the plug contact 404 makes initial contact with the sleeve 210 of the receptacle contact 704. The plug ferrule 192 is finely aligned with the receptacle ferrule 202. During this alignment action both the contacts 404, 704 may flex to accommodate the alignment reaction forces.

The ferrule 192 of the plug contact 404 and the ferrule 202 of the receptacle contact 704 are brought in contact with each other. As this contact mating continues, the plug contact 404 pushes the receptacle contact 704 and overcomes the preload spring, force of the contact spring 1404. At this stage, further mating or over-travel may not occur as the step 4166 of the plug housing 416 provides hard-stop to the housing 716 of the mating sealed receptacle 130. The plug 128 and receptacle 130 are now considered fully mated. The contacts 404 and 704 are aligned in radial and angular directions, physically mated with constant spring force from the contact spring 1404 and maintaining the physical contact between ferrules to provide communication between the sealed plug and receptacle 128, 130. The mated contacts 404, 704 are maintained in a benign environment of the chambers 420*b*, 720*b* with pressure tight sealing maintained between chambers and the ambient environment.

As shown by reversing FIGS. 18A-18I, reverse action of the described mating sequence disconnects the sealed plug 128 and the sealed receptacle 130 with the respective contacts 404, 704 maintained in their respective sealed chambers 420*b*, 720*b* during and after the disconnect. The plug and receptacle tines 804, 904 may move out of their deflected state due to the natural flex from memory of the material as the de-mating sequence brings the tabs 8042, 9042 out of the bore 4030, 7030 due to the bias of the tine springs 426, 726. Any fluid exchange between the chambers 420*b* and 720*b* during mating and mated engagement may reverse during de-mating and disconnect without any net loss. When fully de-mated the respective tine fingers 8044, 9014 may be in sealing engagement with the respective sealing surfaces 4122, 7122 thereby re-establishing the respective sealed chambers 420*b*, 720*b*.

Figure 21:
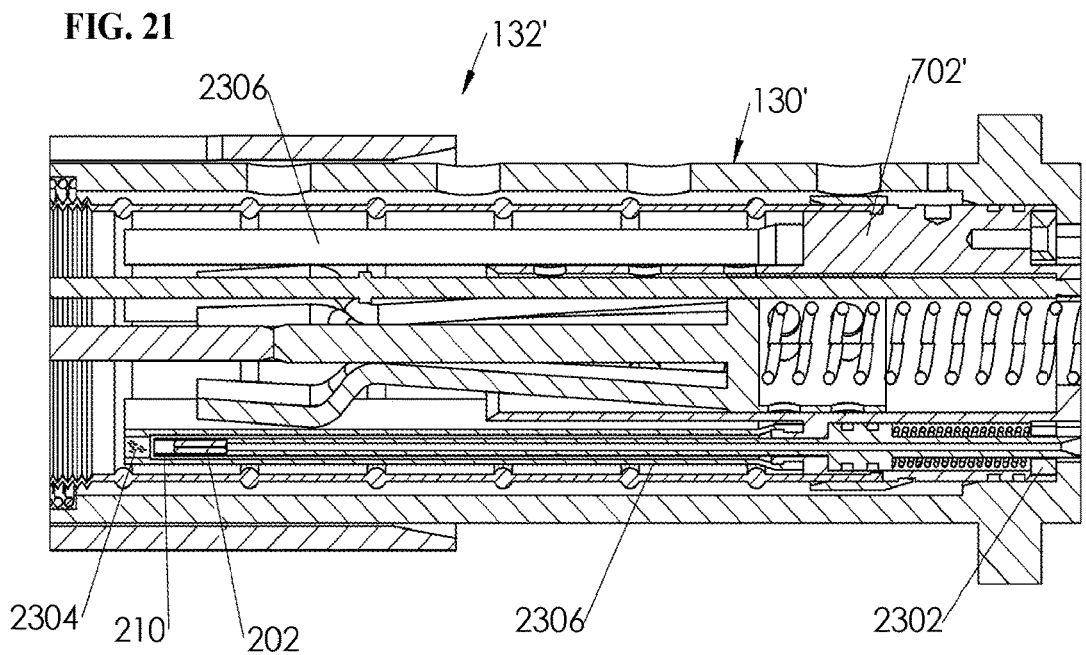
FIG. 21 is a partial cross-sectional view of another sealed connector having a multi-layer bladder.

FIGS. 21-28D show example variations that may be provided in the sealed connector 132. FIG. 21 shows a modified seal connector 132' with a dual sealed receptacle 130'. As shown by this figure, the sealed connector 132' may be similar to the seal connector 132, except that an additional discrete bladder 2306 may be mounted within the sealed plug 128' and/or the sealed receptacle 130'. The bladder 2306 may be made out of the same material and filled with similar fluids as the bladder 711.

The bladder 2306 is a tubular structure with a sealing end, a tapered rear end, and a stepped inner diameter. The bladder 2306 may be mounted onto support 702' in the receptacle 130' (and in a similar position in a corresponding plug). A seal end of the bladder 2306 may be filled with an immobile, viscous gel 2304, such as a soft cure optical index matching gel. Part or all of the bladder 2306 may be filled entirely with gel 2304. The gel may be immobile (e.g., retained in place within the sealing end of the bladder 2306), and also pliable under external force. During the mated sealing of the dual sealed connector 132', the plug contact 404 with the ferrule 192 enters the bladder 2306 (FIGS. 18A-I), and the ferrule 192 pierce through the gel 2304 before entering the ferrule sleeve 210 of the mated ferrule 202 of contact 704.

As also shown in FIG. 21, in place of the collars 1202 (which may be discrete to respective contacts) a retaining ring 2302 may be used. The retaining ring 2302 may held in place by fasteners connected to the support 702'.

Figure 22A:
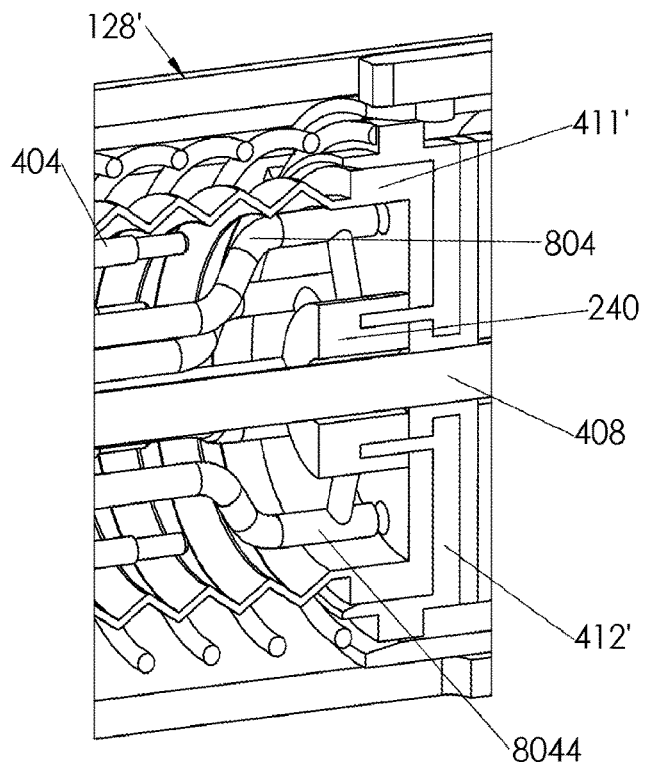
FIGS. 22A and 22B are cross-sectional views of a portion of the sealed connector with a tine return assist.
Figure 23A:
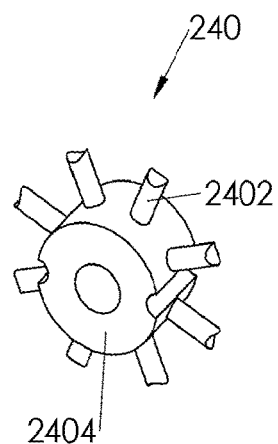
FIGS. 23A and 23B are perspective views of the tine return assists in an undepressed and depressed position, respectively.
Figure 22B:
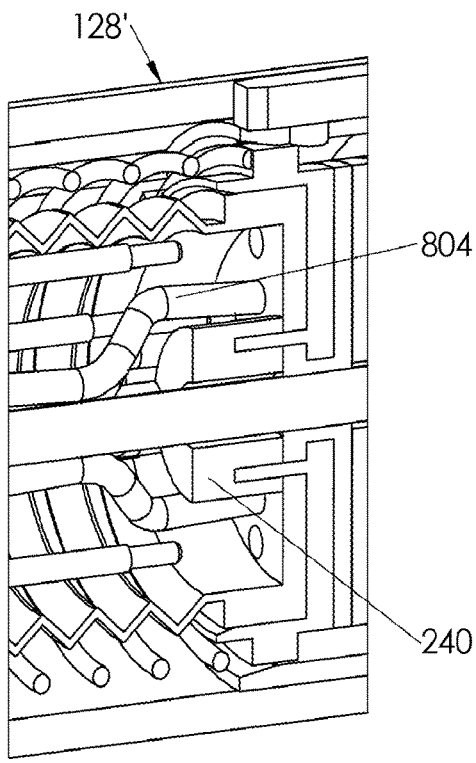
Figure 23B:
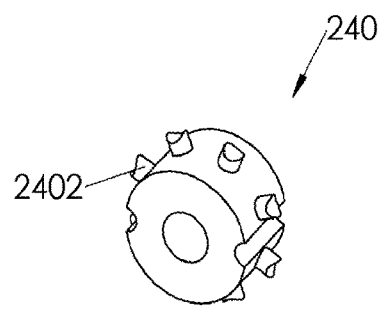

FIGS. 22A and 22B show a modified sealed plug 128' with the tines 804 in an expanded and collapsed position, respectively. The modified sealed plug 128' includes an additional tine return assist mechanism 240 mounted about the seal plate 412' and push rod 408. FIGS. 23A and 23B show the tine return assist mechanism 240 in greater detail. The tine return assist mechanism 240 may be a spring mechanism including a base body 2404 and biased plungers 2402 that detent and return upon application of load and removal.

As shown in FIG. 23A, prior to deflection of tine 804, the tine fingers 8044 of the tine 804 is in proximity to the plunger 2402. As shown in FIG. 23B, when the tines 804 collapse, a radial compressive load overcomes a plunger bias thereby compressing the plunger 2402. When the tine 804 deflects back during a demating stroke, a spring force of the plungers 2402 ensure positive return of the tines 804 to a fully expanded state prior to the tine fingers 8044 entering the sealing surface 4122 in the bladder 411'.

Figure 24:
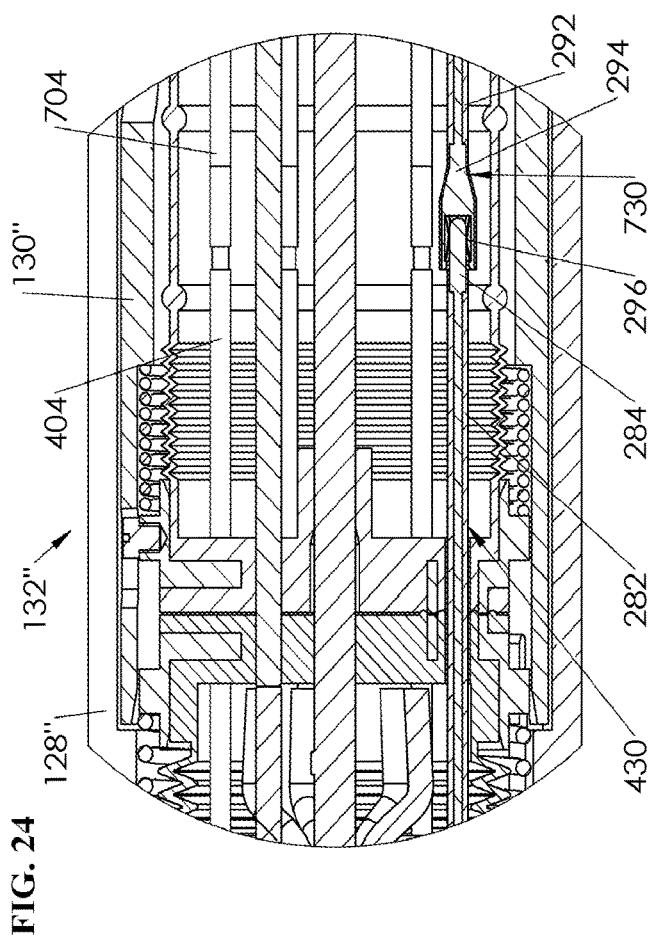
FIG. 24 is a cross-sectional view of a portion of yet another sealed connector having both optical and electric contacts.

FIG. 24 shows another mated connector 132" in an electric/optical configuration. The mated connector 132" is similar to the mated connector 132, except that electric contacts 430 and 730 are also included. The electric contact 730 of the sealed receptacle 130" includes an insulator 292 and a conductor 294 with an internal shaft. The electric contact 430 of the sealed plug 128" includes an insulator 282, a conductor 284. When fully mated the plug conductor 284 is fully inserted into the receptacle conductor 294 with the electric contact element 296 making positive contact with the plug conductor 284.

The conductor 294 has a forward portion with a socket that houses the contact element 296 and a rear portion with a tubular shaft to receive an electric wire from the termination or other equipment. The conductor 284 has a forward portion with a spherical tip and a rear portion with a tubular shaft to receive the electric wire from termination or other equipment. The insulator 292, 282 may be a machined or injection molded component that is assembled with bonding onto or molded over the conductor 294, 284 respectively. The conductor 294, 284 may be a machined component that is made from electrically conductive material such as copper, aluminum, bronze etc., Insulator may be made from electrically insulative material such as LDPE, MDPE, HDPE, PEI, PEEK etc.

The electric contacts 430. 730 are tubular structures similar to the contacts 404, 704, with sealing grooves and a. seating shoulder at a middle portion thereof. The contact 730 have a contact element 296 that makes positive contact with 430 and conducts electricity through wire to termination or other equipment. The contact element 296 may be a. stamped thin cross section made of electrically conductive material formed into a cylindrical shape that stretches when mated with a pin. The contact element 296 may be contact bands commercially available electric component, for example from MOUSER ELECTRONICS™ at www.mouser.com.

Figure 25:
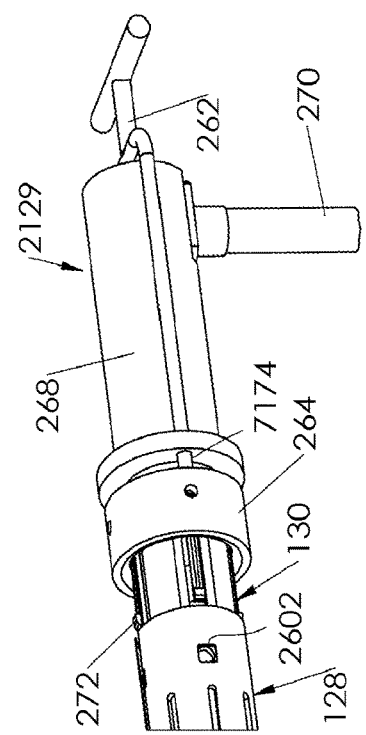
FIG. 25 is a perspective view of the sealed connector supported by a retention mechanism and a retention handle.

FIG. 25 shows a retention mechanism 2129 usable for connecting the mated connector 132. The retention mechanism 2129 may be used to connect the sealed receptacle 130 to the sealed plug 128. During mating, the retention mechanism 2129 may be supported by an ROV (remote operated vehicle—not shown) while carrying the sealed receptacle 130 for connection. The sealed plug and receptacle 128, 130 may be mated by using the ROV to lift the sealed receptacle 130 into position to mate with the sealed plug 128.

The retention mechanism 2129 includes the housing 268 and the flexible housing 270. The termination housing 268 has an inlet to receive the sealed receptacle 130 therein, and may be provided with termination tubes 324 and tube joints 323 for connection to the contacts 704 of the sealed receptacle 130 as shown in FIGS. 2A and 2B. The optical fiber pigtail 222 from the contact 704 is protectively housed within termination tubes 324 and contained within the housing 268 and the flexible housing 270.

Referring back to FIG. 25, the retention mechanism 2129 may also include a handle 262, lock plates 272 and a handle retainer 264 for use during connection. The handle 262 is movably mounted to the sealed receptacle 130, through holes 7174 on the receptacle housing 716. The handle 262 may be shaped for grabbing by the ROV during installation. The handle 262 may be held in place about the retention mechanism 2129 by handle retainer 264. The handle retainer 264 is a cylindrical member positioned about the inlet of the retention mechanism 2129.

Figure 26:
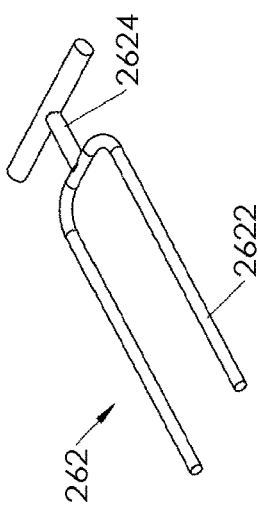
FIG. 26 is a perspective view of the retention handle.

As shown in FIG. 26, the handle 262 is a tuning fork shaped structural member with a fork portion 2622 and a handle position 2624. The handle portion 2624 is shown as being T-shaped, and could have other shapes and/or employ other industry standard ROV handle interfaces. For example, the handle portion may haw a fish tail or D handle shape.

One or more locking plates 272 may be mounted to the housing 716 with fasteners. In this example, four locking plates 272 at equally spaced angle around the sealed receptacle 130 is shown. Other shapes, orientations and fastener locations may be used.

Figure 27B:
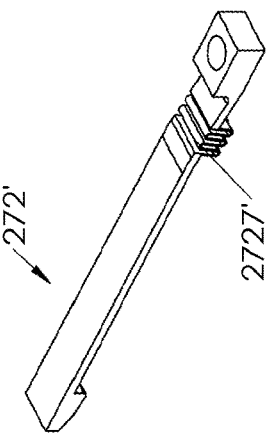
FIGS. 27A and 27B are perspective view of a lock plate with and without a rib spring. respectively.
Figure 27A:
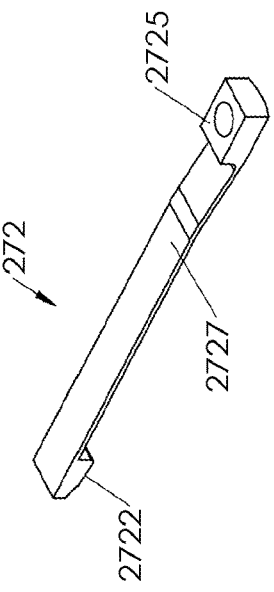

FIGS. 27A-27B shows example lock plates 272, 271', respectively. The locking plate 272 includes a front tip 2722 and a rear block 2725 connected by rib portion 2727. The front tip 2722 is receivable in a cut out 2602 in the plug housing 416. As shown in FIG. 27B, the rib portion 2727' may be modified to include a serrated rib spring or bellow type arrangement. The spring/bellows may be used to facilitate compliance of the lock plate 272' to the sealed receptacle 130 and/or to minimize frictional forces during connection and/or disconnection thereon.

Part or all of the retention mechanism 2129 may be made out of corrosion resistant metallic material, coated metallic material or other rigid thermoplastics suitable for the loading requirements of the connector mass and mating spring forces. Part or all of the retention mechanism 2129 may also be manufactured from casting, molding, and fabrication with welding or other suitable manufacturing processes, and/or manufactured from machining or cast and finish machined.

Figure 28A:
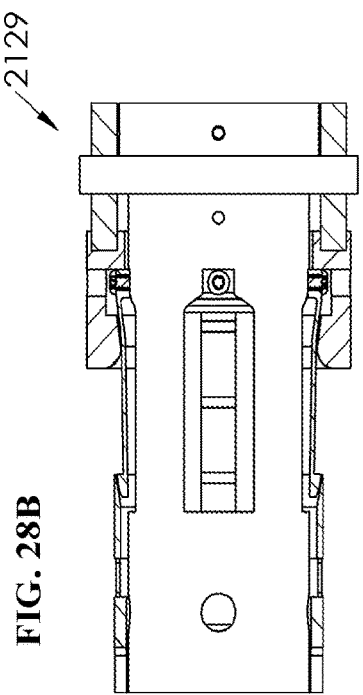
FIG. 28A-28D are partial cross-sectional view of the retention mechanism in an un-engaged, engaged, locked, and unlocked position, respectively.
Figure 28B:
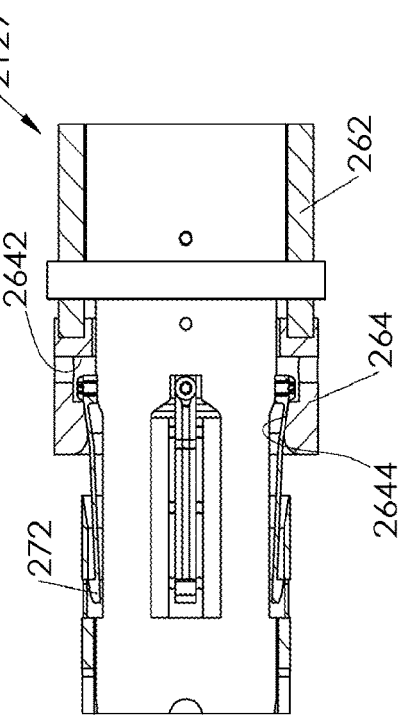

FIGS. 28A-28D show mating of the retention mechanism 2129. As shown in FIG. 28A, the front tip 2722 of the lock plate 272 is positioned to engage with the entry taper 2710 of the plug housing 416. The inner face 2642 of the handle retainer 264 is pushed against the lock plate rear block 2725. At this stage, forward movement of the receptacle 130 by the ROV engages the lock plate 272 with the housing 416 as shown in FIG. 28B. The cantilevered lock plate 272 conforms and deflects from the frictional interaction of the taper surfaces. As the ROV continues mating, the lock plate front tip 2722 tracks the inner diameter profile of the sealed plug 128 until it is clear of circumferential restriction thereof.

Figure 28C:
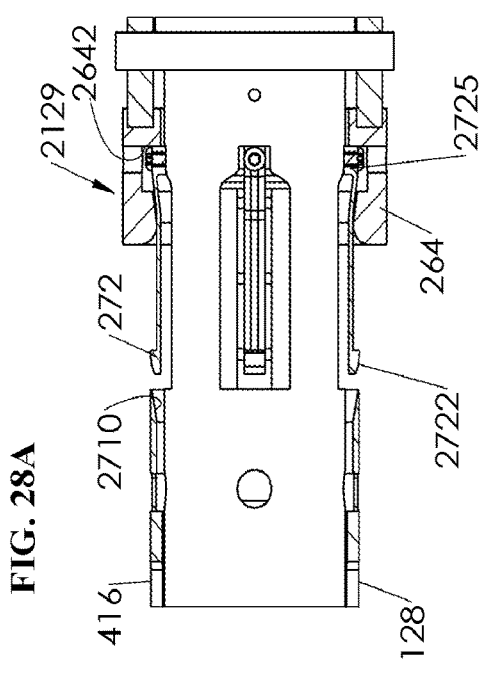

As shown in FIG. 28C, the front tip 2722 of the lock plate 272 clears circumferential restriction when the mating stroke brings it to the cut out 2602 on the seal portion of the sealed plug 128. In the absence of restriction and associated frictional forces, the lock plate 272 returns back to its natural state which results in the front tip 2722 of the lock plate 272 locks in place inside the cut out 2602. At this point, the connector contacts 404,704 (FIG. 2) are fully mated.

With the sealed plug and receptacle 128, 130 properly mated, the ROV (may then relieve the handle 262 and depart. The lock plate 272 mounted on the cut out 2602 of the sealed plug 128 is sufficiently load bearing member to keep the sealed plug 128 and the sealed receptacle 130 mated against the axial forces of the connector springs therein.

Figure 28D:
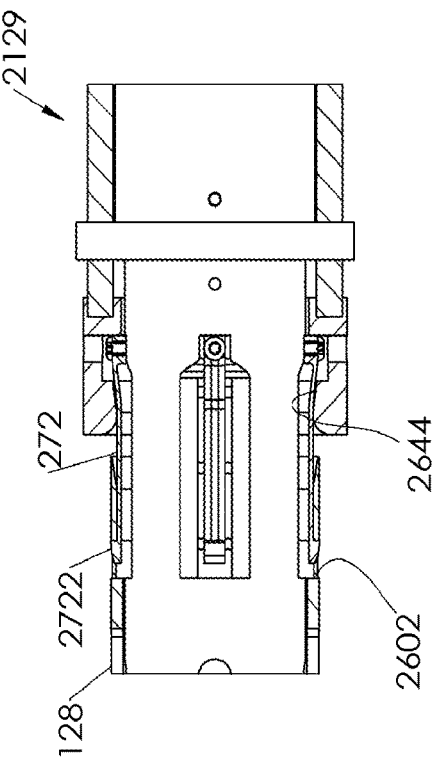

For demating the ROV may gob the handle 262 and gradually pull the handle 262. As a result of this action, the retainer 264 of the handle 262 is pulled backwards. The tapered surface 2644 of the retainer may be brought in contact with the lock plate 272 as shown in FIG. 28D. Continuous pulling of the handle 262 by the ROV results in increased frictional force between the retainer 264 and the lock plate 272.

When the frictional forces overcome the axial forces of the connector springs, the cantilevered lock plate 272 deflects and the front tip 2722 unlocks from the cut out 2602. Now the axial forces from the connector springs are balanced by the ROV grab of the handle 262. Gradual pulling of the handle 262 causes the lock plate 272 to track along an inner diameter of the sealed plug 128. Further backward movement brings the lock plate 272 out of the sealed plug 128. Continued movement fully demotes the sealed receptacle 130 from the sealed plug 128.

Modular Connector Assembly

Figure 29:
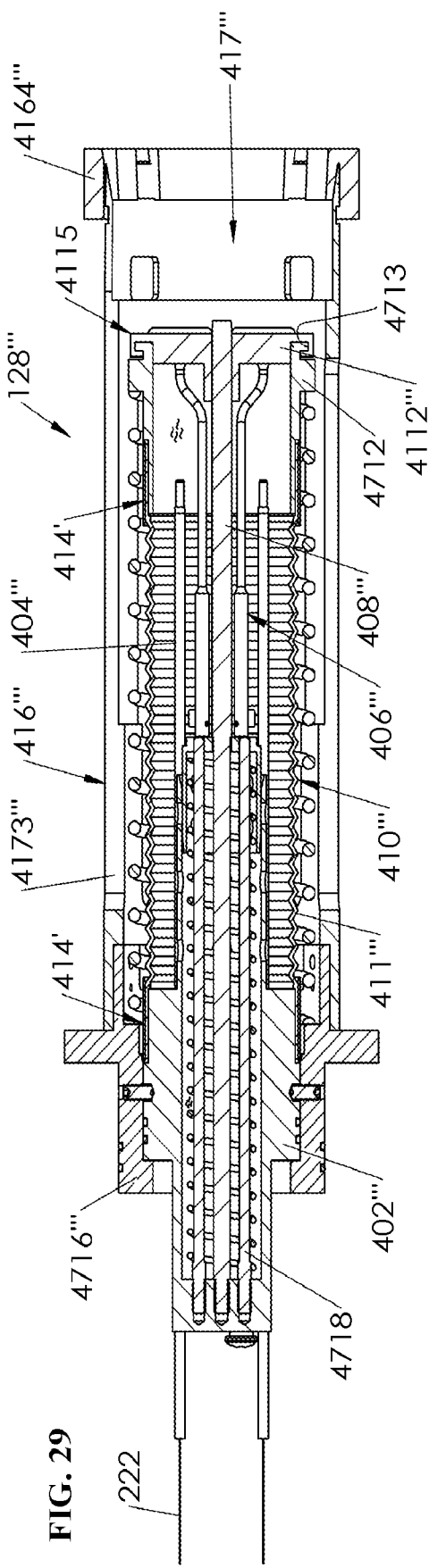
FIGS. 29 and 30 are cross-sectional views of another version of the sealed plug and the sealed receptacle.
Figure 30:
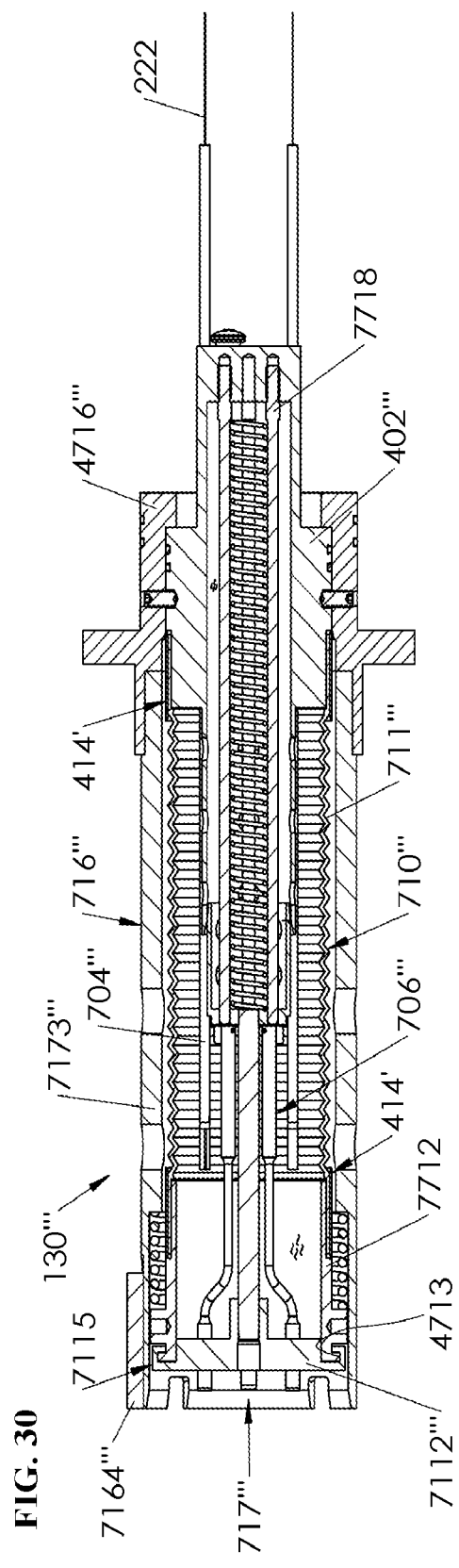
Figure 31:
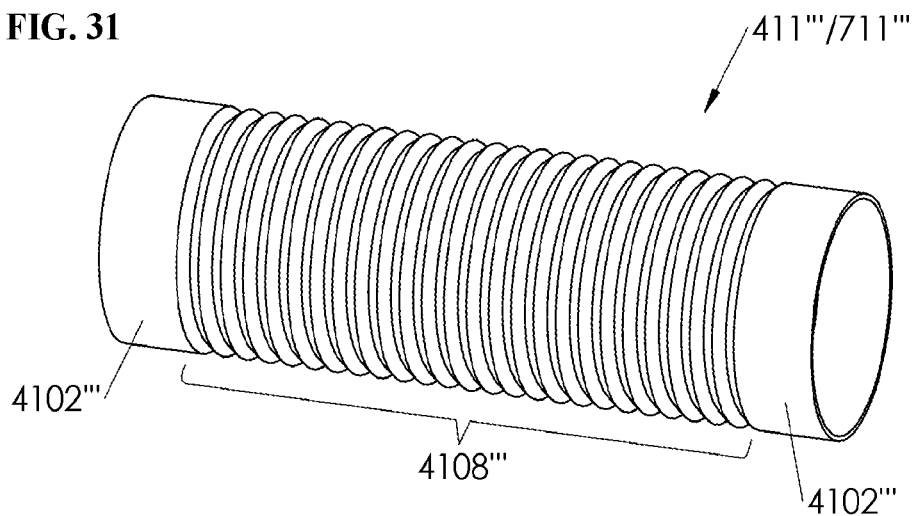
FIG. 31 is a perspective view of a bladder.

FIGS. 29 and 30 show a modular version of the sealed plug 128''' and sealed receptacle 130'''. The sealed plug 128''' and the sealed receptacle 130''' may have features similar to the sealed plug 128 and sealed receptacle 130, which have been simplified for circuit density, modularity, ease of component manufacturing, assembly, and cost-efficient mass production.

In this version, the sealed plug 128''' includes a modular housing 416''' and an internal assembly 417'''. The modular housing 416''' includes a tip 4164''', a base 4716''', and a tribe 4173'''. The tip 4164''' is shaped for engagement with the receptacle 130'''. The base 4716''' is shaped for engagement with the equipment (e.g. 120 of FIG. 1A). and to receive the support 402'''. The tube 4173''' has the tip 4164''' connected at one end and the base 4716''' on an opposite end thereof The housing base 4716''' and tube 4173''' may be secured together using fasteners or similar means. Assembly of the housing 416''' is similar to the assembly steps recited for the housing 416 of the sealed plug 128.

The internal assembly 417''' includes a support 402''' a bladder assembly 410''', a tine assembly 406''', and contacts 404'''. The support 402''' is similar to the support 402 of FIG. 4C, except that it has been modified to include features of the support 702 of FIG. 12C. The support 402''' is secured in the housing base 4716''' and has a connection end that extends therefrom for connection with optical fibers 222. A bladder end of the support 402''' extends into the bladder assembly 410''' and is slidably movable through the tube 4173'''.

The tine assembly 406''' and contacts 404''' are supported in the support 402''' and extend into the bladder assembly 410'''. Guide rods 4718 extend from the connection end of the support 402''' to the tine assembly 406''' for providing support and guidance thereto.

As shown in FIG. 30, the receptacle 130''' may be similar to the plug 128''', with corresponding parts configured to seal with the mated plug 128'''. The receptacle 130''' includes a modular housing 716''' and an internal assembly 717''' for matably sealing with the corresponding housing 416''' and internal assembly 417''' of the plug 128'''. The modular housing 716''' includes a tip 7164''' corresponding to the plug tip 4164''' tube 7173''', and the same base 4716'''.

The internal assembly 717''' is similar to the internal assembly 417''' and includes the same support 402'''. The internal assembly 717''' also includes a bladder assembly 710''', a tine assembly 706''', contacts 704''', and guide rods 7718.

FIGS. 31-35 show detailed views of components of the sealed plug 128''' and/or sealed receptacle 130'''. Features of the plug 128''' may be similar to the sealed plug 128 with some variations for simplification.

FIGS. 31-33B show portions of the bladder assembly 410''' and 710''' in greater detail. The bladder assembly 410''' is similar to the bladder assembly 410 of FIG. 8, except that the sealed bladder 410''' has been simplified to include a bladder 411''', seal plate 4712, and a seal end 4115. The bladder assembly 710''' is similar to the bladder assembly 710 of FIG. 16, except that the sealed bladder 710''' has been simplified to include a bladder 711''', seal plate 7712, and a seal end 7115, As shown in these views, the bladder assembly 410''' may have various configurations to facilitate operation and/or manufacturing.

The bladder 411''' is similar to the bladder 411 of FIG. 8, except that the bladder 411''' is symmetric. The bladder 411' includes a ribbed middle portion 4108''' with symmetric support ends 4102''' on either side thereof (and without the bladder lip 4104). The support ends 4102''' are standardized to interface with, support 402''' (FIG. 29) and seal plate 4712 to facilitate assembly of the bladder 411''' at any orientation. The support end 4102''' of the bladder 411''' is positionable in sealing engagement with support 402''' and seal plate 4712. The bladder 411''' may be held in place by a retainer ring 414'.

Figure 32:
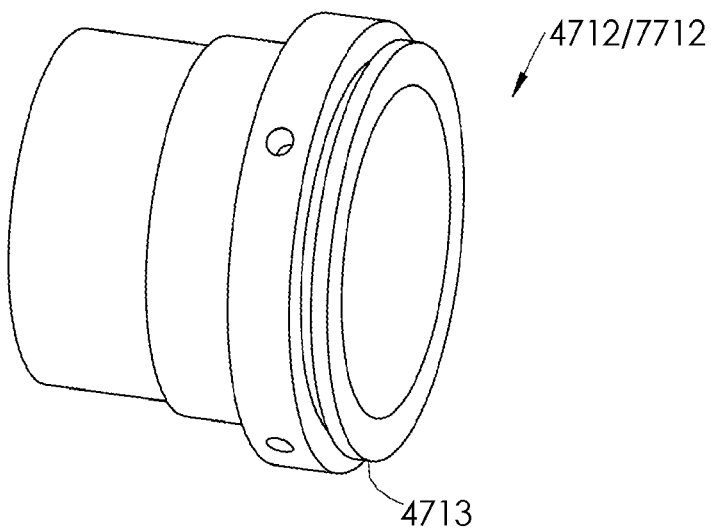
FIG. 32 is a perspective view of a seal plate.

The seal plate 4712 is shown in greater detail in FIG. 32. As shown in this view, the seal plate 4712 is a tubular member with, a connection end shaped to receive the support end 4102''' at one end and having a plate end with a lip 4713 shaped to support the plug seal end 4115. The plate end may have a similar outer surface as the plate 412 of FIG. 8. In this version, the plug seal end 4106 is separated from the seal plate 4712.

Figure 33A:
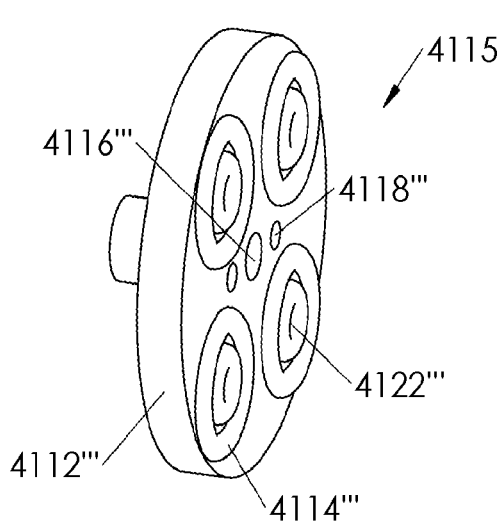
FIGS. 33A and 33B are perspective views of seal ends.
Figure 33B:
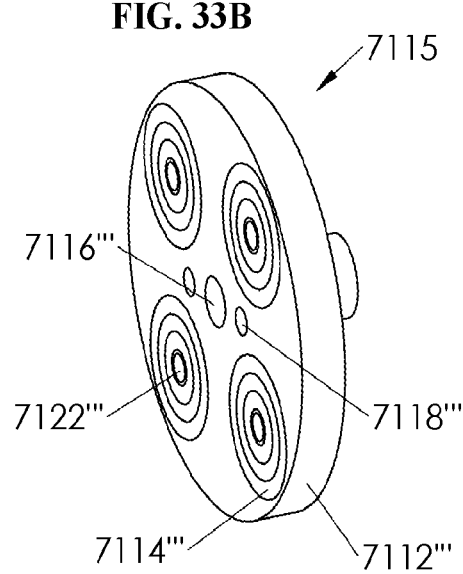

FIGS. 33A and 33B show the separate plug seal end 4115 and a receptacle seal end 7115 in greater detail. As shown in these views, the plug seal end 4115 may be separated from the seal plate 4712 to facilitate manufacture. In this version, the seal ends 4115, 7115 have disc shaped bodies 4112''', 7112''' with face seals 4114''', 7114''' extending therethrough and with a shaft extending therefrom for receiving the push rod 408''' and tine rod 604''' therethrough.

Seals 4116''', 4118''', and 4122''' attached to the seal plate 4712 in a stretched sealing engagement of the disc body 4112''' at the lip 4713. The shaft sealing surfaces 4116''', 4118''', and 4122''' are similar to the sealing surfaces in bladder assembly 410 of FIG. 8. The shaft sealing surfaces 7116''', 7118''', and 7122''' are similar to the sealing surfaces in bladder assembly 710 of FIG. 15. The seals may be made from high durometer elastomers to provide structural rigidity to the unsupported portion of the disc. The seals may also be molded with internal support such as metal or plastic insert around which elastomer molding is performed resulting in a bonded structure.

Figure 34A:
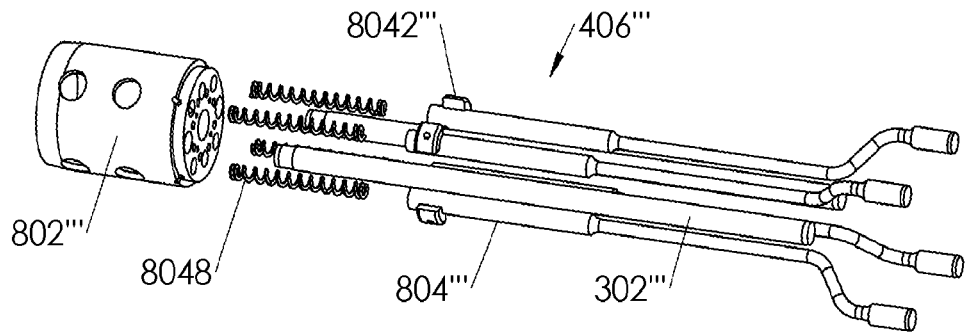
FIGS. 34A and 34B are exploded perspective views of tine assemblies.
Figure 34B:
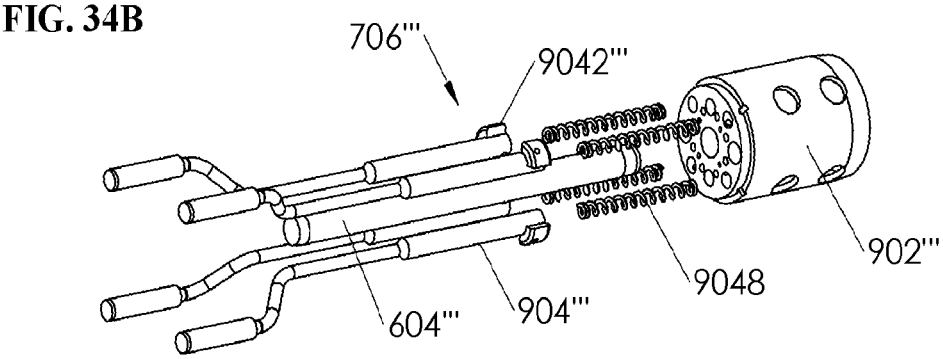
Figure 35:
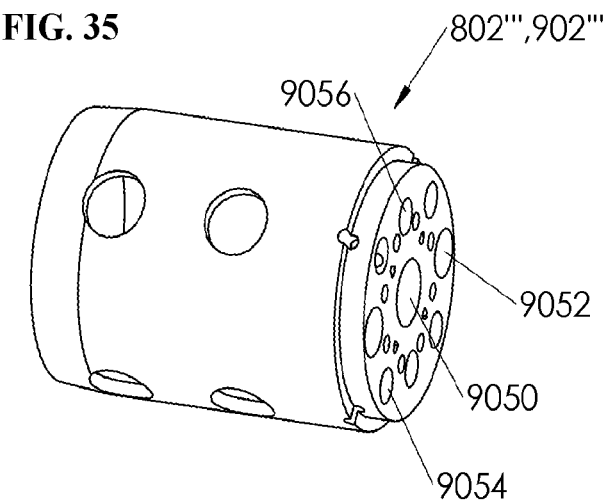
FIG. 35 is a perspective view of a tine base.

FIGS. 34A, 34B, and 35 show features of the tine assembly 446''', 706'''. The tine assemblies 406''', 706''' are similar to tine assemblies 406, 706 of FIGS. 11A-11B and 16A-16B. This version includes a tine base 802''', 942''' with tine rods 203''', 604''' and tines 804''', 904'''. The tines 804''', 904''' are shaped to have reduced cross section along its length to achieve reduced inertia and aid in manufacturing operation such as bending. The tines 804''', 904''' are seated in the tine base 802''', 902''' with spring mechanisms 8048, 9048 and tabs 8042''', 9042'''.

The tine bases 802''', 902''' are cylindrical members with interface bores 9050, 9052 and holes 9054, 9056 therethrough shaped for press-fit and lock-in assembly, respectively. The interface bores 9050, 9052 receivingly support the rods 302''', 604''' when press fitted in place. The holes 9054, 9056 receivingly support the spring mechanisms 8048, 9048 when lock-in assembled in place. The diagonally opposite holes 9056 receive guide rods 4718, 7718 that facilitate smooth travel and prevent rotation of the tine assembly 406''', 706''' during connector mating and de-mating.

Collapsed and expanded positions of the tines 804''', 904''' are achieved by virtue of the spring mechanisms 8048, 9048 and the tines 804''', 904''' reaction against the supports 402''', 702''' (FIGS. 29, 30). The tines 804''', 904''', may optionally have bellow type end feature, instead of spring mechanism, to interface with tine base 802''', 902''' through joining or other means. The tine bases 902''', 802''', may be identical and mass produced to achieve cost efficiency.

Electric Connector Assembly

Figure 36:
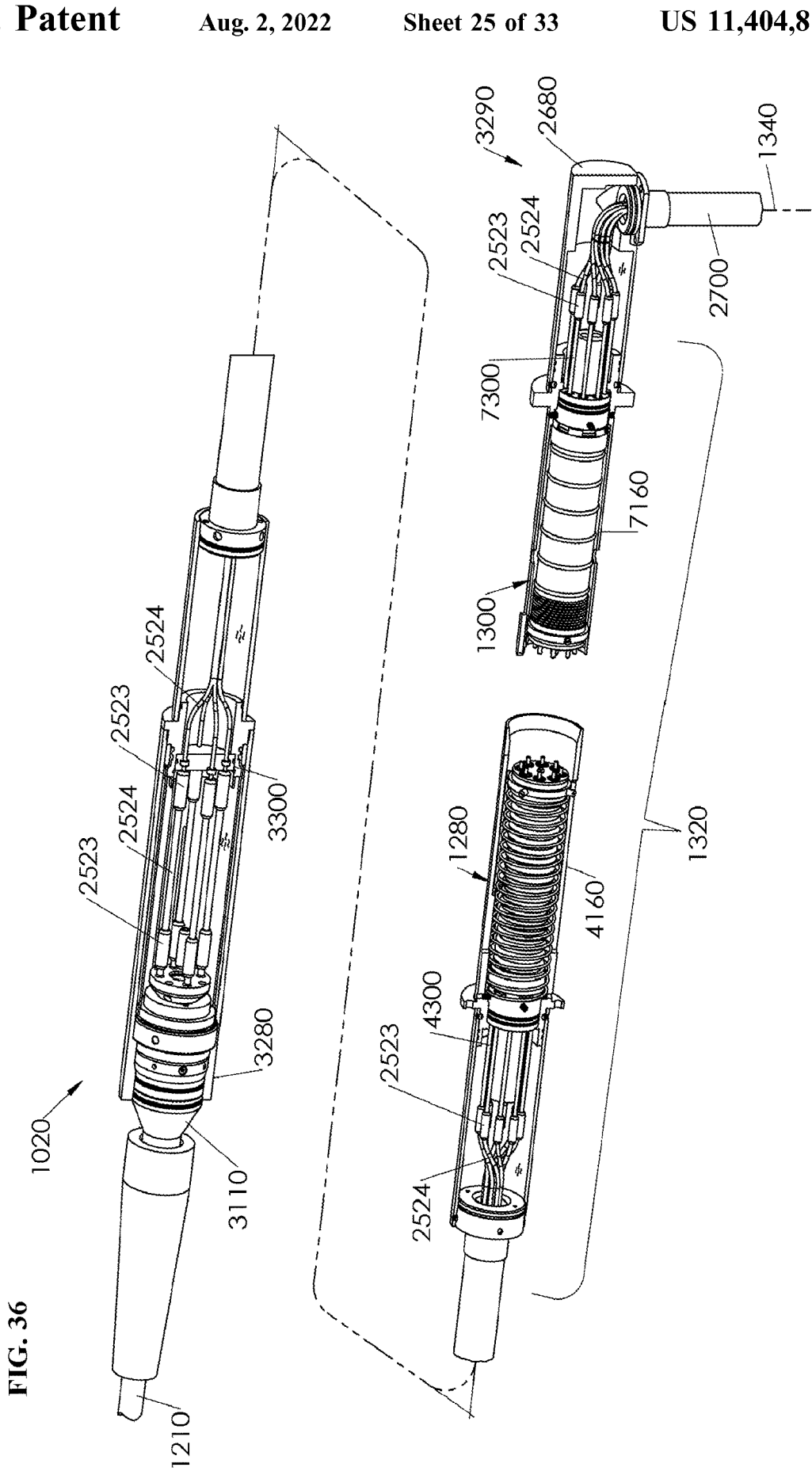
FIG. 36 is a partial cross-sectional view of a protective termination with an electric sealed connector.
Figure 37B:
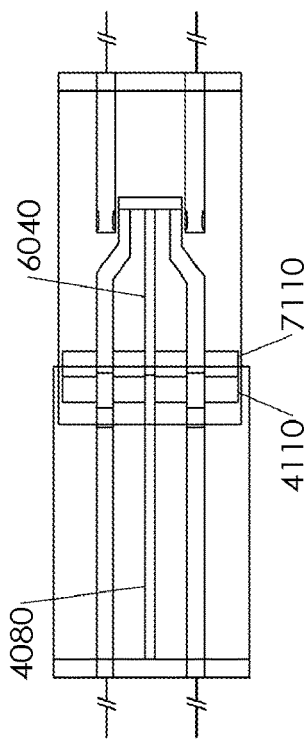
FIGS. 37A-37D are schematic diagrams of the electric sealed connector in an unmated, engaged, triggered, and mated position, respectively.
Figure 37D:
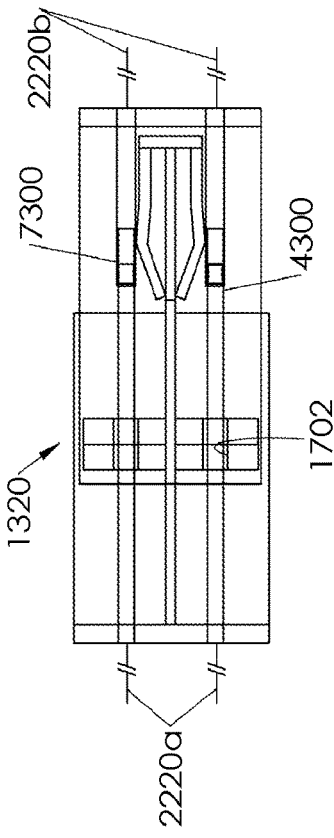
Figure 37A:
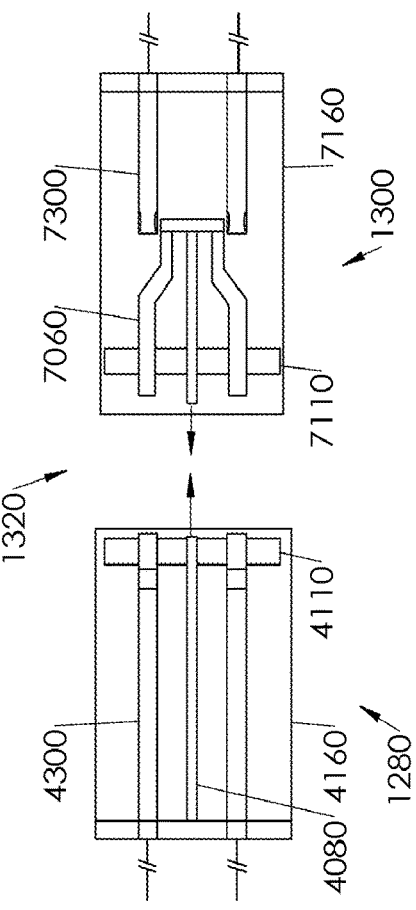
Figure 37C:
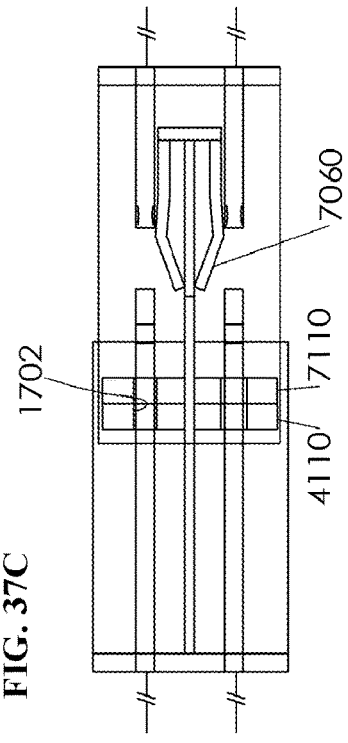
Figure 38B:
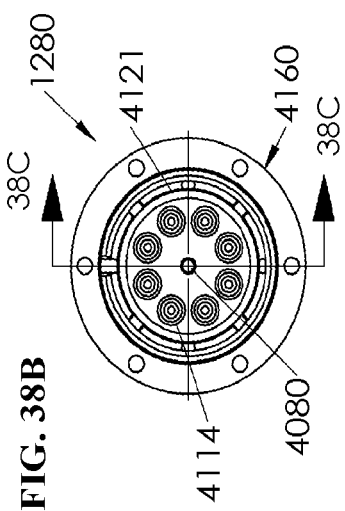
FIGS. 38A-38C are various views of the electric sealed plug.
Figure 38A:
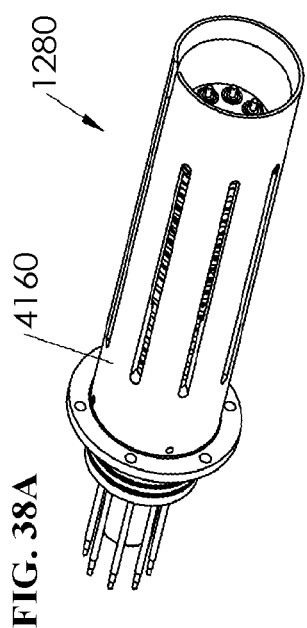
Figure 38C:
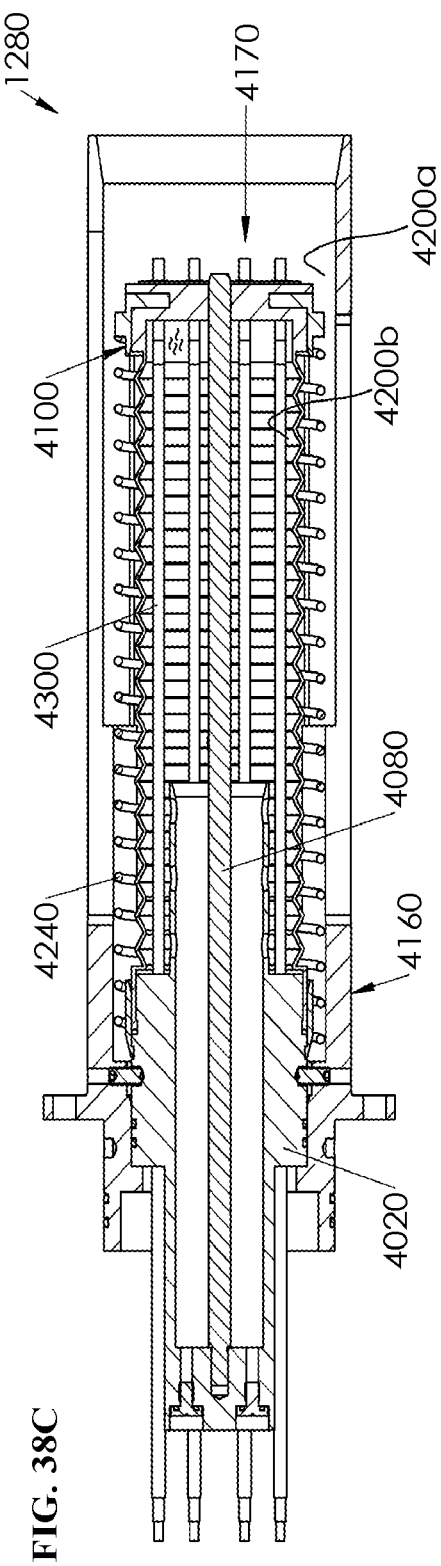
Figure 39:
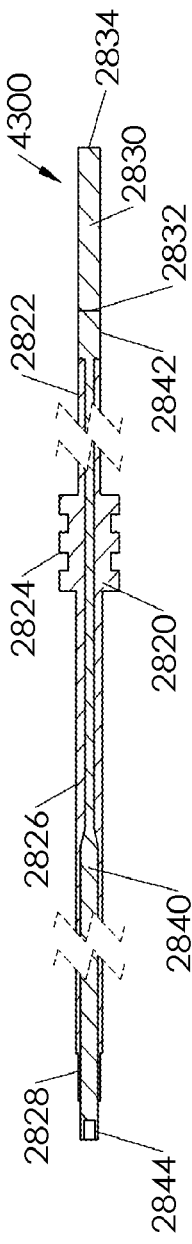
FIG. 39 is a cross-sectional view of an electric plug contact.
Figure 40B:
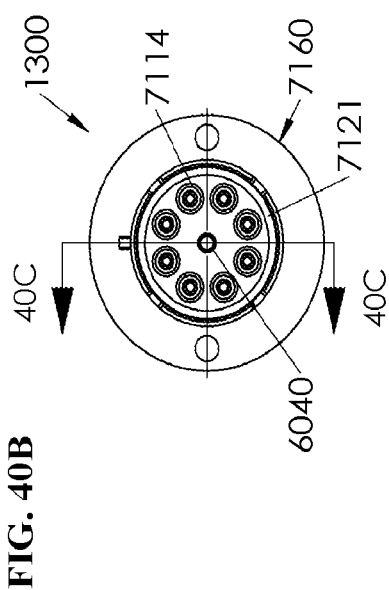
FIGS. 40A-40C are various views of the electric sealed receptacle.
Figure 40A:
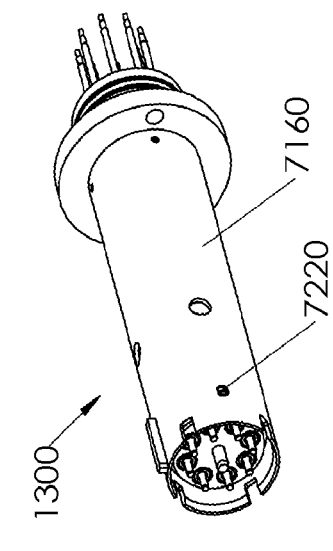
Figure 40C:
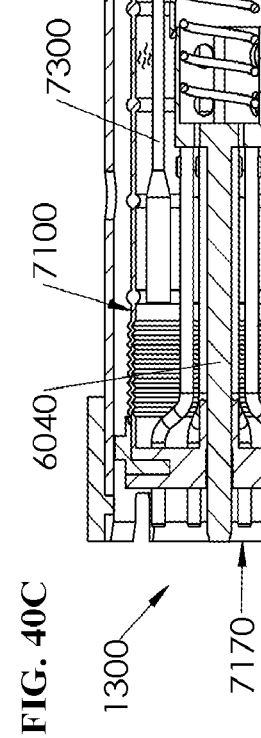
Figure 41:
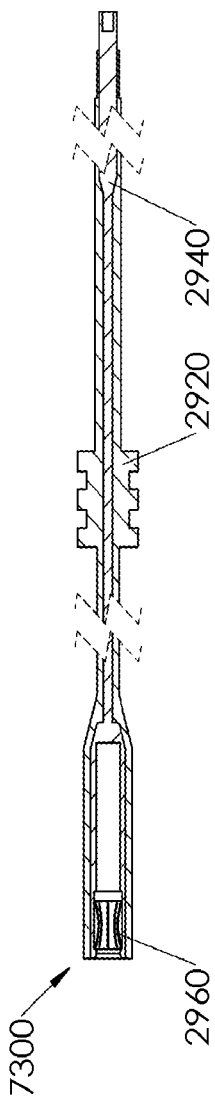
FIG. 41 is a cross-sectional view of an electric receptacle contact.

FIGS. 36-44C show various views of an electric sealed connector 1320 usable for communication between equipment, such as the seafloor equipment 120, 126 of FIG. 1A. FIG. 36 shows a partial cross-sectional view of the electric sealed connector 1320 for connecting equipment, FIGS. 37A-37D schematically show connection of the electric plug 1280 and the electric receptacle 1300 of the sealed connector 1320. FIGS. 38A-39 show various aspects of the electric plug 1280. FIGS. 40A-41 show various aspects of the electric receptacle 130ft FIGS. 42A-44C show operation of the electric connector 1320.

The sealed connector 1320 may operate similarly to the sealed connectors 132, 132a,b described herein. In this version, the electric sealed connector 1320 includes a sealed plug 1280 and a receptacle 1300 connectable to electric wires and/or cables. The electric sealed connector 1320 as shown has features capable of communication with the electric wires, but optionally could also have features for other wires or cables, such as those of the sealed connectors 132, 132a,b described herein.

As shown in FIG. 36, the termination 1020 may be similar to the termination 102 of FIG. 2B, except that the cable 1210 is an electric cable and the termination 1020 is provided with an electric connection assembly 3290 capable of passing multiple electric wires therethrough, The electric connection assembly 3290 may be similar to the connection assembly 327 of FIG. 2B, except that it is configured for electric connection.

The termination 1020 includes a housing 3280, an inlet 3110, a manifold 3300, tube joints 2523, and tubes 2524 to sealingly protect the wires (not shown) from the cable 1210. The wires extend into the housing 3280, through multiple passages in the inlet 3110, and through multiple passages in the manifold 3300. The wires 2220 also pass through the termination tubes 2524, and the tube joints 2523. The wires extend from the housing 3280 for coupling to the sealed connector 1320.

The sealed plug 1280 and the sealed connector 1320 are matably connectable to each other and to the equipment in a similar fashion as with the sealed connector 132 of FIG. 2B. In this version, the sealed plug 1280 has a plug housing 4160 sealingly connectable to the termination 1020, and electric contacts 4300 sealingly and operatively connectable to the tubes 2524 by tube joints 2523 with the wires therein.

The receptacle 1300 has a receptacle housing 7160 and contacts 7300 sealingly and operatively connectable to the tubes 2524 and tube joints 2523 of a harness connector 3290.

The harness connector 3290 includes a housing 2680 and flexible housing 2700 that connects the receptacle 1300 to the electric harness 1340 to pass the wires therethrough. The contacts 4300 of the sealed plug 1280 and the contacts 7300 of the receptacle 1300 are protectively sealed.

FIGS. 37A-37D show the sealed connector 1320 in various positions including an unmated, engaged, triggered, and mated position, respectively. As shown in these views, the sealed plug 1280 and the receptacle 1300 each include the housing 4160,7160 that includes tine rod 6040, the contacts 4300,7300 and bladders 4110,7110, and receptacle 1300 also includes a tine assembly 7060 with tine rods 6040, and sealed plug include a push rod (trigger) 4080. similar to the corresponding parts of the sealed plug 128 of FIG. 4C and sealed receptacle 130 of FIG. 12C.

In this electric example, when unmated (FIG. 37A), a forward end of the electric, contact 4300, expanded tine assembly 7060 keep the electric contacts 4300, 7300 sealed within the housings 4160, 7160. When the sealed plug 1280 and the receptacle 1300 engage (FIG. 37B), push rod 4080 engages with mating tine rods 6040 and pushes the tine assembly 7060 in conjunction with translation of either the sealed plug or the sealed receptacle to create a seal between the sealed plug 1280 and the receptacle 1300. The push rods 4080 pushes (FIG. 37C) the mating tine assembly 7060 further in to a collapsed position in conjunction with the sealed bladder 4110 moved by sealed bladder 7110 to create an annular passageway 1702 therebetween. With further mating movement, and the tine assembly 7060 in collapsed position, the electric contact 4300 is brought, via the passageway 1702, to mating engagement with contact 7300. Now mated power and communication pass through the mated sealed connector 1320 and between the electric sires 2220a, b (FIG. 37D).

Electric Plug

FIGS. 38A-39 show various aspects of the electric plug 1280 in detail. FIGS. 38A-38C show various views of the assembled electric plug 1280, and FIG. 39 shows a contact 4300 usable with the electric plug 1280. As shown in FIGS. 38A-38C, the sealed plug 1280 includes the housing 4160 and the internal assembly 4170 which may be similar to or the same as those of the sealed plug 128 (see, e.g., FIGS. 4A-4C), except that this version has no tine assembly or support spring (see, e.g., tine assembly 406 and spring 426 of FIGS. 4C and 11A-11B).

An internal chamber 4200a is defined within the housing 4160. The internal assembly 4170 is disposed in the internal chamber 4200a of the plug housing 4160 and supported by the plug support 4020. The internal assembly 4170 includes the receptacle support 4020, the electric contacts 4300, the bladder assembly 4100, and a push rod (trigger) 4080. The push rod 4080 and the contacts 4300 are supported in the support 4020 and extend through chamber 4200b in the bladder assembly 4100 as previously described for the push rod 408 of FIGS. 4C and 4D. In this version, the bladder assembly has a seal plate 4121 with seals 4114 therein. The push rod 4080 is supported in the support 4020 at one end and extends through the seal plate 4121 of the bladder assembly 4100.

FIG. 39 shows the electric contact 4300 in greater detail. The electric contact 4300 is similar to the contact 404 of FIG. 6, except that the electric contact 4300 is configured for electric connection. An example contact and connection features are disclosed in US2017022807.

The electric contact 4300 includes a conductor 2840, insulator 2820, and a seal shaft 2830. The conductor consists of a contact portion 2842 and termination portion 2844. The contact portion 2842 is suited to make connection with the mating electric contact 7300 as is described further herein. The termination portion 2844 is suited to receive the electric wire from the electric cable (e.g., 2220 of FIG. 37D). The insulator 2820 consists of a front portion 2822, a rear portion 2826, and a middle portion 2824 containing grooves to hold gland seal. The rear portion 2826 may have a stepped diameter 2828 to sealingly receive termination tube. The seal shaft 2830 has a forward end 2834 and rear end 2832. Forward end 2834 may be shaped to interface with tunes of the receptacle tine assembly 7060 as is described further herein. Rear end 2832 may be shaped for permanent attachment to conductor 2840.

Conductor 2840 may be made from any electrically conductive material including but not limited to copper, aluminum, copper alloy, silver etc. Conductor may be protectively coated to prevent oxidation and other environmental effects. Conductor may be made as single unitary piece either machined, cast, or manufactured from non-traditional processes such as 3D printing. Alternatively, the conductor 2840 may be made from joining of multiple pieces to form the final shape. The conductor 2840 may be shaped along the length to provide supporting structure for the insulator 2820.

Insulator 2820 may be made from any electrically insulative material including but not limited to LDPE, MDPE, HDPE, PEI, PEEK etc. The insulator may be protectively coated on its external surfaces to prevent deterioration of its properties from environmental effects, and may be coated on its internal surfaces to promote compatible interface with the conductor 2840. The insulator 2820 may be made as single unitary piece either machined, injection molded, or manufactured from non-traditional processes such as 3D printing. The insulator 2820 may be made from joining of multiple pieces to form the final shape. Internal surfaces of the insulator 2820 may be shaped along its length to have a matching and structurally supporting interface to the conductor 2840.

Seal shaft 2830 may be made from inert material that is electrically insulative and resistant to degradation from environmental effects. Ceramic (alumina). PTFE are examples of material that may be used for seal shaft.

Electric contact 4300 may be formed from either assembly, bonding, injection molding, joining, or any combination thereof of conductor 2840, insulator 2820, and seal shaft 2830. Conductor 2840 and insulator 2820 interface may be hermetically bonded or mechanically sealed from the forming processing.

Electric Receptacle

The electric receptacle 1300 is shown in greater detail in FIGS. 40A-40C. The receptacle 1300 is similar to the electric plug 1280 with some variations to allow for mating and operation with the electric plug 1280. As shown in these views, the receptacle 1300 includes the housing 7160 and an internal assembly 7170.

The internal assembly 7170 includes the receptacle support 7020, the bladder assembly 7100, the tine assembly 7060, and the receptacle electric contacts 7300. The bladder assembly 7100 has an internal chamber 7200b with the electric contacts 7300 and tine assembly 7060 extending therein. The components of the receptacle 1300 correspond to the components of the sealed plug 1280 for sealed connection and operation therewith. The components of the receptacle 1300 may be made from the same materials as the corresponding components of the sealed plug 1280.

Figure 12B:
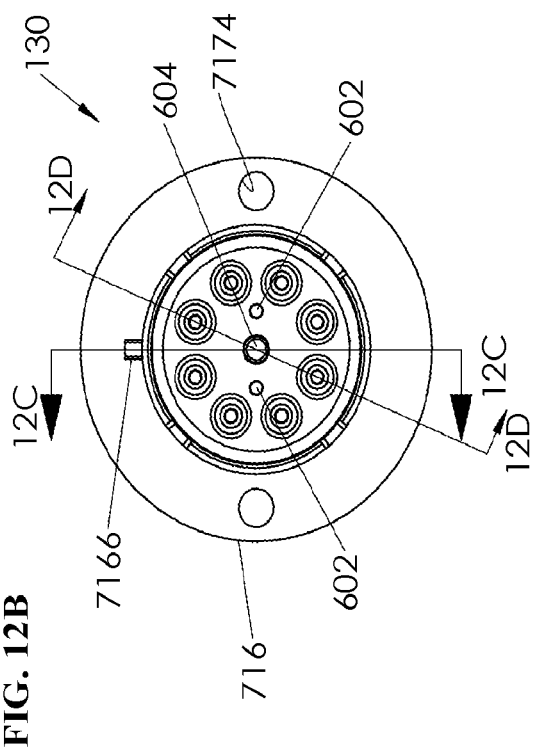
FIGS. 12A-12D are various views of the sealed receptacle.
Figure 12A:
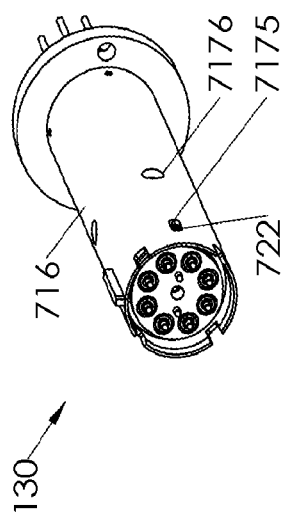
Figure 12C:
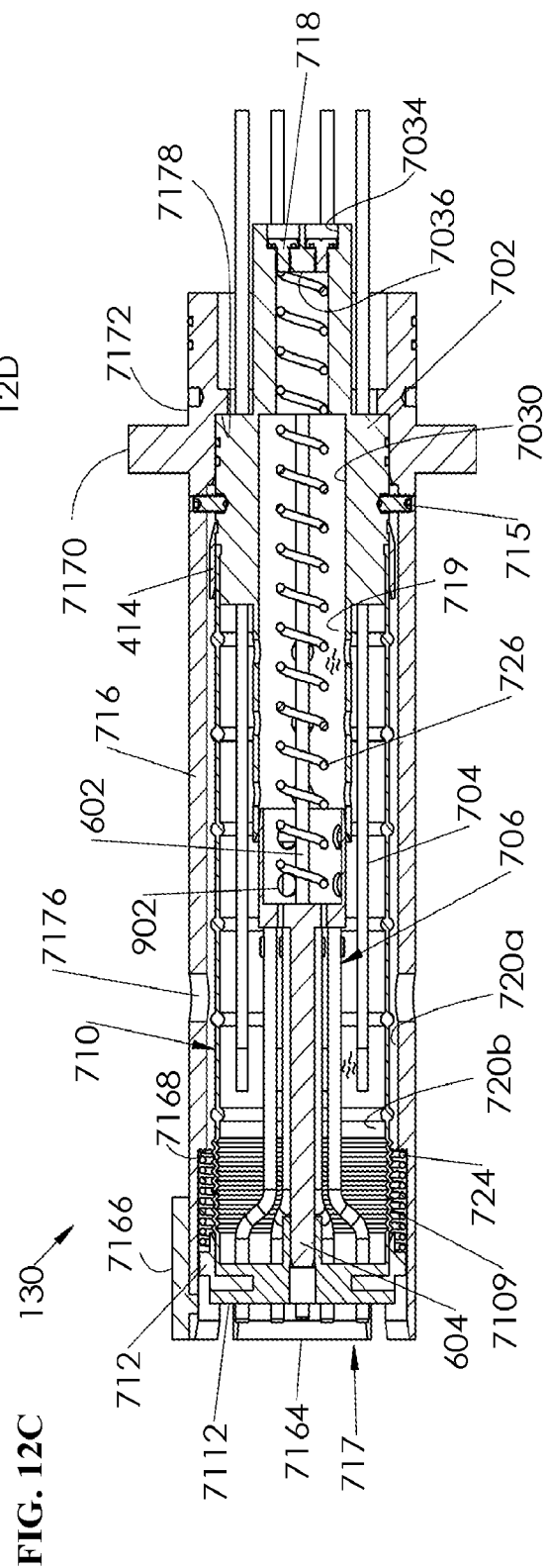
Figure 12D:
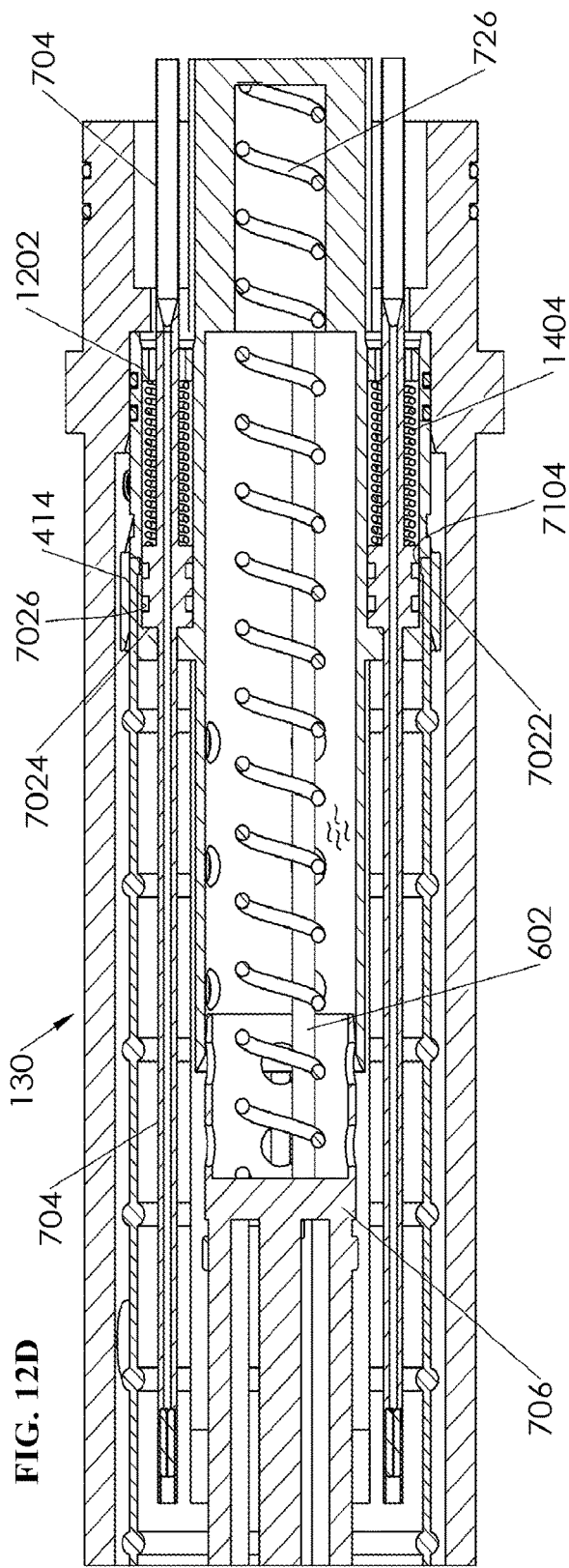

The electric receptacle 1300 is similar to sealed receptacle 130 of FIG. 12C with common components and assembly structure. In this version, the receptacle 1300 has been modified for use with electric wires and equipment. The bladder assembly includes a seal plate 7121 with seals 7114 for sealing engagement with the seal plate 4120 of the plug 1280. The tine assembly 7060 has a configuration similar to the tine assembly 706 of the FIGS. 12C and 16A and 16B. The tine rod 6040 extend through receptacle 1300 and the seal plate 7121 for engagement with push rod 4080 of the plug 1280. A spring 7260, for biased tine assembly 7060 return, extends through a portion of the support. 7020. This is similar to the function of spring 726 in receptacle 130 of FIG. 12C. The spring about the shoulder 7168 of receptacle 130 of FIG. 12C has been eliminated in the electric receptacle 1300 of FIG. 40C. This will be further evident as described in the mating sequence as there are no tine assembly within plug 1280 requiring trigger from the receptacle 1300. Hence the rib section 7109 of the bladder 7100 remains stationary unlike the bladder 710.

FIG. 41 shows the electric contact 7300 in greater detail. The contact 7300 is similar to the contact 4300 with some variations to allow for mating and electric communication. The contact includes a conductor 2940, insulator 2920, and an electric contact element 2960.

The conductor 2940 is similar to conductor 2840 except the contact portion is shaped to receive the contact portion of conductor 2840 and establish positive electric contact continuity through electric contact element 2960. The contact element 2960 may be contact bands commercially available electric component, for example from MOUSER ELECTRONICS™ at www.mouser.com. Electric contact 7300 may be made from materials and processes similar to electric contact 4300 that was recited before.

Sealed Mating of the Electric Connector

FIGS. 42A-44C shows various views of the sealed electric connector 1320 the electric plug 1280 and the receptacle 1300 in various stages of connection. As shown in these views, the receptacle 1300 is settable in the electric plug 1280. Various equipment, such as the termination 1020, the harness 1340, the sea floor equipment, or other equipment may be connected to the electric plug 1280 and/or the receptacle 1300 before or after mating.

As shown in FIG. 42A, the electric plug 1280 and the receptacle 1300 may be positioned in gross alignment for mating. The electric plug 1280 may be provided with the keyway 4176 and the receptacle 1300 may be provided with key 7166 for alignment and sliding engagement therebetween similar to those of FIG. 17A. As the receptacle 1300 is moved forward, the receptacle 1300 is guided by the keyway 4176 to begin mating with the plug 1280.

In its unmated state, sealed plug 1280 houses the electric contact 4300 sealed within the bladder assembly 4100. Sealing of the unmated plug 1280 is achieved by the seal shaft 2830 (FIG. 39) of the electric contact 4300, and sealing engagement of the push rod 4080 with shaft sealing surface 4122 and 4116 (see, e.g., FIG. 8).

The mating of electric sealed connector 1320 may be similar to mating of sealed connector 132 as described with respect to FIGS. 17A-19C. During mating, the electric plug 1280 or the receptacle 1300 may be stationary as they are drawn together for mating. Due to the pressure balancing and spring forces of the components of the sealed connector 1320, the sealed connector 1320 may be triggered to create a seal between the electric plug 1280 and the receptacle 1300.

As shown in FIG. 43A, the electric plug 1280 is positioned to receive the receptacle 1300 through end 4164 and into chamber 4200a of the housing 4160. The housings 4160, 7160 may engage as shown in FIG. 41A to prepare the internal assemblies 4170, 7170 to engage. The internal assemblies 4170, 7170 are at a distance from each other during the disconnected stage. As the receptacle 1300 enters into the housing 4160 of the electric plug 1280, a substantial amount of the seawater from chamber 4200a is pushed out of the way between mating ends of the electric plug 1280 and the receptacle 1300 as indicated by the curved arrows.

As shown in FIG. 43B, the receptacle 1300 has entered the electric plug 1280 and advanced such that its seal plate 7121 is about to contact the seal plate 4121 of the electric plug 1280. The push rod 4080 of the electric plug 1280 makes positive contact with the tine rod 6040 of the receptacle 1300, and the tines of the tine assembly 7060 are in latent contact with electric contact seal shaft 2830 of the contact 4300.

Pressure along contact surfaces between push rod 4080 and tine rod 6040 is higher than contact pressure along contact surfaces between the tine assembly 7060 and seal shaft 2830, The contact pressure between the tine assembly 7060 and seal shaft 2830 may at or near zero. As a result of this relative disposition, forward movement of the receptacle 1300 against the electric plug 1280 results in the fixed push rod 4080 depressing the tine assembly 7060 within the receptacle 1300 and overcoming a preload spring force of the tine spring 7260.

The seal shaft 2830 continue to be in non-pressure contact with receptacle tine assembly 7060, without separation, and simply follow the depressing receptacle tines assembly 7060 in translation due to the forward mating movement of the receptacle 1300. In other words, the relative position of the electric contact 4300 to the push rods 4080 within the electric plug 1280 remains the same.

Figure 43D:
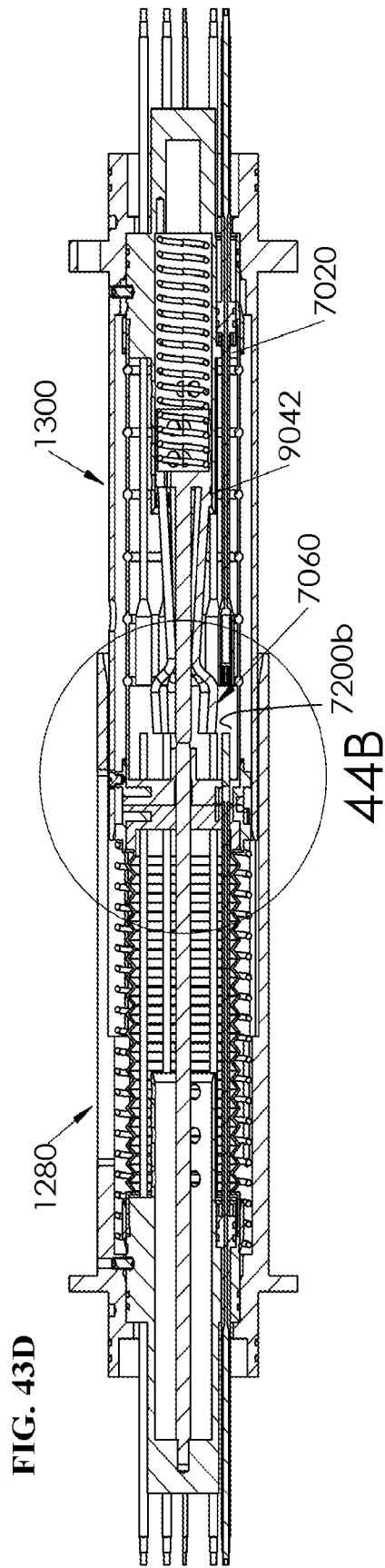
Figure 44A:
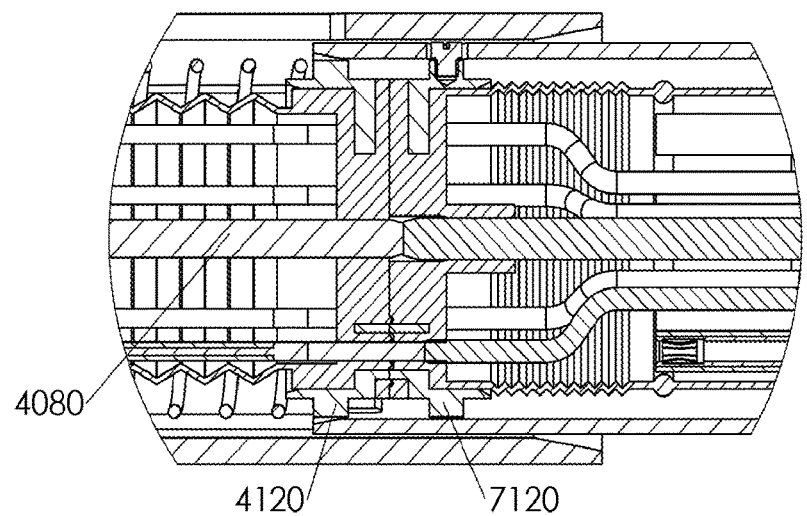
FIG. 44A-44C are detailed views of portions 44A-44C of the electric sealed connector of FIGS. 43C, 43D, and 43E, respectively.

As the mating continues as shown in FIGS. 43C and 44A, forward movement of receptacle 1300 continues until the plug and receptacle seal plates 4121, 7121 converge through the face seals 4114, 7114 (FIGS. 38B, 40B). Unlike the sealed connector 132 mating, the receptacle seal plate 4121 doesn't move within the receptacle 1300. As explained herein, there a spring is not required in receptacle 130 about the shoulder 7168 of FIG. 12C since there is no tine assembly or triggering by the spring within plug 1280. The receptacle bladder 7110 and rib section 7109 may be locked in place with guide pin 7220 in the seal plate 7121 (see e.g., FIG. 40A). Marginal movement may be accommodated for the seal plates 4121, 7121 while the face seals 4114, 7114 in the seal plates 4121, 7121 (FIGS. 38B, 40B) may engage to establish pressure tight sealing interface between receptacle 1300 and electric plug 1280. At this point of mating the seal shaft 2830 is in sealing engagement with both plug bladder shaft sealing surface 4122 and receptacle shaft sealing surface 7122. This mating sequence and expunging of seawater between the plug 1280 and receptacle 1300 and mechanics of the pressure tight face seals 4114, 7114 may be similar to those for mating of sealed connector 132.

As the mating continues further, ping seal plate 4121 begins to depress, overcoming the plug spring 4240 preload force, within the electric plug 1280 by the receptacle seal plate 7121 due to the forward mating movement of receptacle 1300. At the same time push rod 4080 continues to depress the tine assembly 7060 within the receptacle 1300.

Figure 44B:
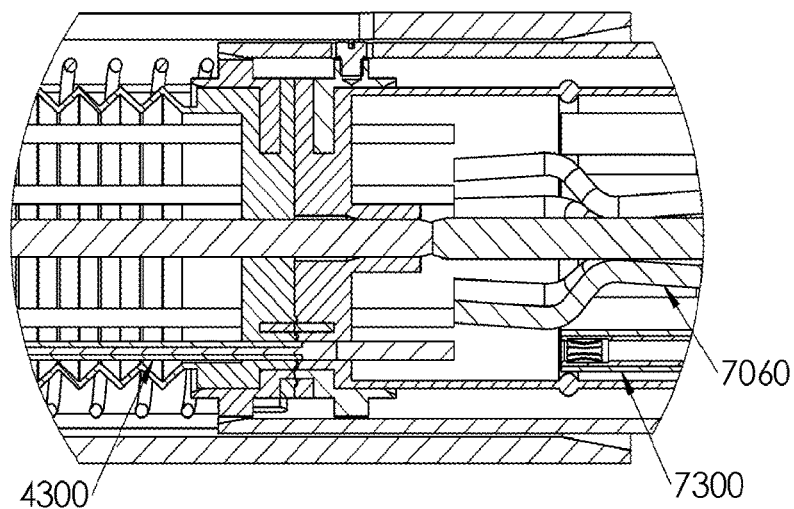

As the mating progresses as shown in FIGS. 43D and 44B, the receptacle tine assembly 7060 within the receptacle 1300 brings the tine tabs 9042 in engagement with the support 7020. Similar to the mating sequence of sealed connector 132, tines of the tine assembly 7060 collapse by deflecting inwardly. At this mating stage, the receptacle tine assembly is in a collapsed position, moved away from the latent contact it had with seal shaft 2830 of the contact 4300 (FIG. 43B). The electric contact 4300 is cleared of its path to make connection with contact 7300 in the receptacle 1300. The seal shaft 2830 of the electric contact 4300 is now in the chamber 7200b of the receptacle 1300.

Figure 43E:
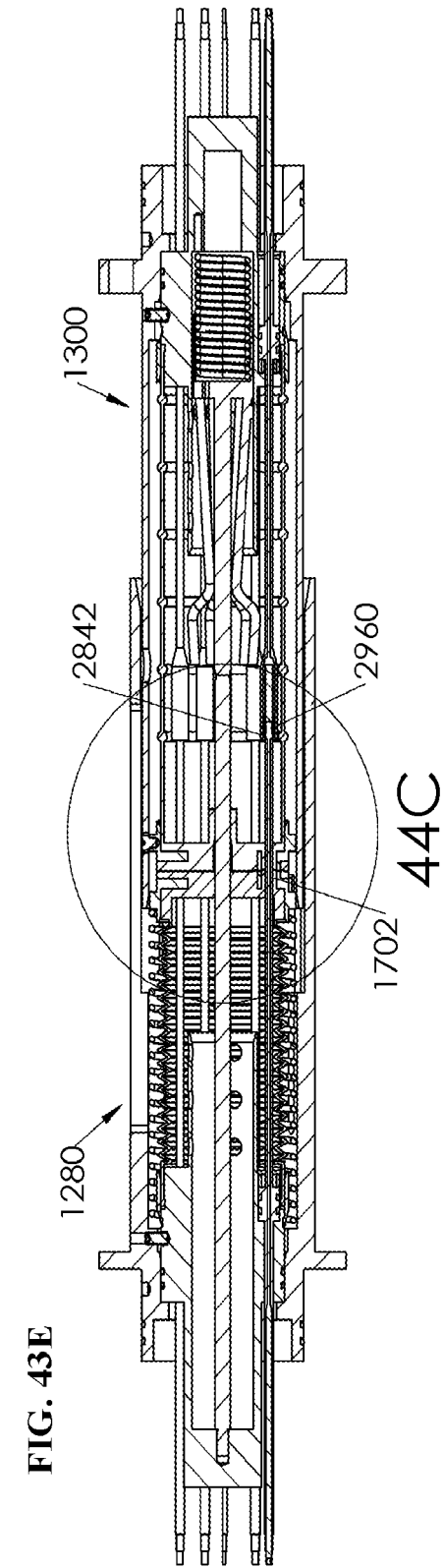
Figure 44C:
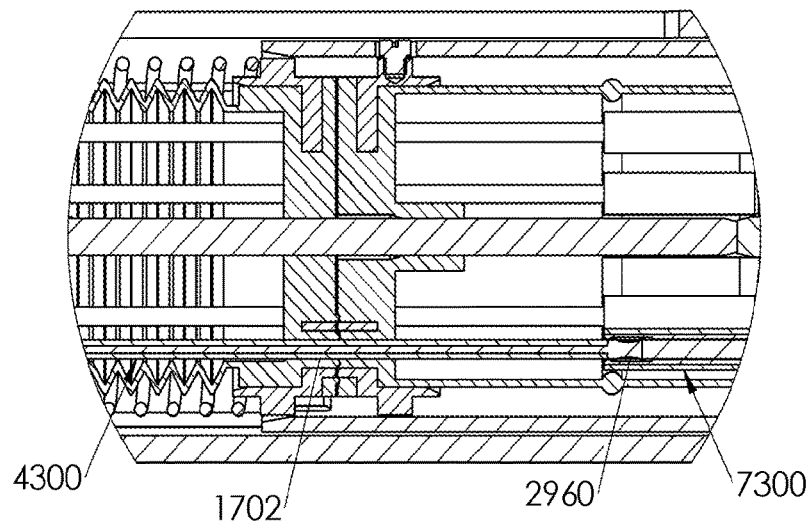

Further mating movement of the receptacle 1300 may make the stationary electric contacts 4300 extend through the passageways 1702 (FIGS. 37C-37D) without contacting sealing surfaces of the seal plate 4121, 7121 of the bladder assemblies 4100, 7100. The plug chamber 4200b and the receptacle chamber 7200b may still be connected by an annulus created in the passageways 1702 as a result of entry of the plug contacts 4300 into the receptacle chamber 7200b as shown in FIGS. 43E and 44C. In other versions, the plug contact 4300 may be in sealing contact with one or both the sealing surfaces 4122. 7122. During mating, pressure sealing of respective chambers 4200b, 7200b may be maintained by the penetrating plug contact 4300.

At the end of the mating stroke, the receptacle contacts 7300 are brought closer to the plug contacts 4300. The contacts 4300, 7300 are radially and angularly aligned for contact therebetween. During alignment action both the contacts 4300, 7300 may flex to accommodate the alignment reaction forces. Mating is completed with the contact portion 2842 of the plug contact 4300 establishing connection with the contact band 2960 of the receptacle contact 7300. The mated contacts 4300, 7300 may be maintained in a benign environment of the chambers 4200b, 7200b with pressure tight sealing maintained between chambers and the ambient environment.

Reverse action of the described mating sequence disconnects the electric plug 1280 and the receptacle 1300 with the respective contacts 4300, 7300 maintained in their respective sealed chambers 4200b, 7200b during and after the disconnect. The receptacle tines of the tine assembly 7060 may move out of their deflected state due to the natural flex from memory of the material as the de-mating sequence brings the tabs 9042 out of the bore 7030 due to the bias of the tine spring 7260. Any fluid exchange between the chambers 4200b and 7200b during mating and mated engagement may reverse during de-mating and disconnect without any net loss. When fully de-mated the seal shaft 2830, tines of tine assembly 7060 may be in sealing engagement with the respective sealing surfaces 4114, 7114 of the seal plates 4121, 7121 thereby re-establishing the respective sealed chambers 4200b, 7200b.

Method of Assembly

FIG. 45 discloses a method 4500 of communicatively connecting equipment (e.g., assembling and using) the sealed connectors) herein. The method 4500 involves 4570 communicatively coupling a sealed plug to a first piece of the equipment; 4572 communicatively coupling a sealed receptacle to a second piece of the equipment; 4574 communicatively coupling the sealed plug to the sealed receptacle by; and 4576 advancing contacts of the sealed plug through the passageways and into engagement with corresponding contacts of the sealed receptacle.

The communicatively coupling 4574 involves: 4574a—advancing the sealed receptacle into the sealed plug; 4574b—forming a bladder seal between a plug bladder assembly in the sealed plug and a receptacle bladder assembly in the sealed receptacle; and 4574c—while maintaining the bladder seal, opening passageways through the sealed plug and the sealed receptacle by extending trigger assemblies of the sealed plug and the sealed bladder through the bladder assemblies and into engagement with each other. The communicatively coupling 4574 may also involve 4574d overcoming a spring force of at least one of the bladder assemblies and/or 4574e overcoming a spring force of at least one of the plug assemblies.

The method 4500 may have other variations. The advancing the sealed receptacle comprises receiving an end of the sealed receptacle into an end of the sealed plug. The extending the trigger assemblies through the bladder assemblies and into engagement with each other comprises: extending a plug trigger assembly through the plug bladder and extending a receptacle trigger assembly through the receptacle bladder; and engaging the plug trigger assembly with the receptacle trigger assembly. The opening passageways through the sealed plug and the sealed receptacle is performed by engaging the plug trigger assembly with the receptacle trigger assembly such that tines of the trigger assembly collapse away from the passageways. Part or all of the method may be performed in various orders and repeated as desired.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

For example, while certain connectors are provided herein, it will be appreciated that various forms of connection may be provided.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A sealed connector for communicatively connecting equipment positioned in a harsh environment, the sealed connector comprising:
    a sealed plug and a sealed receptacle, each of the sealed plug and the sealed receptacle, comprising:
        a housing;
        a support secured in the housing;
        a bladder assembly connected to the support, the bladder assembly comprising an expandable bladder and a seal plate, the seal plate carried by the expandable bladder through the housing between an expanded position about an opening in the housing and a contracted position a distance from the opening;
        a trigger assembly supported in the expandable bladder by the support to form a sealed chamber therebetween, the trigger assembly comprising at least one rod extendable through the bladder and the seal plate; and contacts supported in the expandable bladder by the support, the contacts communicatively coupled to the equipment;

wherein, when the housing of the sealed receptacle is matingly connected to the housing of the sealed plug:

the seal plate of the sealed receptacle is in sealing engagement with the seal plate of the sealed plug;

the trigger assembly of the sealed plug extends through the seal plate of the sealed plug and the trigger assembly of the sealed receptacle extends through the seal plate of the sealed receptacle and into triggered engagement with each other;

a passageway through the seal plate of the sealed plug and a passageway through the seal plate of the sealed receptacle are open; and the contact of the sealed plug extends through the passageway of the sealed plug and the passageway of the sealed receptacle and into engagement with the contact of the sealed receptacle.

2. The sealed connector of claim 1, further comprising an additional bladder within the expandable bladder.

3. The sealed connector of claim 1, wherein the expandable bladder has at least one of peripheral ribs and a lip.

4. The sealed connector of claim 2, wherein expandable bladder has a first rib section and a second rib section, the first rib section more flexible than the second rib section.

5. The sealed connector of claim 1, wherein the seal plate comprises a plate, a disc, and seals.

6. The sealed connector of claim 1, wherein the seal plate comprises tubular member and a disc positionable about the tubular member.

7. The sealed connector of claim 1, wherein the seal plate has holes for receiving portions the contacts and the trigger assembly therethrough.

8. The sealed connector of claim 7, wherein the sealed plate comprises plate seals positioned about the holes.

9. The sealed connector of claim 1, wherein the bladder assembly further comprises a bladder spring.

10. The sealed connector of claim 1, wherein the trigger assembly further comprises a base.

11. The sealed connector of claim 1, wherein the trigger assembly further comprises a trigger spring.

12. The sealed connector of claim 1, wherein the trigger assembly of at least one of the sealed plug and the sealed receptacle further comprise tines.

13. The sealed connector of claim 12, wherein the tines comprise a rod with fingers.

14. The sealed connector of claim 1, wherein the trigger assembly further comprises tabs.

15. The sealed connector of claim 1, wherein the trigger assembly further comprises a plunger.

16. The sealed connector of claim 1, wherein the support has a bore therethrough to receive the trigger assembly.

17. The sealed connector of claim 1, wherein the contacts comprise fiber optic contacts.

18. The sealed connector of claim 1, wherein the contacts comprise electric contacts.

19. The sealed connector of claim 1, wherein the contacts comprise an insulator, a conductor, and a seal shaft.

20. The sealed connector of claim 1, further comprising a fluid disposed in the sealed chamber and pressure balanced therein.

21. The sealed connector of claim 1, wherein the housing is a modular housing comprising a tip, a base, and a tube.

22. The sealed connector of claim 1, wherein the support of the sealed plug and the support of the sealed connector are identical.

23. A sealed connection system for communicatively connecting equipment positioned in a harsh environment, the sealed connection system comprising:

a sealed plug, comprising:
a sealed plug housing;
a plug support secured in the plug housing, the plug support having a bladder end extending into the plug housing;
a plug bladder having a support end secured to the bladder end of the plug support and a seal end having a plug seal plate thereon, the plug seal plate .slidably movable in the plug housing as the plug bladder extends and retracts;
a plug trigger supported by the plug support in the plug bladder to form a sealed chamber therebetween, the plug trigger extendable through the bladder and the plug seal plate; and
plug contacts supported by the support and extendable into the plug bladder; and a sealed receptacle, comprising:
a sealed receptacle housing matingly receivable in an opening in the sealed plug housing;
a receptacle support secured in the receptacle housing, the receptacle support having a bladder end extending into the receptacle housing;
a receptacle bladder having a support end secured to the bladder end of the receptacle support and a seal end having a receptacle seal plate thereon, the receptacle seal plate slidably movable in the receptacle housing as the receptacle bladder extends. and retracts;
a receptacle trigger supported by the receptacle support in the receptacle bladder to form a sealed chamber therebetween, the receptacle trigger extendable through the receptacle bladder and the receptacle seal plate to engage with the plug trigger; and
receptacle contacts supported by the support and extendable into the receptacle bladder;

wherein, when the receptacle housing and the plug housing are mated together:
the trigger assemblies, are in a triggered position extending through the bladders and the seal plates and into triggered engagement with each other, and passageways through the seal plates are open; and
the plug contacts are in an extended position through the passageway engagement with the receptacle contact.

24. The sealed connection system of claim 23, further comprising a harness.

25. The sealed connection system of claim 23, further comprising a connection assembly.

26. The sealed connection system of claim 25, wherein the connection assembly comprises a connection housing and lock plates.

27. The sealed connection system of claim 23, further comprising a termination.

28. A method of communicatively connecting equipment positioned in a harsh environment, the method comprising:
communicatively coupling a sealed plug to a first piece of the equipment;
communicatively coupling a sealed receptacle to a second piece of the equipment;
communicatively coupling the sealed plug to the sealed receptacle by:

advancing the sealed receptacle and the sealed plug together;

forming a bladder seal between a plug bladder assembly in the sealed plug and a receptacle bladder assembly in the sealed receptacle;

while maintaining the bladder seal, opening passageways through the sealed plug and the sealed receptacle by extending trigger assemblies of the sealed plug and the sealed receptacle through the bladder assemblies and into engagement with each other; and advancing contacts of the sealed plug through the passageways and into engagement with corresponding contacts of the sealed receptacle.

29. The method of claim 28, wherein the advancing the sealed receptacle comprises receiving an end of the sealed receptacle into an end of the sealed plug.

30. The method of claim 28, wherein the communicatively coupling comprises overcoming a spring force of at least one of the bladder assemblies.

31. The method of claim 28, wherein the communicatively coupling the sealed plug to the sealed receptacle comprises overcoming a spring force of at least one of the tine assemblies.

32. The method of claim 28, wherein the extending, the trigger assemblies through the bladder assemblies and into engagement with each other comprises:

extending a plug trigger assembly through the plug bladder and extending a receptacle trigger assembly through the receptacle bladder; and engaging the plug trigger assembly with the receptacle trigger assembly.

33. The method of claim 32, wherein the opening passageways through the sealed plug and the sealed receptacle is performed by engaging the plug trigger assembly with the receptacle trigger assembly such that tines of the trigger assemblies collapse away from the passageways.

* * * * *